(12) United States Patent
Fonte et al.

(10) Patent No.: US 12,252,388 B2
(45) Date of Patent: Mar. 18, 2025

(54) REFRIGERATION SYSTEMS FOR RAPIDLY COOLING FOOD AND DRINKS

(71) Applicant: ColdSnap, Corp., Billerica, MA (US)

(72) Inventors: Matthew Fonte, Concord, MA (US); Benjamin Fichera, Newburyport, MA (US)

(73) Assignee: ColdSnap, Corp., Billerica, MA (US)

( * ) Notice: Subject to any disclaimer, the term of this patent is extended or adjusted under 35 U.S.C. 154(b) by 0 days.

(21) Appl. No.: 18/303,980

(22) Filed: Apr. 20, 2023

(65) Prior Publication Data

US 2023/0249957 A1    Aug. 10, 2023

Related U.S. Application Data

(63) Continuation of application No. 17/700,200, filed on Mar. 21, 2022, now Pat. No. 11,634,312, which is a
(Continued)

(51) Int. Cl.
*B67D 1/08* (2006.01)
*A23G 9/12* (2006.01)
(Continued)

(52) U.S. Cl.
CPC ............ *B67D 1/0859* (2013.01); *A23G 9/12* (2013.01); *A23G 9/227* (2013.01); *A23G 9/224* (2013.01);
(Continued)

(58) Field of Classification Search
CPC ...... B67D 1/0859; B67D 1/0047; A23G 9/12; A23G 9/227; A23G 9/224; A23G 9/228; A23G 9/287; F25B 21/02; F25B 2400/054
See application file for complete search history.

(56) References Cited

U.S. PATENT DOCUMENTS

| | | |
|---|---|---|
| 1,438,523 A | 12/1922 | Duren |
| 1,555,701 A | 9/1925 | Prichard et al. |
| | (Continued) | |

FOREIGN PATENT DOCUMENTS

| | | |
|---|---|---|
| CN | 203314023 | 12/2013 |
| CN | 106492721 | 3/2017 |
| | (Continued) | |

OTHER PUBLICATIONS

JP Office Action in Japanese Appln. No. 2022-573708, mailed on Feb. 27, 2024, 24 pages (with English translation).
(Continued)

*Primary Examiner* — Joseph F Trpisovsky
(74) *Attorney, Agent, or Firm* — Fish & Richardson P.C.

(57) ABSTRACT

A machine for cooling a food or drink includes a refrigeration system operable to cool ingredients for producing the cooled food or drink. The refrigeration system includes an evaporator defining a receptacle sized to receive the ingredients. The evaporator includes an inlet to receive a refrigerant and an outlet to discharge the refrigerant. The refrigeration system includes a closed-loop refrigerant path passing through the evaporator between the inlet of the evaporator and the outlet of the evaporator for exchanging heat between the received ingredients and the refrigerant to cool the received ingredients. The refrigeration system includes a compressor operable to pump the refrigerant through the closed-loop refrigerant path. The compressor includes an inlet to receive the refrigerant and an outlet to discharge the refrigerant. The refrigeration system includes a thermo-electric device located along the closed-loop refrigerant path between the outlet of the evaporator and the inlet of the compressor.

20 Claims, 41 Drawing Sheets

Related U.S. Application Data continuation of application No. 17/335,891, filed on Jun. 1, 2021, now Pat. No. 11,279,609.

(60) Provisional application No. 63/033,059, filed on Jun. 1, 2020.

(51) Int. Cl.
    *A23G 9/22*     (2006.01)
    *A23G 9/28*     (2006.01)
    *B67D 1/00*     (2006.01)

(52) U.S. Cl.
    CPC .............. *A23G 9/228* (2013.01); *A23G 9/287* (2013.01); *B67D 1/0047* (2013.01)

(56) References Cited

U.S. PATENT DOCUMENTS

| | | |
|---|---|---|
| 1,944,114 A | 1/1934 | Skowlund |
| 2,350,534 A | 6/1944 | Rosinger |
| 2,518,758 A | 8/1950 | Cook |
| 2,541,814 A | 2/1951 | Gaddini |
| 2,577,916 A | 12/1951 | Rollman |
| 3,061,280 A | 10/1962 | Kraft et al. |
| 3,393,900 A | 7/1968 | Wagner et al. |
| 3,635,147 A | 1/1972 | Lee |
| 3,896,959 A | 7/1975 | Roy |
| 3,914,673 A | 10/1975 | Wallin |
| 3,951,289 A | 4/1976 | Landen |
| 4,110,476 A | 8/1978 | Rhodes |
| 4,162,855 A | 7/1979 | Bender |
| 4,359,283 A | 11/1982 | McClellan |
| 4,408,690 A | 10/1983 | Ferrero |
| 4,535,604 A | 8/1985 | Cavalli et al. |
| 4,538,427 A | 9/1985 | Cavalli |
| 4,563,880 A | 1/1986 | Cipelletti |
| 4,568,192 A | 2/1986 | Kudermann |
| 4,573,329 A | 3/1986 | Cavalli |
| 4,583,863 A | 4/1986 | Pandolfi |
| 4,632,566 A | 12/1986 | Masel et al. |
| 4,635,560 A | 1/1987 | Ballantyne |
| 4,664,529 A | 5/1987 | Cavalli |
| 4,784,866 A | 11/1988 | Wissgott |
| 4,784,886 A | 11/1988 | Wissgott |
| 4,796,440 A | 1/1989 | Shiotani et al. |
| 4,827,732 A | 5/1989 | Suyama et al. |
| 4,885,917 A | 12/1989 | Spector |
| 4,910,972 A | 3/1990 | Jaster |
| 4,913,645 A | 4/1990 | Daouse et al. |
| 4,926,390 A | 5/1990 | Murzsa |
| 4,993,238 A | 2/1991 | Inagaki |
| 5,264,237 A | 11/1993 | Traitler et al. |
| 5,331,820 A | 7/1994 | Faries et al. |
| 5,343,710 A | 9/1994 | Cathenaut et al. |
| 5,363,746 A | 11/1994 | Gordon |
| 5,435,143 A | 7/1995 | Heinrich |
| 5,447,036 A | 9/1995 | Heinrich |
| 5,533,800 A | 7/1996 | Stiegelmann et al. |
| 5,549,042 A | 8/1996 | Bukoschek et al. |
| 5,556,659 A | 9/1996 | De Pedro et al. |
| 5,568,729 A | 10/1996 | Heinrich et al. |
| 5,571,282 A | 11/1996 | Earle |
| 5,603,965 A | 2/1997 | Daouse |
| 5,692,633 A | 12/1997 | Gordon |
| 5,823,675 A | 10/1998 | Myerly |
| 5,834,739 A | 11/1998 | Lockwood et al. |
| 5,843,512 A | 12/1998 | Daouse et al. |
| 5,879,731 A | 3/1999 | Beckett et al. |
| 5,888,562 A | 3/1999 | Hansen et al. |
| 5,888,567 A | 3/1999 | Daouse |
| 5,932,275 A | 8/1999 | Nalur |
| 5,955,136 A | 9/1999 | Laaman et al. |
| 5,967,381 A | 10/1999 | Van Zeeland et al. |
| 6,004,606 A | 12/1999 | French et al. |
| 6,012,383 A | 1/2000 | Lande |
| 6,045,836 A | 4/2000 | Saunier et al. |
| 6,060,094 A | 5/2000 | Nalur |
| 6,071,546 A | 6/2000 | Nalur |
| 6,089,747 A | 7/2000 | Huang |
| 6,174,157 B1 | 1/2001 | Daouse et al. |
| 6,194,014 B1 | 2/2001 | Busse et al. |
| 6,210,739 B1 | 4/2001 | Nalur |
| 6,220,047 B1 | 4/2001 | Vogel et al. |
| 6,221,409 B1 | 4/2001 | Bueno Ceresuela |
| 6,251,455 B1 | 6/2001 | Thomas |
| 6,251,456 B1 | 6/2001 | Maul et al. |
| 6,267,049 B1 | 7/2001 | Silvano |
| 6,267,073 B1 | 7/2001 | Busse et al. |
| 6,272,974 B1 | 8/2001 | Pascotti et al. |
| 6,280,783 B1 | 8/2001 | Blaschke et al. |
| 6,284,294 B1 | 9/2001 | French et al. |
| 6,299,923 B1 | 10/2001 | Meziane |
| 6,338,569 B1 | 1/2002 | McGill |
| 6,338,863 B1 | 1/2002 | Amiel et al. |
| 6,340,488 B1 | 1/2002 | French et al. |
| 6,379,724 B1 | 4/2002 | Best et al. |
| 6,399,134 B1 | 6/2002 | Best et al. |
| 6,413,563 B1 | 7/2002 | Blaschke et al. |
| 6,431,395 B1 | 8/2002 | San Martin et al. |
| 6,444,044 B1 | 9/2002 | Beckett et al. |
| 6,454,455 B1 | 9/2002 | Jungvig |
| 6,479,085 B1 | 11/2002 | Archibald |
| 6,524,634 B2 | 2/2003 | Busse et al. |
| 6,524,635 B1 | 2/2003 | Aebi |
| 6,531,169 B2 | 3/2003 | Best et al. |
| 6,548,097 B1 | 4/2003 | Best et al. |
| 6,565,902 B2 | 5/2003 | Ruano Del Campo et al. |
| 6,579,375 B2 | 6/2003 | Beckett et al. |
| 6,592,928 B2 | 7/2003 | Makela et al. |
| 6,616,963 B1 | 9/2003 | Zerby et al. |
| 6,623,784 B2 | 9/2003 | Zerby et al. |
| 6,627,239 B1 | 9/2003 | Gavie et al. |
| 6,645,538 B2 | 11/2003 | Best et al. |
| 6,689,406 B2 | 2/2004 | Kuehl et al. |
| 6,713,101 B2 | 3/2004 | Lometillo et al. |
| 6,726,944 B2 | 4/2004 | Blaschke et al. |
| 6,739,475 B2 | 5/2004 | San Martin et al. |
| 6,758,056 B1 | 7/2004 | Cathenaut et al. |
| 6,790,467 B2 | 9/2004 | Kostival et al. |
| 6,818,238 B2 | 11/2004 | Napolitano et al. |
| 6,820,765 B2 | 11/2004 | Pahl |
| 6,824,808 B2 | 11/2004 | Best et al. |
| 6,835,406 B1 | 12/2004 | Wurzel et al. |
| 6,861,082 B2 | 3/2005 | Laffont et al. |
| 6,890,577 B2 | 5/2005 | Vaghela et al. |
| 6,936,794 B2 | 8/2005 | Zhang et al. |
| 6,942,885 B2 | 9/2005 | Ross et al. |
| 6,971,248 B1 | 12/2005 | Wiggs |
| 7,211,283 B2 | 5/2007 | Jones et al. |
| 7,314,307 B2 | 1/2008 | Cai |
| 7,407,681 B2 | 8/2008 | Marchon et al. |
| 7,451,613 B2 | 11/2008 | Barraclough et al. |
| 7,513,213 B2 | 4/2009 | Mange et al. |
| 7,619,188 B2 | 11/2009 | Oghafua et al. |
| 7,650,834 B2 | 1/2010 | Bravo |
| 7,658,960 B2 | 2/2010 | Thomas et al. |
| 7,727,573 B2 | 6/2010 | Vaghela et al. |
| 7,730,831 B2 | 6/2010 | Mange et al. |
| 7,736,681 B2 | 6/2010 | Belzowski et al. |
| 7,754,260 B2 | 7/2010 | Kruik et al. |
| 7,918,334 B2 | 4/2011 | Gaetano et al. |
| 8,182,853 B2 | 5/2012 | Puaud et al. |
| 8,273,392 B2 | 9/2012 | Ho et al. |
| 8,347,808 B2 | 1/2013 | Belzowski et al. |
| 8,425,967 B2 | 4/2013 | Vaghela et al. |
| 8,459,497 B2 | 6/2013 | Milan et al. |
| 8,628,811 B2 | 1/2014 | Panyam et al. |
| 8,685,477 B2 | 4/2014 | Almblad et al. |
| 8,720,493 B2 | 5/2014 | Dose et al. |
| 8,777,057 B2 | 7/2014 | Fiedler |
| 8,784,091 B2 | 7/2014 | Henriet et al. |
| 8,840,943 B2 | 9/2014 | Amend |
| 8,844,426 B2 | 9/2014 | Ochoa et al. |
| 8,877,179 B2 | 11/2014 | Mercenier et al. |

(56) References Cited

U.S. PATENT DOCUMENTS

| | | |
|---|---|---|
| 8,906,437 B2 | 12/2014 | Green et al. |
| 8,936,821 B2 | 1/2015 | Ummadi et al. |
| 8,940,352 B2 | 1/2015 | Ambrogi et al. |
| 8,960,992 B2 | 2/2015 | de Jong |
| 8,960,999 B1 | 2/2015 | Ochoa et al. |
| 8,980,354 B2 | 3/2015 | Harlaux-Pasquier et al. |
| 9,155,322 B2 | 10/2015 | Ricco et al. |
| 9,232,811 B2 | 1/2016 | Panyam et al. |
| 9,242,387 B2 | 1/2016 | Amend et al. |
| 9,253,993 B2 | 2/2016 | Ummadi et al. |
| 9,346,611 B1 | 5/2016 | Roberts et al. |
| 9,351,503 B2 | 5/2016 | Amend et al. |
| 9,351,504 B2 | 5/2016 | Ricco et al. |
| 9,448,006 B2 | 9/2016 | Kulkarni et al. |
| 9,572,358 B2 | 2/2017 | Whitehouse |
| 9,573,726 B2 | 2/2017 | Danesin et al. |
| 9,591,865 B2 | 3/2017 | Ravji et al. |
| 9,826,756 B2 | 11/2017 | Ummadi et al. |
| 9,861,114 B2 | 1/2018 | Lallemand et al. |
| 9,888,706 B2 | 2/2018 | Ummadi et al. |
| 9,913,486 B2 | 3/2018 | Nalur |
| 10,039,298 B2 | 8/2018 | Noth et al. |
| 10,058,833 B2 | 8/2018 | Bloch |
| 10,111,447 B2 | 10/2018 | Noth et al. |
| 10,117,445 B2 | 11/2018 | Imer |
| 10,149,487 B2 | 12/2018 | Shuntich |
| 10,279,973 B2 | 5/2019 | Butscher et al. |
| 10,314,320 B2 | 6/2019 | Roberts et al. |
| 10,334,868 B2 | 7/2019 | Fonte |
| 10,358,284 B2 | 7/2019 | Fonte |
| 10,368,680 B2 | 8/2019 | Ryan |
| 10,426,180 B1 | 10/2019 | Fonte |
| 10,543,978 B1 | 1/2020 | Fonte et al. |
| 10,604,337 B2 | 3/2020 | Fonte et al. |
| 10,612,835 B2 | 4/2020 | Fonte et al. |
| 10,667,542 B2 | 6/2020 | Fonte |
| 10,752,432 B2 | 8/2020 | Fonte et al. |
| 10,782,049 B1 | 9/2020 | Fonte et al. |
| 10,830,529 B2 | 11/2020 | Fonte et al. |
| 10,897,916 B2 | 1/2021 | Fonte |
| 10,973,240 B1 | 4/2021 | Fonte |
| 11,021,319 B2 | 6/2021 | Fonte |
| 11,033,044 B1 | 6/2021 | Fonte et al. |
| 11,109,610 B2 | 9/2021 | Fonte et al. |
| 11,175,075 B2 | 11/2021 | Flynn et al. |
| 11,230,429 B2 | 1/2022 | Fonte et al. |
| 11,279,609 B2 | 3/2022 | Fonte et al. |
| 11,280,543 B2 | 3/2022 | Fonte et al. |
| 11,311,026 B2 | 4/2022 | Fonte et al. |
| 11,337,438 B2 | 5/2022 | Fonte et al. |
| 11,337,439 B2 | 5/2022 | Fonte et al. |
| 11,634,312 B2 | 4/2023 | Fonte et al. |
| 2001/0035016 A1 | 11/2001 | Weber et al. |
| 2001/0052294 A1 | 12/2001 | Schmed |
| 2002/0001644 A1 | 1/2002 | Busse et al. |
| 2002/0020659 A1 | 2/2002 | Sweeney et al. |
| 2002/0034572 A1 | 3/2002 | Blaschke et al. |
| 2002/0166870 A1 | 11/2002 | Martin et al. |
| 2002/0182300 A1 | 12/2002 | Groh et al. |
| 2003/0000240 A1 | 1/2003 | Pahl |
| 2003/0012864 A1 | 1/2003 | Gerber |
| 2003/0017244 A1 | 1/2003 | Blaschke et al. |
| 2003/0035876 A1 | 2/2003 | Kostival et al. |
| 2003/0084898 A1 | 5/2003 | Beckett et al. |
| 2003/0134025 A1 | 7/2003 | Vaghela et al. |
| 2004/0058037 A1 | 3/2004 | Masuda et al. |
| 2004/0161503 A1 | 8/2004 | Malone et al. |
| 2004/0211201 A1 | 10/2004 | Bischel et al. |
| 2004/0219269 A1 | 11/2004 | Cathenaut et al. |
| 2005/0098561 A1 | 5/2005 | Schwoebel |
| 2005/0178796 A1 | 8/2005 | Schraiber |
| 2005/0189375 A1 | 9/2005 | McGill |
| 2005/0193896 A1 | 9/2005 | McGill |
| 2005/0229622 A1 | 10/2005 | Franck et al. |
| 2005/0279219 A1 | 12/2005 | Turi |
| 2006/0090654 A1 | 5/2006 | Mange et al. |
| 2006/0110507 A1 | 5/2006 | Yoakinn et al. |
| 2006/0110515 A1 | 5/2006 | Waletzko et al. |
| 2006/0254429 A1 | 11/2006 | Sinton |
| 2006/0255066 A1 | 11/2006 | Damiano et al. |
| 2006/0263490 A1 | 11/2006 | Wall et al. |
| 2006/0266751 A1 | 11/2006 | Ali et al. |
| 2006/0280826 A1 | 12/2006 | Mange et al. |
| 2007/0144357 A1 | 6/2007 | Rivera |
| 2007/0160722 A1 | 7/2007 | Best et al. |
| 2007/0172562 A1 | 7/2007 | Medina Quintanilla |
| 2007/0177455 A1 | 8/2007 | Renfro |
| 2007/0181604 A1 | 8/2007 | Rusch |
| 2007/0202231 A1 | 8/2007 | Ambrogi et al. |
| 2007/0275131 A1 | 11/2007 | Bertini et al. |
| 2008/0066483 A1 | 3/2008 | Klier et al. |
| 2008/0102172 A1 | 5/2008 | Capelle et al. |
| 2008/0113069 A1 | 5/2008 | Green et al. |
| 2008/0140437 A1 | 6/2008 | Russo et al. |
| 2008/0206404 A1 | 8/2008 | Green et al. |
| 2008/0206426 A1 | 8/2008 | Rousset et al. |
| 2008/0226771 A1 | 9/2008 | Cathenaut et al. |
| 2008/0239867 A1 | 10/2008 | Gilbert |
| 2008/0282723 A1 | 11/2008 | Perrier et al. |
| 2009/0017149 A1 | 1/2009 | Richman |
| 2009/0090254 A1 | 4/2009 | Rusch |
| 2009/0110559 A1 | 4/2009 | Bell et al. |
| 2009/0110786 A1 | 4/2009 | Wells |
| 2009/0147618 A1 | 6/2009 | Kovacic et al. |
| 2009/0179042 A1 | 7/2009 | Milan et al. |
| 2009/0191318 A1 | 7/2009 | Cocchi et al. |
| 2009/0223386 A1 | 9/2009 | Edwards et al. |
| 2009/0269452 A1 | 10/2009 | Dufort |
| 2009/0291170 A1 | 11/2009 | Rousset et al. |
| 2009/0304866 A1 | 12/2009 | Bovetto et al. |
| 2010/0034937 A1 | 2/2010 | Schmitt et al. |
| 2010/0068340 A1 | 3/2010 | Wille et al. |
| 2010/0068354 A1 | 3/2010 | Roberson et al. |
| 2010/0106303 A1 | 4/2010 | Thogersen et al. |
| 2010/0108696 A1 | 5/2010 | Farrell et al. |
| 2010/0124599 A1 | 5/2010 | Saikali et al. |
| 2010/0132310 A1 | 6/2010 | Dose et al. |
| 2010/0189866 A1 | 7/2010 | Denger |
| 2010/0196551 A1 | 8/2010 | Harlaux-Pasquier et al. |
| 2010/0203202 A1 | 8/2010 | Quessette et al. |
| 2010/0203215 A1 | 8/2010 | Russo |
| 2010/0206220 A1 | 8/2010 | Belzowski et al. |
| 2010/0206875 A1 | 8/2010 | Bratsch |
| 2010/0209562 A1 | 8/2010 | Henriet et al. |
| 2010/0209571 A1 | 8/2010 | Vaghela et al. |
| 2010/0269534 A1 | 10/2010 | Kumakiri et al. |
| 2010/0285178 A1 | 11/2010 | Labbe et al. |
| 2011/0000872 A1 | 1/2011 | Aneas |
| 2011/0003041 A1 | 1/2011 | Garbi et al. |
| 2011/0027427 A1 | 2/2011 | Panyam et al. |
| 2011/0088558 A1 | 4/2011 | Farrel et al. |
| 2011/0142996 A1 | 6/2011 | Kruger |
| 2011/0217425 A1 | 9/2011 | Puaud et al. |
| 2011/0229608 A1 | 9/2011 | Plessier et al. |
| 2011/0262600 A1 | 10/2011 | McGill |
| 2011/0311703 A1 | 12/2011 | Ummadi et al. |
| 2012/0096875 A1 | 4/2012 | Ravji et al. |
| 2012/0096876 A1 | 4/2012 | Ravji et al. |
| 2012/0100271 A1 | 4/2012 | Leas et al. |
| 2012/0138621 A1 | 6/2012 | Bratsch |
| 2012/0201932 A1 | 8/2012 | Kihnke |
| 2012/0320707 A1 | 12/2012 | Planet et al. |
| 2013/0008321 A1 | 1/2013 | Bravo |
| 2013/0045310 A1 | 2/2013 | Ricco et al. |
| 2013/0052308 A1 | 2/2013 | Palzer et al. |
| 2013/0074535 A1 | 3/2013 | Schmidt |
| 2013/0098088 A1 | 4/2013 | Lin et al. |
| 2013/0101702 A1 | 4/2013 | Nalur |
| 2013/0122176 A1 | 5/2013 | Ummadi et al. |
| 2013/0129896 A1 | 5/2013 | Ummadi et al. |
| 2013/0129897 A1 | 5/2013 | Lallemand et al. |
| 2013/0136842 A1 | 5/2013 | Ummadi et al. |
| 2013/0149421 A1 | 6/2013 | Vaghela et al. |
| 2013/0152620 A1 | 6/2013 | Ugolini |

(56) References Cited

U.S. PATENT DOCUMENTS

| | | |
|---|---|---|
| 2013/0206771 A1 | 8/2013 | Arnold et al. |
| 2013/0216660 A1 | 8/2013 | Green et al. |
| 2013/0236581 A1 | 9/2013 | Mercenier et al. |
| 2013/0259975 A1 | 10/2013 | Schaffer-Lequart et al. |
| 2013/0323393 A1 | 12/2013 | Olmos et al. |
| 2013/0340456 A1 | 12/2013 | Hoare et al. |
| 2014/0000302 A1 | 1/2014 | Cocchi et al. |
| 2014/0004230 A1 | 1/2014 | Ricco et al. |
| 2014/0033969 A1 | 2/2014 | Leas et al. |
| 2014/0065270 A1 | 3/2014 | Huynh-Ba et al. |
| 2014/0083879 A1 | 3/2014 | Ulstad |
| 2014/0099422 A1 | 4/2014 | Panyam et al. |
| 2014/0106055 A1 | 4/2014 | Gamay |
| 2014/0123859 A1 | 5/2014 | Verbeek |
| 2014/0141147 A1 | 5/2014 | Dopfer et al. |
| 2014/0161940 A1 | 6/2014 | Aviles et al. |
| 2014/0178534 A1 | 6/2014 | Amend et al. |
| 2014/0197195 A1 | 7/2014 | Peuker et al. |
| 2014/0211586 A1 | 7/2014 | Conti |
| 2014/0231562 A1 | 8/2014 | Potter et al. |
| 2014/0242229 A1 | 8/2014 | Whitehouse |
| 2014/0255558 A1 | 9/2014 | Amend et al. |
| 2014/0272016 A1 | 9/2014 | Nowak |
| 2014/0335232 A1 | 11/2014 | Halachmi |
| 2014/0335255 A1 | 11/2014 | Jung et al. |
| 2014/0370173 A1 | 12/2014 | Gunes et al. |
| 2015/0017286 A1 | 1/2015 | Ural et al. |
| 2015/0040587 A1 | 2/2015 | Zisholtz et al. |
| 2015/0064330 A1 | 3/2015 | Ummadi et al. |
| 2015/0099050 A1 | 4/2015 | Ummadi et al. |
| 2015/0128619 A1 | 5/2015 | Wild |
| 2015/0140193 A1 | 5/2015 | Desai et al. |
| 2015/0157040 A1 | 6/2015 | Althaus et al. |
| 2015/0157042 A1 | 6/2015 | Amend et al. |
| 2015/0164106 A1 | 6/2015 | Ricco et al. |
| 2015/0166222 A1 | 6/2015 | Danesin et al. |
| 2015/0201646 A1 | 7/2015 | Olmos et al. |
| 2015/0201810 A1 | 7/2015 | Sands |
| 2015/0219506 A1 | 8/2015 | Izadi-Zamanabadi et al. |
| 2015/0245638 A1 | 9/2015 | Ummadi et al. |
| 2015/0282502 A1 | 10/2015 | Ummadi et al. |
| 2015/0289538 A1 | 10/2015 | Ummadi et al. |
| 2015/0289540 A1 | 10/2015 | Imer |
| 2015/0296831 A1 | 10/2015 | Noth et al. |
| 2015/0296833 A1 | 10/2015 | Ummadi et al. |
| 2015/0327571 A1 | 11/2015 | Amend |
| 2015/0329282 A1 | 11/2015 | Bartoli et al. |
| 2015/0351426 A1 | 12/2015 | Ricco et al. |
| 2015/0351430 A1 | 12/2015 | Pipe et al. |
| 2015/0353261 A1 | 12/2015 | Gupta |
| 2016/0051081 A1 | 2/2016 | Grassia et al. |
| 2016/0135479 A1 | 5/2016 | Ummadi et al. |
| 2016/0176624 A1 | 6/2016 | Talon |
| 2016/0192675 A1 | 7/2016 | Abu-Ali |
| 2016/0213026 A1 | 7/2016 | Lepagnol et al. |
| 2016/0214787 A1 | 7/2016 | Iotti |
| 2016/0235089 A1 | 8/2016 | Ricco et al. |
| 2016/0255858 A1 | 9/2016 | Noth et al. |
| 2016/0270424 A1 | 9/2016 | Noth et al. |
| 2016/0278401 A1 | 9/2016 | Noth et al. |
| 2016/0309739 A1 | 10/2016 | Chandrsekaran |
| 2016/0309740 A1 | 10/2016 | Bunce et al. |
| 2016/0309741 A1 | 10/2016 | Zhou et al. |
| 2016/0309742 A1 | 10/2016 | Ma et al. |
| 2016/0316778 A1 | 11/2016 | Nagy et al. |
| 2016/0316784 A1 | 11/2016 | Chandrasekaran |
| 2016/0332188 A1 | 11/2016 | Agnello |
| 2016/0338378 A1 | 11/2016 | Ummadi et al. |
| 2016/0347525 A1 | 12/2016 | Butscher et al. |
| 2017/0000162 A1 | 1/2017 | Lallemand et al. |
| 2017/0042182 A1 | 2/2017 | Olmos et al. |
| 2017/0042183 A1 | 2/2017 | Puaud et al. |
| 2017/0042184 A1 | 2/2017 | Olmos et al. |
| 2017/0079305 A1 | 3/2017 | Barniol Gutierrez et al. |
| 2017/0112326 A1 | 4/2017 | Ochoa et al. |
| 2017/0173544 A1 | 6/2017 | Laby |
| 2017/0183210 A1 | 6/2017 | Wyatt et al. |
| 2017/0188600 A1 | 7/2017 | Scharfman et al. |
| 2017/0215456 A1 | 8/2017 | Noth et al. |
| 2017/0217648 A1 | 8/2017 | Bouzaid et al. |
| 2017/0225879 A1 | 8/2017 | Stein et al. |
| 2017/0265495 A1 | 9/2017 | Amend |
| 2017/0275086 A1 | 9/2017 | Perentes et al. |
| 2017/0275088 A1 | 9/2017 | Bouzaid et al. |
| 2017/0280745 A1 | 10/2017 | Herbert et al. |
| 2017/0318833 A1 | 11/2017 | Curschellas et al. |
| 2017/0318995 A1 | 11/2017 | Rai |
| 2017/0326749 A1 | 11/2017 | Amend |
| 2017/0332656 A1 | 11/2017 | Amend |
| 2017/0332844 A1 | 11/2017 | Behar et al. |
| 2017/0339976 A1 | 11/2017 | Amend |
| 2017/0360061 A1 | 12/2017 | Fonte |
| 2017/0367371 A1 | 12/2017 | Lebleu et al. |
| 2018/0008087 A1 | 1/2018 | Miller et al. |
| 2018/0042258 A1 | 2/2018 | Roberts et al. |
| 2018/0042279 A1 | 2/2018 | Kerler et al. |
| 2018/0056256 A1 | 3/2018 | Sun et al. |
| 2018/0064127 A1 | 3/2018 | Chisholm et al. |
| 2018/0064131 A1 | 3/2018 | Noth |
| 2018/0064132 A1 | 3/2018 | Noth |
| 2018/0066887 A1* | 3/2018 | MacKey ............... F25D 31/006 |
| 2018/0084800 A1 | 3/2018 | Noth |
| 2018/0092378 A1 | 4/2018 | Webering et al. |
| 2018/0117545 A1 | 5/2018 | Noth |
| 2018/0141011 A1 | 5/2018 | Mou |
| 2018/0146695 A1 | 5/2018 | Amend et al. |
| 2018/0146699 A1 | 5/2018 | Vafeiadi et al. |
| 2018/0169599 A1 | 6/2018 | Ahmad et al. |
| 2018/0177545 A1 | 6/2018 | Boudreaux et al. |
| 2018/0199760 A1 | 7/2018 | Rai |
| 2018/0213816 A1 | 8/2018 | Amend |
| 2018/0263274 A1 | 9/2018 | Ray et al. |
| 2018/0271115 A1 | 9/2018 | Ray et al. |
| 2019/0021548 A1 | 1/2019 | Eisner |
| 2019/0029248 A1 | 1/2019 | Cutting |
| 2019/0053513 A1 | 2/2019 | Halachmi |
| 2019/0053514 A1 | 2/2019 | Fonte et al. |
| 2019/0069725 A1 | 3/2019 | Wang et al. |
| 2019/0239534 A1 | 8/2019 | Halachmi |
| 2019/0254307 A1 | 8/2019 | Noth et al. |
| 2019/0269148 A1 | 9/2019 | Bouzaid et al. |
| 2019/0270555 A1 | 9/2019 | Noth et al. |
| 2019/0291947 A1 | 9/2019 | Kruger |
| 2019/0313665 A1 | 10/2019 | Fonte |
| 2019/0320679 A1 | 10/2019 | Halachmi |
| 2019/0325182 A1 | 10/2019 | Noth et al. |
| 2019/0329948 A1 | 10/2019 | Ritzenhoff et al. |
| 2019/0330038 A1 | 10/2019 | Melrose |
| 2019/0344955 A1 | 11/2019 | Fonte |
| 2019/0357564 A1 | 11/2019 | Yang et al. |
| 2020/0022382 A1 | 1/2020 | Fonte |
| 2020/0055664 A1 | 2/2020 | Fonte et al. |
| 2020/0055665 A1 | 2/2020 | Fonte et al. |
| 2020/0056814 A1 | 2/2020 | Fonte et al. |
| 2020/0056834 A1 | 2/2020 | Fonte et al. |
| 2020/0056835 A1 | 2/2020 | Fonte et al. |
| 2020/0146308 A1 | 5/2020 | Roberts et al. |
| 2020/0146311 A1 | 5/2020 | Halachmi |
| 2020/0245818 A1 | 8/2020 | Halkes et al. |
| 2020/0292212 A1 | 9/2020 | Fonte et al. |
| 2020/0292229 A1 | 9/2020 | Fonte et al. |
| 2020/0315206 A1 | 10/2020 | Fonte |
| 2020/0326124 A1 | 10/2020 | Fonte et al. |
| 2020/0333056 A1 | 10/2020 | Ito et al. |
| 2020/0378659 A1 | 12/2020 | Novak et al. |
| 2021/0002066 A1 | 1/2021 | Fonte |
| 2021/0002067 A1 | 1/2021 | Fonte |
| 2021/0003342 A1 | 1/2021 | Fonte et al. |
| 2021/0007370 A1 | 1/2021 | Fonte |
| 2021/0032015 A1 | 2/2021 | Fonte |
| 2021/0076694 A1 | 3/2021 | Prewett et al. |
| 2021/0084930 A1 | 3/2021 | Fonte |
| 2021/0127706 A1 | 5/2021 | Fonte |
| 2021/0130083 A1 | 5/2021 | Fonte et al. |

(56) References Cited

U.S. PATENT DOCUMENTS

| | | |
|---|---|---|
| 2021/0212337 A1 | 7/2021 | Fonte et al. |
| 2021/0212338 A1 | 7/2021 | Fonte et al. |
| 2021/0325105 A1 | 10/2021 | Fonte et al. |
| 2021/0368819 A1 | 12/2021 | Fonte et al. |
| 2021/0368820 A1 | 12/2021 | Fonte et al. |
| 2021/0371265 A1 | 12/2021 | Fonte et al. |
| 2022/0127070 A1 | 4/2022 | Fonte et al. |
| 2022/0212912 A1 | 7/2022 | Fonte et al. |

FOREIGN PATENT DOCUMENTS

| | | |
|---|---|---|
| CN | 110325804 A | 10/2019 |
| CN | 110895089 | 3/2020 |
| DE | 1211905 | 3/1966 |
| DE | 202004005357 | 7/2004 |
| EP | 0471904 | 2/1992 |
| EP | 1009678 | 6/2000 |
| EP | 1139837 | 10/2001 |
| EP | 1415543 | 5/2004 |
| EP | 1907300 | 4/2008 |
| EP | 2266418 | 12/2010 |
| EP | 2281464 | 2/2011 |
| EP | 2679100 | 1/2014 |
| EP | 2775855 | 9/2014 |
| EP | 3044125 | 7/2016 |
| EP | 3160870 | 5/2017 |
| FR | 2501009 | 9/1982 |
| FR | 2501080 | 9/1982 |
| GB | 978808 | 12/1964 |
| JP | S60125482 U | 8/1985 |
| JP | H11-507295 | 6/1999 |
| JP | H11287545 A | 10/1999 |
| JP | 2002/068304 | 3/2002 |
| JP | 2005/318869 | 11/2005 |
| JP | 2005-326057 A | 11/2005 |
| JP | 2006/027662 | 2/2006 |
| TW | M553118 U | 12/2017 |
| WO | WO 1996/001224 | 1/1996 |
| WO | WO 1998/046486 | 10/1998 |
| WO | WO 2004/054380 | 7/2004 |
| WO | WO 2010/103483 | 9/2010 |
| WO | WO 2010/149509 | 12/2010 |
| WO | WO 2013/121421 | 8/2013 |
| WO | WO 2015/063092 | 5/2015 |
| WO | WO 2015/063094 | 5/2015 |
| WO | WO 2015/077825 | 6/2015 |
| WO | WO 2015/169841 | 11/2015 |
| WO | WO 2016/079641 | 5/2016 |
| WO | WO 2016/081477 | 5/2016 |
| WO | WO 2017/087970 | 5/2017 |
| WO | WO 2017/139395 | 8/2017 |
| WO | WO 2017/176580 | 10/2017 |
| WO | WO 2017/214357 | 12/2017 |
| WO | WO 2018/109765 | 6/2018 |
| WO | WO 2019/117804 | 6/2019 |
| WO | WO 2019/140251 | 7/2019 |
| WO | WO 2019/171588 | 9/2019 |
| WO | WO 2020/037287 | 2/2020 |
| WO | WO 2020/037293 | 2/2020 |
| WO | WO 2020/037296 | 2/2020 |
| WO | WO 2020/039439 | 2/2020 |
| WO | WO 2020/053859 | 3/2020 |
| WO | WO 2020/089919 | 5/2020 |
| WO | WO 2020/163369 | 8/2020 |

OTHER PUBLICATIONS

KR Office Action in Korean Appln. No. 10-2022-7046042, mailed on Feb. 25, 2024, 14 pages (with English translation).
KR Office Action in Korean Appln. No. 10-2022-7046042, dated Jun. 21, 2023, 5 pages (with English translation).
JP Japanese Office Action in Japanese Appln. No. 2022-573708, dated Jun. 13, 2023, 36 pages (with English translation).
CA Office Action in Canadian Appln. No. 3,185,484, dated May 5, 2023, 3 pages.
Allpax, "Shaka Retorts 1300 and 1600," 2020, retrieved Apr. 16, 2020 from URL <https://www.allpax.com/products/production-shaka-retorts/>, 4 pages.
Arellano et al., "Online ice crystal size measurements during sorbet freezing by means of the focused beam reflectance measurement (FBRM) technology," Influence of Operating Conditions, Journal of Food Engineering, Nov. 1, 2012, 113(2):351-9.
CA Office Action in Canadian Appln. No. 3,185,484, dated Feb. 2, 2023, 3 pages.
Caldwell et al., "A low-temperature scanning electron microscopy study of ice cream. II. Influence of selected ingredients and processes," Food Structure, 1992; 11(1):2, 10 pages.
Cook et al., "Mechanisms of Ice Crystallization in Ice Cream production," Comprehensive Reviews in Food Science and Food safety, Mar. 2010, 9(2):213-22.
Design Integrated Technology, "Propellant Equipment Used by Arsenals Worldwide," 2016, retrieved on Apr. 16, 2020 from URL <https://www.ditusa.com/sc_helicone_mixers.php>, 3 pages.
Drewett et al., "Ice crystallization in a scraped surface freezer," Journal of Food Engineering, Feb. 1, 2007, 78(3):1060-6.
EP European Office Action by European Appln. No. 19762064.4, dated Oct. 25, 2021, 10 pages.
EP European Search Report in European Appln. No. 21181499.1, dated Nov. 3, 2021, 14 pages.
EP European Search Report in European Appln. No. 21199240.9, dated Feb. 2, 2022, 13 pages.
EP European Search Report in European Appln. No. 21199244.1, dated Feb. 2, 2022, 13 pages.
EP European Search Report in European Appln. No. 21199245.8, dated Feb. 2, 2022, 12 pages.
EP European Search Report in European Appln. No. 21199250.8, dated Feb. 2, 2022, 13 pages.
EP European Search Report in European Appln. No. 21199252.4, dated Feb. 2, 2022, 11 pages.
EP European Search Report in European Appln. No. 21199271.4, dated Feb. 2, 2022, 8 pages.
EP Extended Search Report in European Appln. No. 17814210.5, dated Jan. 24, 2020, 11 pages.
EP Office Action by European Appln. No. 19762063.6, dated Feb. 11, 2022, 6 pages.
Gonzalez-Ramirez et al., "Moments model for a continuous sorbet crystallization process," The 23rd IIR International Congress of Refrigeration, Refrigeration for Sustainable Development, Prague, Czech Republic, Aug. 2011, 21-6.
Hagiwara et al., "Effect of sweetener, stabilizer, and storage temperature on ice recrystallization in ice cream," Journal of Dairy Science, May 1, 1996, 79(5):735-44.
Hosford et al., "The aluminum beverage can," Scientific American, Sep. 1, 1994, 271(3):48-53.
Ice Cream Science, "How Long Does Homemade Ice Cream Last in the Freezer," Jun. 3, 2016, retrieved Apr. 16, 2020 from URL <http://icecreamscience.com/long-ice-cream-last-freezer/>, 18 pages.
Ice Cream Science, "Ice Crystals in Ice Cream," Oct. 20, 2016, retrieved on Apr. 16, 2020 from URL <http://icecreamscience.com/ice-crystals-in-ice-cream/>, 18 pages.
Ice Cream, 2nd Edition, Arbuckle, 1972, pp. 96 and 240.
Inoue et al., "Modeling of the effect of freezer conditions on the principal constituent parameters of ice cream by using response surface methodology," Journal of Dairy Science, May 1, 2008, 91(5):1722-32.
JP Office Action in Japanese Appln. No. 2019-518176, dated Jan. 6, 2021, 8 pages (with English translation).
PCT Authorized Officer Gwenaelle Llorca, European Patent Office, International Application No. PCT/US2019/013286, "Invitation to Pay Additional Fees and, Where Applicable, Protest Fee", International Searching Authority, Apr. 4, 2019, 16 pages.
PCT International Preliminary Report on Patentability in International Appln. No. PCT/US17/37972, dated Dec. 18, 2018, 12 pages.
PCT International Preliminary Report on Patentability in International Appln. No. PCT/US2019/046946, dated Feb. 23, 2021, 16 pages.

(56) References Cited

OTHER PUBLICATIONS

PCT International Preliminary Report on Patentability in International Appln. No. PCT/US2019/046954, dated Feb. 23, 2021, 14 pages.
PCT International Preliminary Report on Patentability in International Appln. No. PCT/US2019/046958, dated Feb. 23, 2021, 17 pages.
PCT International Preliminary Report on Patentability in International Appln. No. PCT/US2020/051664, dated Mar. 31, 2022, 12 pages.
PCT International Preliminary Report on Patentability in International Appln. No. PCT/US2021/035260, dated Dec. 6, 2022, 11 pages.
PCT International Report on Patentability in International Appln. No. PCT/2019/013286, dated Jul. 23, 2020, 16 pages.
PCT International Search Report and Written Opinion in International Appln. No. PCT/US17/37972, dated Oct. 27, 2017, 16 pages.
PCT International Search Report and Written Opinion in International Appln. No. PCT/US2019/013286, dated May 31, 2019, 21 pages.
PCT International Search Report and Written Opinion in International Appln. No. PCT/US2019/046946, dated Jan. 24, 2020, 24 pages.
PCT International Search Report and Written Opinion in International Appln. No. PCT/US2019/046954, dated Nov. 21, 2019, 20 pages.
PCT International Search Report and Written Opinion in International Appln. No. PCT/US2019/046958, dated Jan. 24, 2020, 25 pages.
PCT International Search Report and Written Opinion in International Appln. No. PCT/US2020/051664, dated Dec. 17, 2020, 44 pages.
PCT International Search Report and Written Opinion in International Appln. No. PCT/US2021/013619, dated Jun. 2, 2021, 15 pages.
PCT International Search Report and Written Opinion in International Appln. No. PCT/US2021/035260, dated Oct. 1, 2021, 18 pages.
PCT International Search Report and Written Opinion in International Appln. No. PCT/US2022/070483, dated May 23, 2022, 15 pages.
PCT Invitation to Pay Additional Fees in International Appln. No. PCT/US2019/046946, dated Dec. 2, 2019, 19 pages.
Reichart, "Speed of Dasher and Scraper as Affecting the Quality of Ice Cream and Sherbet," Journal of Dairy Science, Mar. 1, 1931, 14(2):107-15.
Shaka Process, "Higher Quality Ambient Foods," 2018, retrieved Apr. 16, 2020 from URL <http://shakaprocess.com/>, 2 pages.
Tetra Pak Homogenizers, "Ice Cream Homogenization for Sounds Performance," 2014, retrieved Apr. 16, 2020 from URL <https://assets.tetrapak.com/static/documents/tetra_pak_homogenizers_br_63880_low.pdf>, 4 pages.
US Notice of Allowance in U.S. Appl. No. 16/592,031, dated Jan. 10, 2020, 8 pages.
Waste Management Inc. et al "Tip: Aluminum Trays and Pans Are Recyclable," Nov. 2016 pp. 1-2 https://www.stocktonrecycles.conn/alunninunn-trays-pans-recyclable/.
Xiao-Wim, "This New Kitchen Gadget Makes Fro-Yo in Minutes", by Bloomberg, Aug. 8, 2017, 4 pages, http://fortune.com/2017/08/08/wim-frozen-yogurt-minutes/ Oct. 12, 2018.
Office Action in Chinese Appln. No. 202180040306.8, mailed Dec. 20, 2024, 20 pages (with English translation).
Office Action in Taiwanese Appln. No. 110119679, mailed on Dec. 12, 2024, 14 pages (with partial English translation).

* cited by examiner

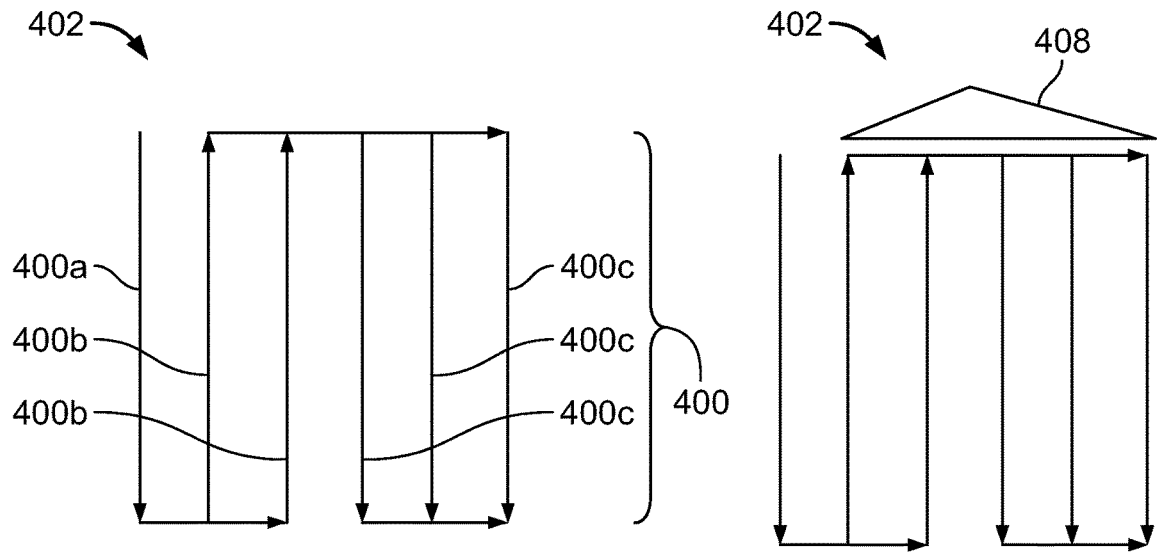
FIG. 20A
FIG. 20B
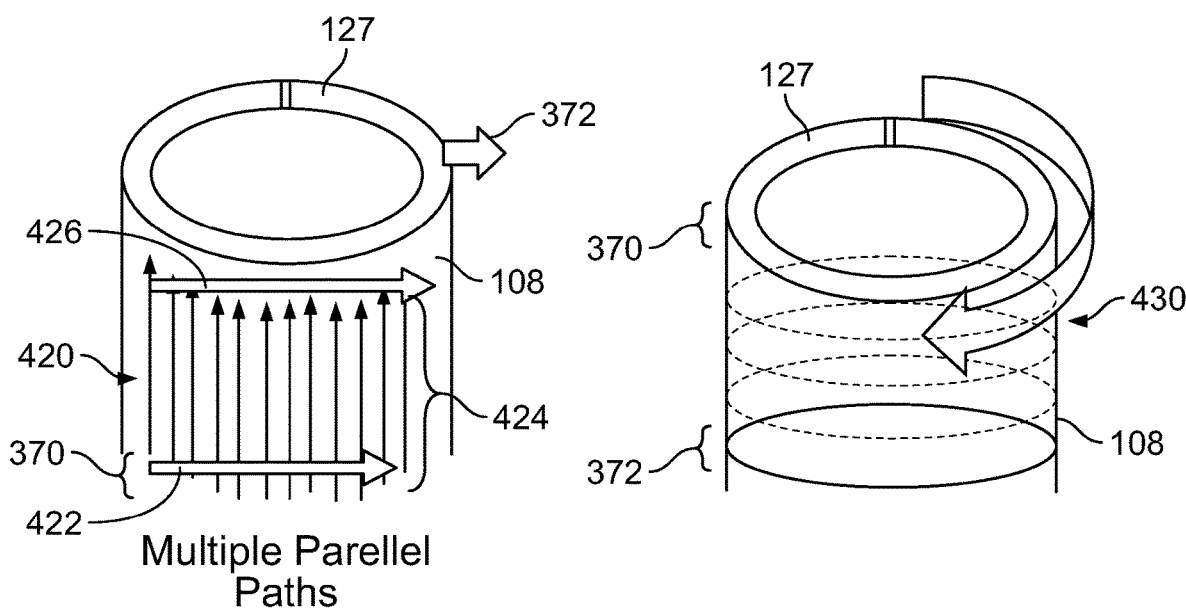
FIG. 20C
Multiple Parellel Paths
FIG. 20D Overlay Clad Inlay Clad Edge Clad

REFRIGERATION SYSTEMS FOR RAPIDLY COOLING FOOD AND DRINKS

CROSS-REFERENCE TO RELATED APPLICATIONS

This application is a continuation application of and claims the benefit of priority under 35 USC § 120 to U.S. application Ser. No. 17/700,200, filed on Mar. 21, 2022, which is a continuation of U.S. application Ser. No. 17/335,891, filed on Jun. 1, 2021, issued as U.S. Pat. No. 11,279,609, which claims priority under 35 USC § 119(e) to U.S. Patent Application Ser. No. 63/033,059, filed on Jun. 1, 2020, the entire contents of which are hereby incorporated by reference.

TECHNICAL FIELD

This disclosure relates to systems and methods for rapidly cooling food and drinks.

BACKGROUND

Beverage brewing systems have been developed that rapidly prepare single servings of hot beverages. Some of these brewing systems rely on single use pods to which water is added before brewing occurs. The pods can be used to prepare hot coffees, teas, cocoas, and dairy-based beverages.

Home use ice cream makers can be used to make larger batches (e.g., 1.5 quarts or more) of ice cream for personal consumption. These ice cream maker appliances typically prepare the mixture by employing a hand-crank method or by employing an electric motor that is used, in turn, to assist in churning the ingredients within the appliance. The resulting preparation is often chilled using a pre-cooled vessel that is inserted into the machine.

SUMMARY

This specification describes systems and methods for rapidly cooling food and drinks. Some of these systems and methods can cool food and drinks in a container inserted into a counter-top or installed machine from room temperature to freezing in less than two minutes. For example, the approach described in this specification has successfully demonstrated the ability to make soft-serve ice cream from room-temperature pods in approximately 90 seconds. This approach has also been used to chill cocktails and other drinks including to produce frozen drinks. These systems and methods are based on a refrigeration cycle (or freezing cycle) with low startup times and a pod-machine interface that is easy to use and provides extremely efficient heat transfer. Some of the pods described are filled with ingredients in a manufacturing line and subjected to a sterilization process (e.g., retort, aseptic packaging, ultra-high temperature processing (UHT), ultra-heat treatment, ultra-pasteurization, or high pressure processing (HPP)). HPP is a cold pasteurization technique by which products, already sealed in its final package, are introduced into a vessel and subjected to a high level of isostatic pressure (300-600 megapascals (MPa) (43,500-87,000 pounds per square inch (psi)) transmitted by water. The pods can be used to store ingredients including, for example, dairy products at room temperature for long periods of time (e.g., 9-12 months) following sterilization.

Cooling is used to indicate the transfer of thermal energy to reduce the temperature, for example, of ingredients contained in a pod. In some cases, cooling indicates the transfer of thermal energy to reduce the temperature, for example, of ingredients contained in a pod to below freezing.

The refrigeration systems of this disclosure strike a balance between freezing the ingredients within the pod as quickly as possible while reducing risk of damage to the compressor, dealing with the transient nature of freezing a serving of ice cream on-demand (i.e., a lot of heat transfer at the start of the process and less heat transfer at the end) and minimizing the size of the refrigeration system. For example, increasing the mass of refrigerant within the refrigeration system enables the evaporator to exchange more heat with the pod and freeze the ingredients within the pod faster. However, if the refrigerant exits the evaporator and returns to the compressor as a liquid-gas mixture (e.g., because not all the refrigerant was used in the exchange of heat from the pod to the evaporator) then this liquid-gas mixture returning to the compressor can damage the compressor because compressors are designed to receive 100% gas. If liquid refrigerant returns to the compressor, the liquid is non-compressible and this reduces efficiency of the refrigeration system by limiting how much gas can be compressed by the compressor. On the other hand, an undersized refrigeration system will generally take longer to cool a pod to below the freezing temperature of the ingredients, and in some cases, would not have enough refrigerant to transfer the required heat from the pod. An undersized system is characterized by a substantial portion of the evaporator being above the freezing point of ice cream for some portion of the freezing process. In the case of an undersized system, a remedy is using a larger compressor but this adds weight, size and increased power draw to the machine. For example, in some cases, 700 W-900 W of freezing occurs within during the freezing cycle and the refrigerant needs to absorb this thermal energy in order to freeze the ingredients of the pod during the freezing cycle.

Some conventional refrigeration systems are based on industrial air conditional systems that always maintain a temperature difference between the refrigerant passing through the inlet of the evaporator and the refrigerant passing through the outlet of the evaporator. This temperature difference is largely a function of the heat load being relatively constant over time. This difference also ensures that the refrigerant returning to a compressor is 100% gas. As noted above, this is to reduce the risk of damage to the compressor. In some cases, the machines described in this disclosure allow the temperature difference to converge to be substantially similar (e.g., less than a 5° C. difference) toward the end of the freezing cycle (e.g., by the end of the freezing cycle or during at least part of the second half of the freezing cycle). This convergence is caused in part by the transient nature of freezing a serving of ice cream on-demand. While this convergence generally means that some liquid-gas mixture returns to the compressor, this is a trade-off that is made in the machines described in this disclosure in order to freeze the ingredients of the pod as quickly as possible (e.g., within 2 minutes and sometimes within 1 minute, depending on the ingredients within the pod).

Some machines with a refrigeration system to cool food or drink in a pod include: an evaporator of the refrigeration system, the evaporator defining a receptacle sized to receive the pod, the evaporator including an inlet port to receive refrigerant and an outlet port to discharge refrigerant. The refrigeration system is operable to apply a freezing cycle to the food or drink in which refrigerant flows through the evaporator exchanging heat from ingredients in the pod to the refrigerant causing a temperature difference between an evaporator inlet temperature and an evaporator outlet temperature. The temperature difference between the evaporator inlet temperature and the evaporator outlet temperature is greater than 15° C. within 20 seconds of beginning the freezing cycle. The temperature difference between the evaporator inlet temperature and the evaporator outlet temperature is less than 5° C. by the end of the freezing cycle.

Some machines with a refrigeration system to cool food or drink in a pod include: an evaporator of the refrigeration system, the evaporator defining a receptacle sized to receive the pod, the evaporator including an inlet port to receive refrigerant and an outlet port to discharge refrigerant. The refrigeration system is operable to apply a freezing cycle to the food or drink in which refrigerant flows through the evaporator exchanging heat from ingredients in the pod to the refrigerant causing a temperature difference between an evaporator inlet temperature and an evaporator outlet temperature. The refrigerant passes through the outlet port of the evaporator and becomes superheated during at least part of a first half of the freezing cycle. The refrigerant passes through the outlet port of the evaporator in a non-superheated state during a second half of the freezing cycle.

Some machines with a refrigeration system to cool food or drink in a pod include: an evaporator of the refrigeration system, the evaporator defining a receptacle sized to receive the pod, the evaporator including an inlet port to receive refrigerant and an outlet port to discharge refrigerant; and a motor operable to rotate a mixing paddle in the pod in a first direction, wherein the refrigerant flows from the inlet port to the outlet port in a second direction opposite to the first direction. The motor causes the mixing paddle in the pod to rotate at a rotational speed of greater than 200 RPM. The machine causes the cooled food or drink to be dispensed into a container or cone without coming into contact with other portions of the machine.

Some machines with a refrigeration system to cool food or drink in a pod include: an evaporator of the refrigeration system, the evaporator defining a receptacle sized to receive the pod, the evaporator including an inlet port to receive refrigerant and an outlet port to discharge refrigerant; a motor operable to rotate a mixing paddle in the pod at a rotational speed of greater than 200 RPM; a dispenser configured to engage with the pod to allow the cooled food or drink to be dispensed from the pod. The cooled food or drink is dispensed at a dispensing temperature or draw temperature of between 26.6° F. and 5.0° F. The cooled and dispensed food or drink is composed of ice crystals with a mean size of less than 50 μm.

Some machines to freeze liquid food or drink within a pod include: a refrigeration system comprising an evaporator defining a receptacle sized to receive the pod; and a charge reservoir in fluid communication with the refrigeration system, the charge reservoir operable to inject refrigerant into the refrigeration system and configured to withdraw refrigerant from the refrigeration system.

Some evaporators for refrigeration systems include: walls defining a receptacle sized to receive a pod; an inlet port to receive refrigerant; an outlet port to discharge refrigerant; and one or more thermoelectric coolers thermally attached to the evaporator, each thermoelectric cooler configured to transfer thermal energy between a first side and a second side, the first side thermally attached to the evaporator and the second side thermally attached to a refrigerant channel downstream of the outlet port.

Embodiments of these machines can include one or more of the following features.

In some embodiments, a cooler sidewall region of the pod is in direct contact with a portion of the evaporator having a temperature below a freezing temperature of the ingredients within the pod and wherein a warmer sidewall region of the pod is in direct contact with a portion of the evaporator having a temperature above the freezing temperature of the ingredients within the pod. In some cases, a temperature along an inner surface of evaporator increases along a circumferential direction during the freezing cycle.

In some embodiments, the freezing cycle has a duration between 30 seconds and 3 minutes. In some cases, the freezing cycle has a duration of less than 1 minute. In some cases, the freezing cycle has a duration of 1 minute. In some cases, the freezing cycle has a duration of less than 2 minutes. In some cases, the freezing cycle has a duration of 2 minutes.

In some embodiments, the machines include a motor operable to rotate a mixing paddle in a first direction during the freezing cycle, the mixing paddle operable to churn ingredients within the pod during the freezing cycle. In some cases, refrigerant flows from the inlet port to the outlet port in a second direction opposite to the first direction during the freezing cycle. In some cases, the motor causes the mixing paddle to rotate in the pod in a first direction and the refrigerant flows from the inlet port to the outlet port in the same direction as the mixing paddle.

In some cases, the mixing paddle is caused to move in a first direction opposite to the second direction of the refrigerant in order to transfer some quantity of warmer food or drink from the region of the pod adjacent to the refrigerant outlet port to the region of the pod adjacent to the refrigerant inlet port. In some cases, the mixing paddle is caused to move in a first direction opposite to the second direction of the refrigerant in order to improve the overall heat transfer process and reduce the time it takes to cool the food or drink in the pod.

In some embodiments, the temperature difference between the evaporator inlet temperature and the evaporator outlet temperature is at least 25° C. during an initial 20 seconds of the freezing cycle.

In some embodiments, the temperature of the evaporator inlet and the temperature of the evaporator outlet converge to become substantially similar by the end of the freezing cycle.

In some embodiments, the temperature difference between the evaporator inlet temperature and the evaporator outlet temperature of less than 5° C. is maintained for a remainder of the freezing cycle.

In some embodiments, the refrigerant in the machine is operable to freeze at least 90% of the ingredients within the pod during the freezing cycle. In some cases, the refrigerant in the machine is operable to freeze all the ingredients within the pod during the freezing cycle. In some cases, a weight of the refrigerant is between 70 grams and 150 grams. In some cases, a weight of the refrigerant is between 85 grams and 95 grams. In some cases, the refrigerant is propylene. In some cases, a weight of ingredients within the pod is between 5 and 10 ounces.

In some embodiments, a weight of the refrigerant in the machine is appropriate to freeze between 5 and 10 ounces of food or drink in the pod. In some cases, the weight of the refrigerant in the machine is appropriate to freeze between 7 and 9 ounces of food or drink in the pod.

In some embodiments, a weight of the refrigerant in the machine is appropriate to cause the refrigerant to become superheated during at least part of the first half of the freezing cycle.

In some embodiments, a weight of the refrigerant in the machine is appropriate to prevent the refrigerant from becoming superheated during the second half of the freezing cycle.

In some embodiments, a weight of the refrigerant in the machine is appropriately selected to cause the temperature difference between the evaporator inlet temperature and the evaporator outlet temperature to be greater than 15° C. towards the beginning of the freezing cycle, and the temperature difference between the evaporator inlet temperature and the evaporator outlet temperature to converge and become substantially similar towards the end of the freezing cycle.

In some embodiments, the machines include a dispenser to allow the cooled food or drink to be dispensed from the pod. In some cases, the cooled food or drink is dispensed at a temperature between 26.6° F. and 17.6° F. In some cases, the cooled food or drink includes alcohol and is dispensed at a temperature between 17.6° F. and 5.0° F. In some cases, the cooled and dispensed food or drink is composed of ice crystals with a mean size of less than 50 µm. In some cases, the dispensed food or drink is composed of ice crystals with a mean size of less than 40 µm.

In some embodiments, the refrigeration system includes a compressor, a condenser, and a capillary tube or expansion valve in fluid communication with each other.

In some embodiments, the refrigeration system includes a bypass channel that fluidly connects a compressor of the machine to the inlet port of the evaporator. In some cases, the bypass channel assists in defrosting the evaporator at the end of the freezing cycle to release the pod from the evaporator.

In some embodiments, the refrigerant becomes superheated during all of the first half of the freezing cycle.

In some embodiments, the refrigerant passes through the outlet port of the evaporator in a non-superheated state during all of the second half of the freezing cycle.

In some embodiments, the machine includes a capillary tube heat exchanger.

In some embodiments, the refrigeration system includes a computer-controlled valve fluidly connecting the charge reservoir to the refrigeration system. In some cases, the refrigeration system is part of a machine for making frozen liquid or drinks. In some cases, a processor of the machine is configured to open the computer-controlled valve at a beginning of a freezing cycle and close the computer-controlled valve at an end of the freezing cycle.

In some embodiments, the charge reservoir comprises a piston slidably attached within the charge reservoir to push refrigerant into the refrigeration system and siphon refrigerant from the refrigeration system.

In some embodiments, the charge reservoir comprises one or more air bellows attached within the charge reservoir to push refrigerant into the refrigeration system and siphon refrigerant from the refrigeration system.

In some embodiments, the pod includes liquid ice cream and the evaporator is part of a machine for making frozen ice cream.

In some embodiments, each of the one or more thermoelectric coolers is vertically arranged on an outside surface of the evaporator.

In some embodiments, each thermoelectric cooler is connected to an outside surface of the evaporator using a metallic heat spreader.

In some embodiments, the evaporator includes a first temperature sensor operable to measure a refrigerant temperature at the inlet port of the evaporator and a second temperature sensor operable to measure a refrigerant temperature at the outlet port. In some cases, a processor of a machine is operable to monitor the refrigerant temperatures measured by the first temperature sensor and the second temperature sensor and the processor is configured to activate and deactivate the one or more thermoelectric coolers based on the measured refrigerant temperatures. In some cases, the processor of a machine is operable to activate the one or more thermoelectric coolers when the evaporator is transferring heat from the pod to the evaporator and a portion of the evaporator abutting the pod is above a freezing temperature of ice cream.

The systems and methods described in this specification can provide a number of advantages.

Some refrigeration systems of the machines in this disclosure use propylene refrigerant because propylene refrigerant has good volumetric efficiency. While propylene refrigerant is commonly used for cryogenic applications, the inventors discovered that it works great for freezing ice cream quickly while also allowing the compressor to be smaller than if other refrigerants were used (e.g., Freon™). This allows the machines to be very compact for countertop consumer applications. In some cases, the machines require only 88 grams of propylene refrigerant in order to freeze at least 90% of the ingredients within the pod (e.g., all of the ingredients within the pod) within a freezing cycle (e.g., within a 2 minute freezing cycle and sometimes within a 1 minute freezing cycle).

Some embodiments of these systems and methods can provide single servings of cooled food or drink. This approach can help consumers with portion control. Some embodiments of these systems and methods can provide consumers the ability to choose their single-serving flavors, for example, of soft serve ice cream. Some embodiments of these systems and methods incorporate shelf-stable pods that do not require pre-cooling, pre-freezing or other preparation. Some embodiments of these systems and methods can generate frozen food or drinks from room-temperature pods in less than two minutes (in some cases, less than one minute). Some embodiments of these systems and methods do not require post-processing clean up once the cooled or frozen food or drink is generated. Some embodiments of these systems and methods utilize aluminum pods that are recyclable.

Some embodiments of these systems provide one or more thermoelectric coolers to be attached to the evaporator to freeze ice cream faster. This is particularly advantageous at the beginning of the freezing cycle when the transfer of heat from the ice cream to the evaporator is focused near the refrigerant inlet location and little to no heat transfer occurs near the refrigerant outlet location. By attaching a thermoelectric cooler near the evaporator outlet location, the ice cream transfers heat through the evaporator to the thermoelectric cooler and reduces the freezing time of the ice cream.

Some embodiments of these systems provide the mixing paddle to rotate counter to the direction refrigerant flows through the evaporator. This allows warm ice cream near the warmer evaporator outlet location to be scrapped and moved to the cooler evaporator inlet location. This allows heat transfer to effectively mix throughout the ice cream and in some cases, allows the ice cream to freeze 1-2% faster than by rotating the mixing paddle in the direction of the refrigerant.

Some embodiments of these systems provide multiple parallel channels through the evaporator to improve heat transfer. Some embodiments of these systems provide "S" shaped channels through the evaporator to improve heat transfer.

Some embodiments of these systems allow the ability to defrost an evaporator of a machine using a thermoelectric cooler. This allows the evaporator to defrost faster than using a bypass line from the compressor alone.

Some embodiments of these systems provide a charge reservoir to store extra refrigerant that is used to inject refrigerant into the refrigeration system when the evaporator is not effectively freezing the ice cream (i.e., the refrigeration system is undersized, as in the first part of the refrigeration cycle where a portion of the evaporator is above the freezing point of ice cream). This allows the refrigeration system to freeze the ice cream faster by providing more thermal mass to store thermal energy in the refrigeration system. The charge reservoir is also used to withdraw refrigerant from the refrigeration system when the refrigeration system is not effectively using all the refrigerant. In some cases, this means the refrigerant exiting the evaporator is not 100% vapor and can damage the compressor. By withdrawing refrigerant, less thermal mass in the refrigeration system improves freezing performance and reduces the risk of damage to the compressor. Using a charge reservoir in lieu of an expansion valve is quieter and is more compatible with a capillary tube heat exchanger.

The details of one or more embodiments of these systems and methods are set forth in the accompanying drawings and the description below. Other features, objects, and advantages of these systems and methods will be apparent from the description and drawings, and from the claims.

DESCRIPTION OF DRAWINGS

FIGS. 20A-20D are schematics of flow paths formed by the channels of the evaporator and an associated lid.

Like reference symbols in the various drawings indicate like elements.

DETAILED DESCRIPTION

Figure 1A:
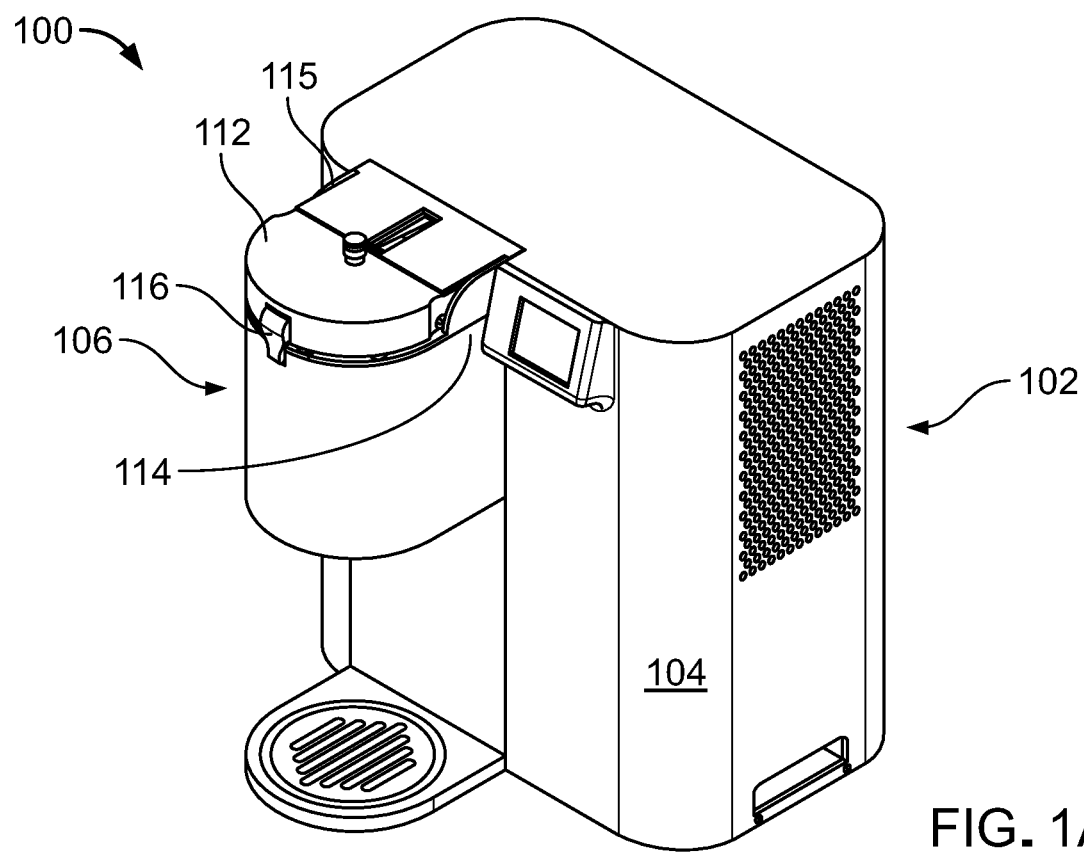
FIG. 1A is a perspective view of a machine for rapidly cooling food and drinks.

This specification describes systems and methods for rapidly cooling food and drinks. Some of these systems and methods use a counter-top or installed machine to cool food and drinks in a container from room temperature to freezing in less than two minutes. For example, the approach described in this specification has successfully demonstrated the ability make soft-serve ice cream, frozen coffees, frozen smoothies, and frozen cocktails, from room temperature pods in approximately 90 seconds. This approach can also be used to chill cocktails, create frozen smoothies, frozen protein and other functional beverage shakes (e.g., collagen-based, energy, plant-based, non-dairy, CBD shakes), frozen coffee drinks and chilled coffee drinks with and without nitrogen in them, create hard ice cream, create milk shakes, create frozen yogurt and chilled probiotic drinks. These systems and methods are based on a refrigeration cycle (or freezing cycle) with low startup times and a pod-machine interface that is easy to use and provides extremely efficient heat transfer. Some of the pods described can be sterilized (e.g., using retort sterilization) and used to store ingredients including, for example, dairy products at room temperature for up to 18 months.

A significant challenge in the design of ice cream machines is the ability to cool a pod from room temperature to the draw temperature as quickly as possible, preferably within two minutes. Some machines reduce the residence time the ice cream remains in the ice cream machine by reaching the draw temperature as quickly as possible. This can be achieved by mixing and cooling as quickly as possible.

The machines and processes described in this specification create ice cream with the majority of the ice crystals below 50 μm and often the majority is below 30 μm in a single serve pod. In order to still be able to dispense the ice cream out of the pod into a bowl or dish without the ice cream contacting the machine, a draw temperature or dispensing temperature of the ice cream should be between −3° to −8° C. (26.6° F. to 17.6° F.) and preferably between −3° to −6° C. (26.6° F. to 21.2° F.).

The machines and processes described in this specification use a novel feature of increasing the rotational speed during freezing and dispensing, which is counter-intuitive. The machines described in this specification can use a mixing paddle that begins rotating slowly, but as the ice cream starts to freeze from liquid to solid, the rotational speed is increased requiring much more power to overcome the increase in mixing paddle torque. Normally as torque increases one would slow down the rotational speed of the mixing paddle to keep the power requirement constant. In some machines, the rotational speed of the mixing paddle is increased during freezing process from 100 RPM to 1200 RPM to reduce freeze times and reduce ice crystal size to be low, around 50 μm.

Furthermore, by increasing the rotational speed of the mixing paddle, ice on the inner diameter of the pod is melted, which is opposite the intended function of the pod wall to freeze the ice cream quickly. The freeze time for the ice cream increases by melting the ice crystals at the pod wall with the extra friction generated by the high rotational speed of the mixing paddle. This is opposite the typical goal of reducing consumer the wait time for the ice cream to freeze and dispense. For at least these reasons, increasing the rotational speed of the mixing paddle above a threshold of about 200 RPM is counter-intuitive.

Figure 10:
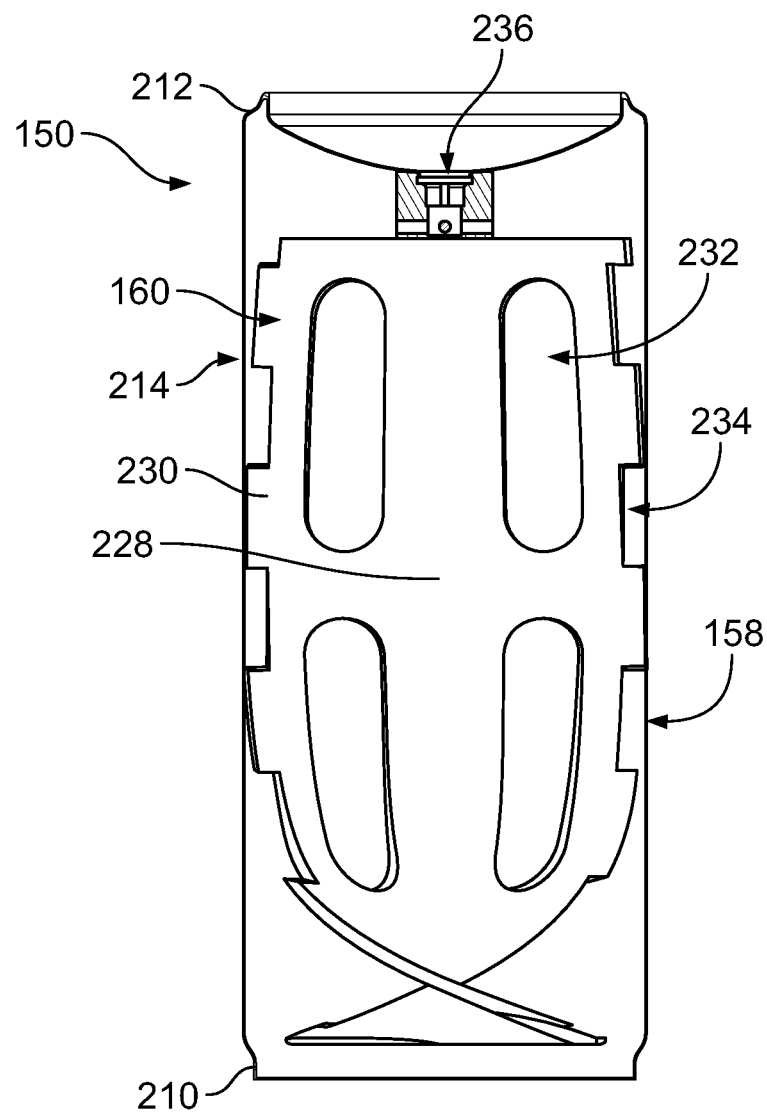
FIG. 10 is an enlarged schematic side view of a pod.

The rotational speed of the impeller mixing paddle is increased to draw air into the frozen confection to achieve improved overrun (preferably at least 30% overrun). Rotation of the helical profile of the mixing paddle (for example, the helical profile of the mixing paddle is shown in FIG. 10) also generates downward pressure to extrude the ice cream out of the exit port of the pod.

Furthermore, as previously described, the combination of spinning the mixing paddle quickly and cooling rapidly at the walls of the pod allows the cooled ice cream to mix properly within the pod and maintain small ice crystal size which is directly correlated to ice cream smoothness. This is in part because of scraping the chilled ice cream from the walls of the pod and forcing it to the center of the pod where the temperature is warmer. Optimal performance of the ice cream machine relies of having both efficient cooling at the walls of the pod and rapid scraping/mixing of the contents of the pod. A machine with efficient cooling but without rapid scraping/mixing and vice versa would be less optimal.

The ice cream mix described in this specification uses a novel feature of includes minimal or no stabilizers and emulsifiers. The absence or near absence of stabilizers, emulsifiers, and unnatural products, is considered a "clean label". The ice cream mix described in this specification includes milk, cream, sugar and powder milk. By including, these, features in the ice cream mix, the resulting ice cream has a majority of ice crystals under 25 μm in diameter.

For example, a clean label formulation for a 150 g serving of ice cream can include the following proportions: 48 g of whole milk, 67 g of heavy cream (no gums), 24 g of white sugar, and 11 g of non-fat dry milk powder.

Figure 1B:
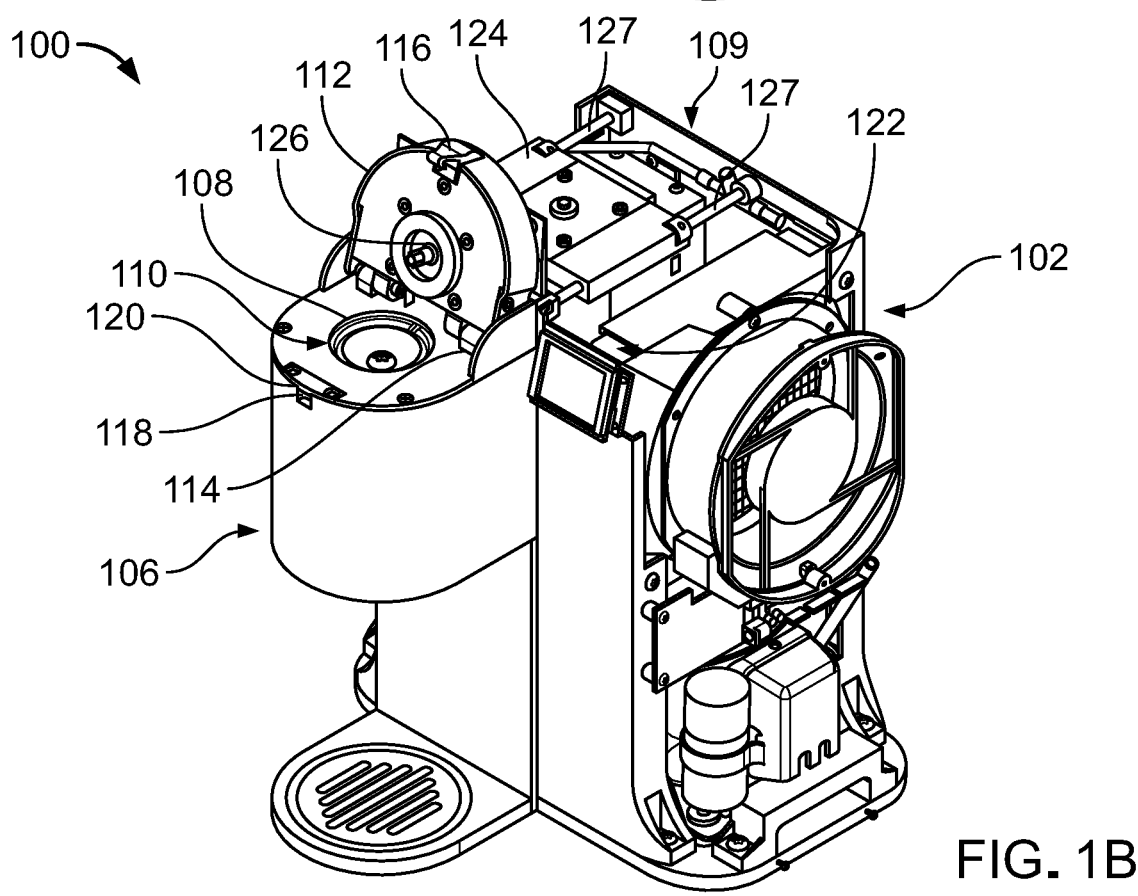
FIG. 1B shows the machine without its housing.

FIG. 1A is a perspective view of a machine 100 for cooling food or drinks. FIG. 1B shows the machine without its housing. The machine 100 reduces the temperature of ingredients in a pod containing the ingredients. Most pods include a mixing paddle used to mix the ingredients before dispensing the cooled or frozen products. The machine 100 includes a body 102 that includes a compressor, a condenser, a fan, an evaporator, capillary tubes, a control system, a lid system and a dispensing system with a housing 104 and a pod-machine interface 106. The pod-machine interface 106 includes an evaporator 108 of a refrigeration system 109 whose other components are disposed inside the housing 104. As shown on FIG. 1B, the evaporator 108 defines a receptacle 110 sized to receive a pod. Other machines are described in more detail in U.S. patent application Ser. No. 16/824,616 filed Mar. 19, 2020, and U.S. patent application Ser. No. 16/844,781 filed Apr. 9, 2020, which are incorporated herein by reference in its entirety.

A lid 112 is attached to the housing 104 via a hinge 114. The lid 112 can rotate between a closed position covering the receptacle 110 (FIG. 1A) and an open position exposing the receptacle 110 (FIG. 1B). In the closed position, the lid 112 covers the receptacle 110 and is locked in place. In the machine 100, a latch 116 on the lid 112 engages with a latch recess 118 on the pod-machine interface 106. A latch sensor 120 is disposed in the latch recess 118 to determine if the latch 116 is engaged with the latch recess 118. A processor 122 is electronically connected to the latch sensor 120 and recognizes that the lid 112 is closed when the latch sensor 120 determines that the latch 116 and the latch recess 118 are engaged.

An auxiliary cover 115 rotates upward as the lid 112 is moved from its closed position to its open position. Some auxiliary covers slide into the housing when the lid moves into the open position.

In the machine 100, the evaporator 108 is fixed in position with respect to the body 102 of the machine 100 and access to the receptacle 110 is provided by movement of the lid 112. In some machines, the evaporator 108 is displaceable relative to the body 102 and movement of the evaporator 108 provides access to the receptacle 110.

A motor 124 disposed in the housing 104 is mechanically connected to a driveshaft 126 that extends from the lid 112.

When the lid 112 is in its closed position, the driveshaft 126 extends into the receptacle 110 and, if a pod is present, engages with the pod to move a paddle or paddles within the pod. The processor 122 is in electronic communication with the motor 124 and controls operation of the motor 124. In some machines, the shaft associated with the paddle(s) of the pod extends outward from the pod and the lid 112 has a rotating receptacle (instead of the driveshaft 126) mechanically connected to the motor 124.

Figure 1C:
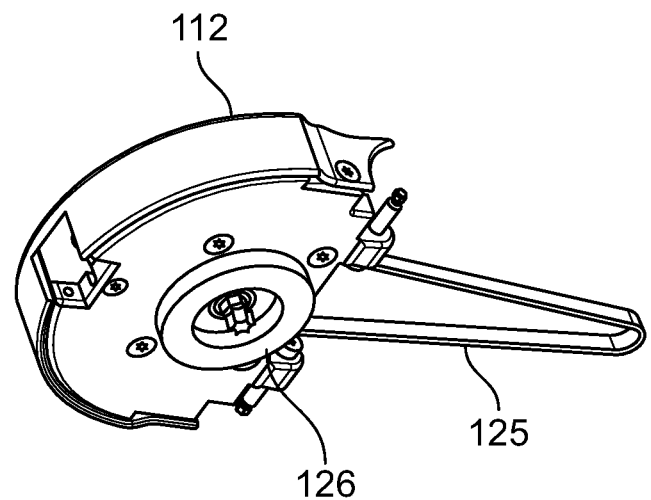
FIG. 1C is a perspective view of a portion of the machine of FIG. 1A.

FIG. 1C is perspective view of the lid 112 shown separately so the belt 125 that extends from motor 124 to the driveshaft 126 is visible. Referring again to FIG. 1B, the motor 124 is mounted on a plate that runs along rails 107. The plate can move approximately 0.25 inches to adjust the tension on the belt. During assembly, the plate slides along the rails. Springs disposed between the plate and the lid 112 bias the lid 112 away from the plate to maintain tension in the belt.

Figure 2A:
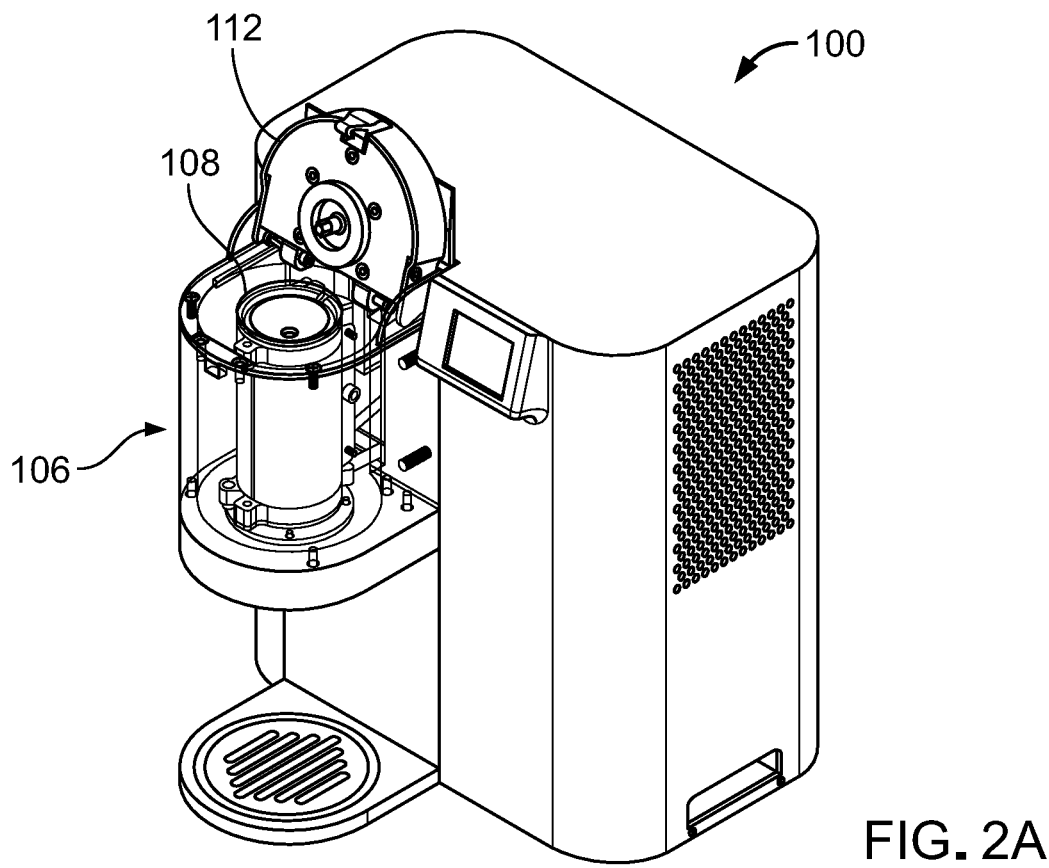
FIG. 2A is perspective view of the machine of FIG. 1A with the cover of the pod-machine interface illustrated as being transparent to allow a more detailed view of the evaporator to be seen.
Figure 2B:
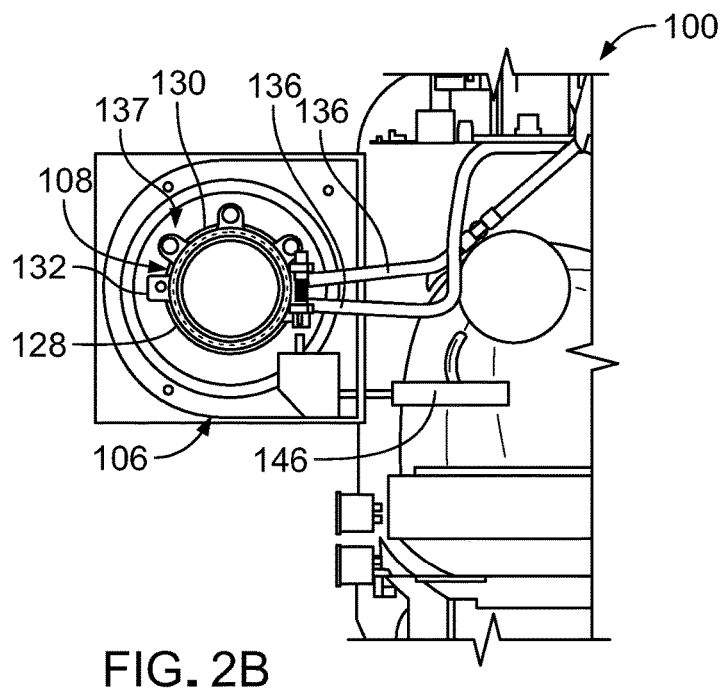
FIG. 2B is a top view of a portion of the machine without the housing and the pod-machine interface without the lid.
Figure 2C:
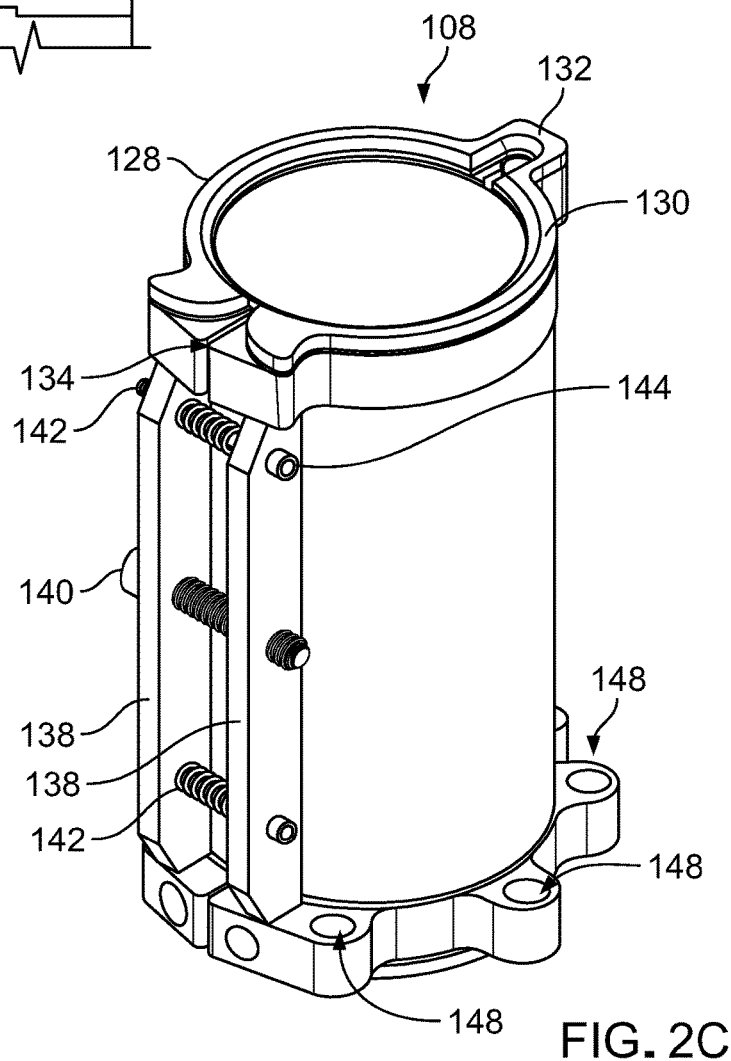
FIGS. 2C and 2D are, respectively, a perspective view and a side view of the evaporator.
Figure 2D:
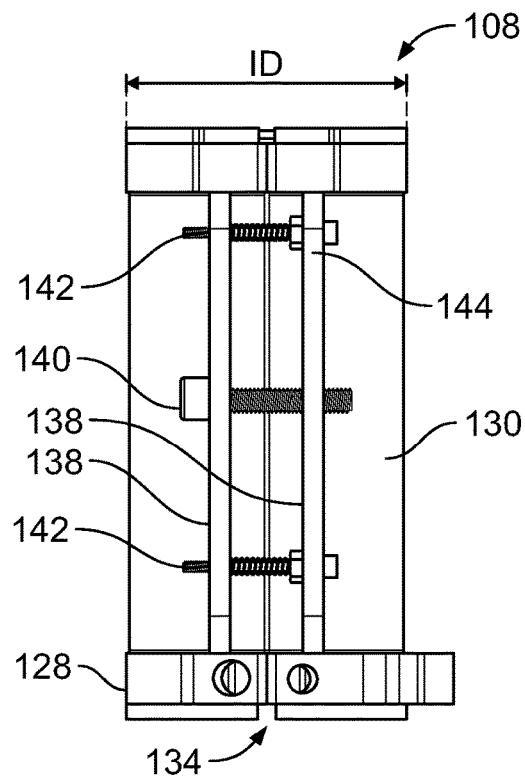

FIG. 2A is a perspective view of the machine 100 with the cover of the pod-machine interface 106 illustrated as being transparent to allow a more detailed view of the evaporator 108 to be seen. FIG. 2B is a top view of a portion of the machine 100 without housing 104 and the pod-machine interface 106 without the lid 112. FIGS. 2C and 2D are, respectively, a perspective view and a side view of the evaporator 108. Other pod-machine interfaces are described in more detail in U.S. patent application Ser. No. 16/459,146 filed Jul. 1, 2019 and incorporated herein by reference in its entirety.

The evaporator 108 has a clamshell configuration with a first portion 128 attached to a second portion 130 by a living hinge 132 on one side and separated by a gap 134 on the other side. Refrigerant flows to the evaporator 108 from other components of the refrigeration system through fluid channels 136 (best seen on FIG. 2B). The refrigerant flows through the evaporator 108 in internal channels through the first portion 128, the living hinge 132, and the second portion 130.

The space 137 (best seen on FIG. 2B) between the outer wall of the evaporator 108 and the inner wall of the casing of the pod-machine interface 106 is filled with an insulating material to reduce heat exchange between the environment and the evaporator 108. In the machine 100, the space 137 is filled with an aerogel (not shown). Some machines use other insulating material, for example, an annulus (such as an airspace), insulating foams made of various polymers, or fiberglass wool.

The evaporator 108 has an open position and a closed position. In the open position, the gap 134 opens to provide an air gap between the first portion 128 and the second portion 130. In the machine 100, the first portion 128 and the second portion 130 are pressed together in the closed position. In some machines, the first and second portion are pressed towards each other and the gap is reduced, but still defined by a space between the first and second portions in the closed position.

The inner diameter ID of the evaporator 108 is slightly larger in the open position than in the closed position. Pods can be inserted into and removed from the evaporator 108 while the evaporator is in the open position. Transitioning the evaporator 108 from its open position to its closed position after a pod is inserted tightens the evaporator 108 around the outer diameter of the pod. For example, the machine 100 is configured to use pods with 2.085" outer diameter. The evaporator 108 has an inner diameter of 2.115" in the open position and an inner diameter of 2.085" in the closed position. Some machines have evaporators sized and configured to cool other pods. The pods can be formed from commercially available can sizes, for example, "slim" cans with diameters ranging from 2.080 inches-2.090 inches and volumes of 180 milliliters (ml)-300 ml, "sleek" cans with diameters ranging from 2.250 inches-2.400 inches and volumes of 180 ml-400 ml and "standard" size cans with diameters ranging from 2.500 inches-2.600 inches and volumes of 200 ml-500 ml. The machine 100 is configured to use pods with 2.085 inches outer diameter. The evaporator 108 has an inner diameter of 2.115 inches in its open position and an inner diameter of 2.085 inches in its closed position. Some machines have evaporators sized and configured to cool other pods.

The closed position of evaporator 108 improves heat transfer between inserted pod 150 and the evaporator 108 by increasing the contact area between the pod 150 and the evaporator 108 and reducing or eliminating an air gap between the wall of the pod 150 and the evaporator 108. In some pods, the pressure applied to the pod by the evaporator 108 is opposed by the mixing paddles, pressurized gases within the pod, or both to maintain the casing shape of the pod.

In the evaporator 108, the relative position of the first portion 128 and the second portion 130 and the size of the gap 134 between them is controlled by two bars 138 connected by a bolt 140 and two springs 142. Each of the bars 138 has a threaded central hole through which the bolt 140 extends and two end holes engaging the pins 144. Each of the two springs 142 is disposed around a pin 144 that extends between the bars 138. Some machines use other systems to control the size of the gap 134, for example, circumferential cable systems with cables that extend around the outer diameter of the evaporator 108 with the cable being tightened to close the evaporator 108 and loosened to open the evaporator 108. In other evaporators, there are a plurality of bolts and end holes, one or more than two springs, and one or more engaging pins.

One bar 138 is mounted on the first portion 128 of the evaporator 108 and the other bar 138 is mounted on the second portion 130 of the evaporator 108. In some evaporators, the bars 138 are integral to the body of the evaporator 108 rather than being mounted on the body of the evaporator. The springs 142 press the bars 138 away from each other. The spring force biases the first portion 128 and the second portion 130 of the evaporator 108 away from each other at the gap 134. Rotation of the bolt 140 in one direction increases a force pushing the bars 138 towards each and rotation of the bolt in the opposite direction decreases this force. When the force applied by the bolt 140 is greater than the spring force, the bars 138 bring the first portion 128 and the second portion 130 of the evaporator together.

The machine 100 includes an electric motor 146 (shown on FIG. 2B) that is operable to rotate the bolt 140 to control the size of the gap 134. Some machines use other mechanisms to rotate the bolt 140. For example, some machines use a mechanical linkage, for example, between the lid 112 and the bolt 140 to rotate the bolt 140 as the lid 112 is opened and closed. Some machines include a handle that can be attached to the bolt to manually tighten or loosen the bolt. Some machines have a wedge system that forces the bars into a closed position when the machine lid is shut. This approach may be used instead of the electric motor 146 or can be provided as a backup in case the motor fails.

The electric motor 146 is in communication with and controlled by the processor 122 of the machine 100. Some electric drives include a torque sensor that sends torque measurements to the processor 122. The processor 122 signals to the motor to rotate the bolt 140 in a first direction to press the bars 138 together, for example, when a pod sensor indicates that a pod is disposed in the receptacle 110 or when the latch sensor 120 indicates that the lid 112 and pod-machine interface 106 are engaged. It is desirable that the clamshell evaporator be shut and holding the pod in a tightly fixed position before the lid closes and the shaft pierces the pod and engages the mixing paddle. This positioning can be important for driveshaft-mixing paddle engagement. The processor 122 signals to the electric drive to rotate the bolt 140 in the second direction, for example, after the food or drink being produced has been cooled/frozen and dispensed from the machine 100, thereby opening the evaporator gap 134 and allowing for easy removal of pod 150 from evaporator 108.

The base of the evaporator 108 has three bores 148 (see FIG. 2C) which are used to mount the evaporator 108 to the floor of the pod-machine interface 106. All three of the bores 148 extend through the base of the second portion 130 of the evaporator 108. The first portion 128 of the evaporator 108 is not directly attached to the floor of the pod-machine interface 106. This configuration enables the opening and closing movement described above. Other configurations that enable the opening and closing movement of the evaporator 108 can also be used. Some machines have more or fewer than three bores 148. Some evaporators are mounted to components other than the floor of the pod-machine interface, for example, the dispensing mechanism.

Many factors affect the performance of a refrigeration system. Important factors include mass velocity of refrigerant flowing through the system, the refrigerant wetted surface area, the refrigeration process, the area of the pod/evaporator heat transfer surface, the mass of the evaporator, and the thermal conductivity of the material of the heat transfer surface. Extensive modeling and empirical studies in the development of the prototype systems described in this specification have determined that appropriate choices for the mass velocity of refrigerant flowing through the system and the refrigerant wetted surface area are the most important parameters to balance to provide a system capable of freezing up to 12 ounces of confection in less than 2 minutes.

The evaporators described in this specification can have the following characteristics:

TABLE 1

| Evaporator parameters | |
| --- | --- |
| Mass Velocity | 60,000 to 180,000 lb/(hour feet squared) |
| Refrigerant Wetted Surface Area | 35 to 200 square inches |
| Pressure drop Through Refrigeration Process | less than 2 psi pressure drop across the evaporator |
| Pod/Evaporator Heat Transfer Surface | 15 to 50 square inches |
| Mass of Evaporator | 0.100 to 1.50 pounds |
| Minimum Conductivity of the Material | 160 W/mK |

The following paragraphs describe the significance of these parameters in more detail.

Mass velocity accounts for the multi-phase nature of refrigerant flowing through an evaporator. The two-phase process takes advantage of the high amounts of heat absorbed and expended when a refrigerant fluid (e.g., R-290 propane) changes state from a liquid to gas and a gas to a liquid, respectively. The rate of heat transfer depends in part on exposing the evaporator inner surfaces with a new liquid refrigerant to vaporize and cool the liquid ice cream mix. To do this the velocity of the refrigerant fluid must be high enough for vapor to channel or flow down the center of the flow path within the walls of evaporator and for liquid refrigerant to be pushed thru these channel passages within the walls. One approximate measurement of fluid velocity in a refrigeration system is mass velocity—the mass flow of refrigerant in a system per unit cross sectional area of the flow passage in units of lb/hr ft^2. Velocity as measured in ft/s (a more familiar way to measure "velocity") is difficult to apply in a two-phase system since the velocity (ft/s) is constantly changing as the fluid flow changes state from liquid to gas. If liquid refrigerant is constantly sweeping across the evaporator walls, it can be vaporized and new liquid can be pushed against the wall of the cooling channels by the "core" of vapor flowing down the middle of the passage. At low velocities, flow separates based on gravity and liquid remains on the bottom of the cooling passage within the evaporator and vapor rises to the top side of the cooling passage channels. If the amount of area exposed to liquid is reduced by half, for example, this could cut the amount of heat transfer almost half. According to the American Society of Heating, Refrigerating and Air-Conditioning Engineers (ASHRAE), a mass velocity of 150,000 lb/hr ft^2 maximizes performance for the majority of the evaporator flow path. Mass velocity is one of the parameters that must be balanced to optimize a refrigerant system. The parameters that affect the performance of the evaporator are mass flow rate, convective heat transfer coefficient, and pressure drop. The nominal operating pressure of the evaporator is determined by the required temperature of the evaporator and the properties of the refrigerant used in the system. The mass flow rate of refrigerant through the evaporator must be high enough for it to absorb the amount of thermal energy from the confection to freeze it, in a given amount of time. Mass flow rate is primarily determined by the size of the compressor. It is desirable to use the smallest possible compressor to reduce, cost, weight and size. The convective heat transfer coefficient is influenced by the mass velocity and wetted surface area of the evaporator. The convective heat transfer coefficient will increase with increased mass velocity. However, pressure drop will also increase with mass velocity. This in turn increases the power required to operate the compressor and reduces the mass flow rate the compressor can deliver. It is desirable to design the evaporator to meet performance objectives while using the smallest least expensive compressor possible. We have determined that evaporators with a mass velocity of 75,000-125,000 lb/hr ft^2 are effective in helping provide a system capable of freezing up to 12 ounces of confection in less than 2 minutes. The latest prototype has a mass velocity of approximately 100,000 lb/hr ft^2 and provides a good balance of high mass velocity, manageable pressure drop in the system, and a reasonable sized compressor. The current prototype includes an 8 cc compressor. However, some systems include larger compressors (e.g., a 10 cc compressor, a 12 cc compressor, a 14 cc compressor) to increase cooling capacity. For example, some machines include a 16 cc capacity rotary compressor.

Another important factor that affects performance in an evaporator is the surface area wetted by refrigerant which is the area of all the cooling channels within the evaporator exposed to refrigerant. Increasing the wetted surface area can improve heat transfer characteristics of an evaporator. However, increasing the wetted surface area can increase the mass of the evaporator which would increase thermal inertia and degrade heat transfer characteristics of the evaporator.

The amount of heat that can be transferred out of the liquid in a pod is proportional to the surface area of the pod/evaporator heat transfer surface. A larger surface area is desirable but increases in surface area can require increasing the mass of the evaporator which would degrade heat transfer characteristics of the evaporator. We have determined that evaporators in which the area of the pod/evaporator heat transfer surface is between 20 and 40 square inches are effectively combined with the other characteristics to help provide a system capable of freezing up to 12 ounces of confection in less than 2 minutes.

Thermal conductivity is the intrinsic property of a material which relates its ability to conduct heat. Heat transfer by conduction involves transfer of energy within a material without any motion of the material as a whole. An evaporator with walls made of a high conductivity material (e.g., aluminum) reduces the temperature difference across the evaporator walls. Reducing this temperature difference reduces the work required for the refrigeration system to cool the evaporator to the right temperature.

For the desired heat transfer to occur, the evaporator must be cooled. The greater the mass of the evaporator, the longer this cooling will take. Reducing evaporator mass reduces the amount of material that must be cooled during a freezing cycle. An evaporator with a large mass will increase the time require to freeze up to 12 ounces of confection.

The effects of thermal conductivity and mass can be balanced by an appropriate choice of materials. There are materials with higher thermal conductivity than aluminum such as copper. However, the density of copper is greater than the density of aluminum. For this reason, some evaporators have been constructed that use high thermal conductive copper only on the heat exchange surfaces of the evaporator and use aluminum everywhere else.

FIGS. 3A-3F show components of the pod-machine interface 106 that are operable to open pods in the evaporator 108 to dispense the food or drink being produced by the machine 100. This is an example of one approach to opening pods but some machines and the associated pods use other approaches.

Figure 3A:
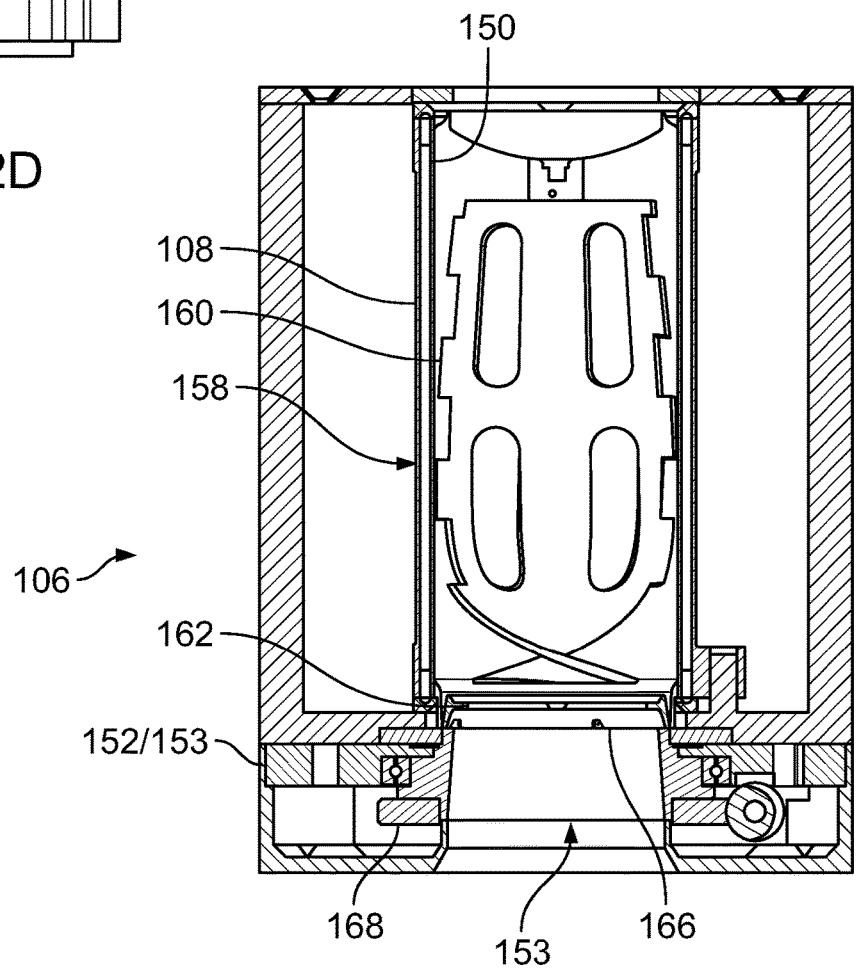
FIGS. 3A-3F show components of a pod-machine interface that are operable to open and close pods in the evaporator to dispense the food or drink being produced.
Figure 3B:
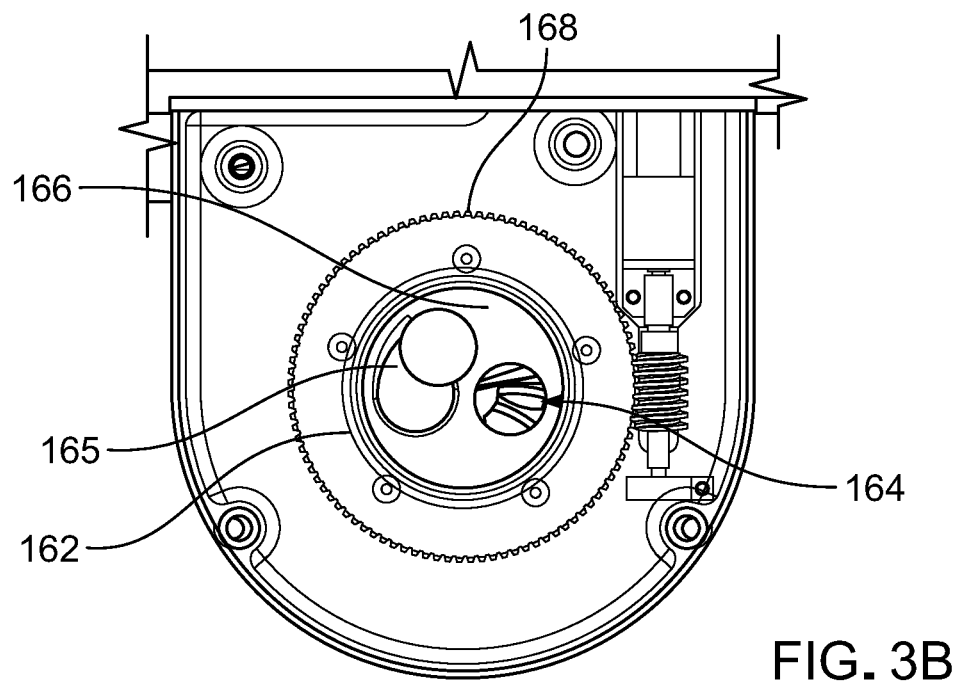
Figure 3C:
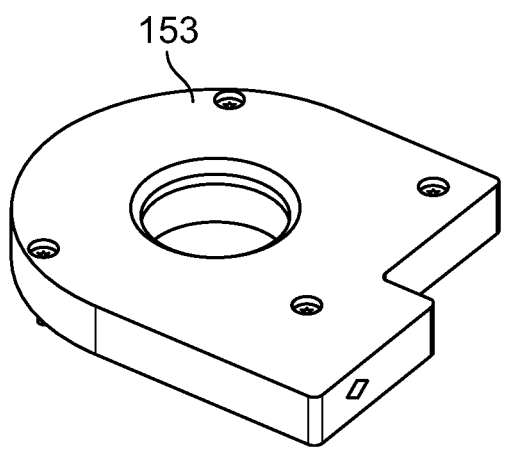
Figure 3D:
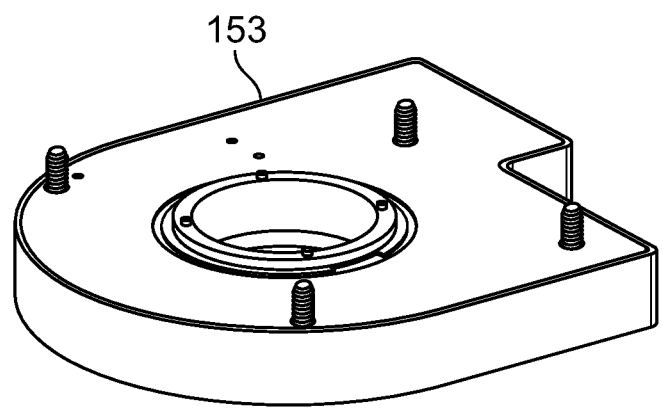
Figure 3E:
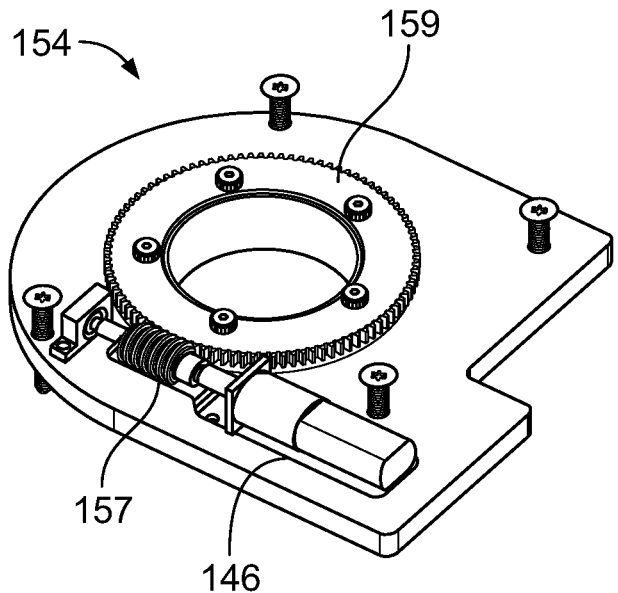
Figure 3F:
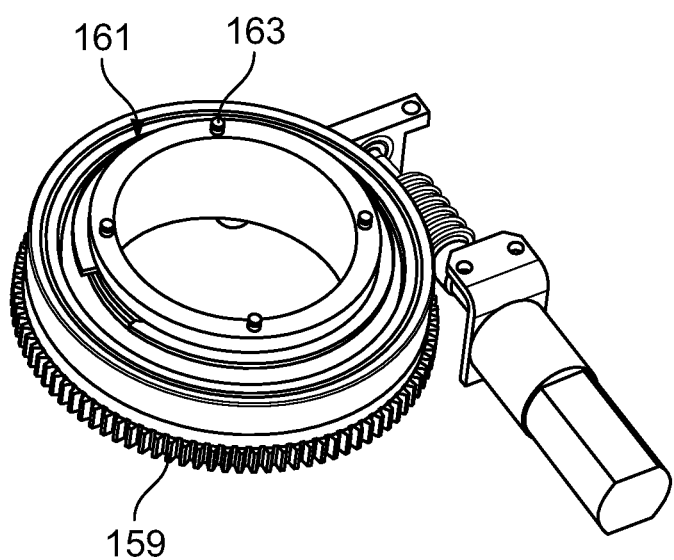

FIG. 3A is a partially cutaway schematic view of the pod-machine interface 106 with a pod 150 placed in the evaporator 108. FIG. 3B is a schematic plan view looking upwards that shows the relationship between the end of the pod 150 and the floor 152 of the pod-machine interface 106. The floor 152 of the pod-machine interface 106 is formed by a dispenser 153. FIGS. 3C and 3D are perspective views of a dispenser 153. FIGS. 3E and 3F are perspective views of an insert 154 that is disposed in the dispenser 153. The insert 154 includes an electric motor 146 operable to drive a worm gear 157 floor 152 of the pod-machine interface 106. The worm gear 157 is engaged with a gear 159 with an annular configuration. An annular member 161 mounted on the gear 159 extends from the gear 159 into an interior region of the pod-machine interface 106. The annular member 161 has protrusions 163 that are configured to engage with a pod inserted into the pod-machine interface 106 to open the pod. The protrusions 163 of the annular member 161 are four dowel-shaped protrusions. Some annular gears have more protrusions or fewer protrusions and the protrusions can have other shapes, for example, "teeth."

The pod 150 includes a body 158 containing a mixing paddle 160 (see FIG. 3A). The pod 150 also has a base 162 defining an aperture 164 and a cap 166 extending across the base 162 (see FIG. 3B). The base 162 is seamed/fixed onto the body 158 of the pod 150. The base 162 includes a protrusion 165. The cap 166 mounted over base 162 is rotatable around the circumference/axis of the pod 150. In use, when the product is ready to be dispensed from the pod 150, the dispenser 153 of the machine engages and rotates the cap 166 around the first end of the pod 150. Cap 166 is rotated to a position to engage and then separate the protrusion 165 from the rest of the base 162. The pod 150 and its components are described in more detail with respect to FIGS. 6A-10.

The aperture 164 in the base 162 is opened by rotation of the cap 166. The pod-machine interface 106 includes an electric motor 146 with threading that engages the outer circumference of a gear 168. Operation of the electric motor 146 causes the gear 168 to rotate. The gear 168 is attached to a annular member 161 and rotation of the gear 168 rotates the annular member 161. The gear 168 and the annular member 161 are both annular and together define a central bore through which food or drink can be dispensed from the pod 150 through the aperture 164 without contacting the gear 168 or the annular member 161. When the pod 150 is placed in the evaporator 108, the annular member 161 engages the cap 166 and rotation of the annular member 161 rotates the cap 166.

Figure 4:
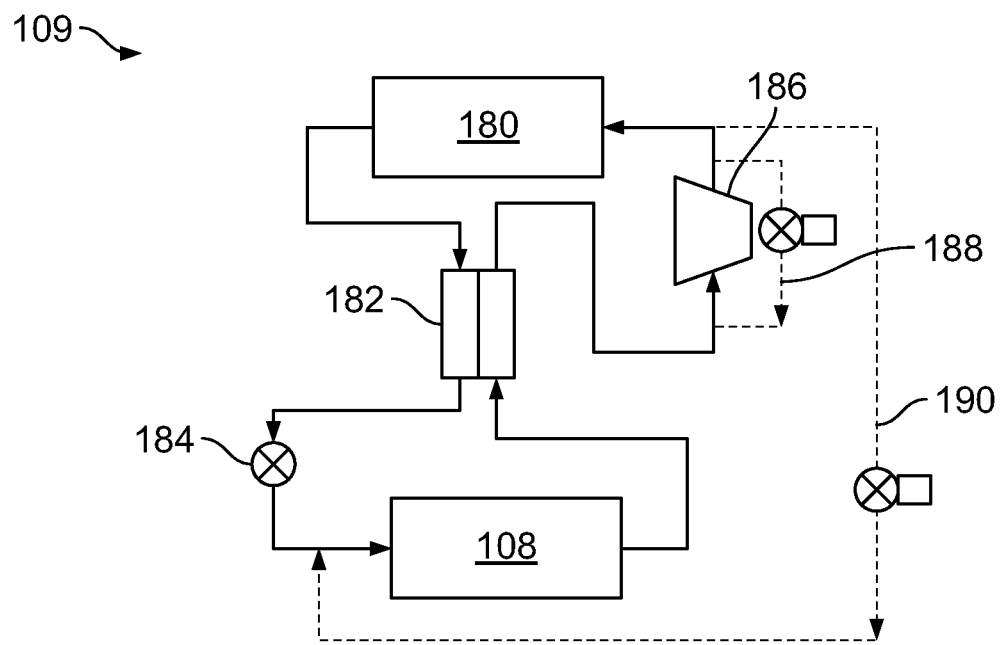
FIG. 4 is a schematic of a refrigeration system.

FIG. 4 is a schematic of the refrigeration system 109 that includes the evaporator 108. The refrigeration system also includes a condenser 180, a suction line heat exchanger 182, an expansion device 184, and a compressor 186. High-pressure, liquid refrigerant flows from the condenser 180 through the suction line heat exchanger 182 and the expansion device 184 to the evaporator 108. The expansion device 184 restricts the flow of the liquid refrigerant fluid and lowers the pressure of the liquid refrigerant as it leaves the expansion device 184.

In this refrigeration system, the expansion device 184 is an expansion valve. In some refrigeration systems, the expansion device 184 is a capillary tube. When the expansion device 184 is a capillary tube, the suction line heat exchanger 182 can be implemented by wrapping the capillary tube around the suction line (i.e., the line from the evaporator outlet to the compressor inlet) and brazing or soldering it in place. In this approach, the expansion device 184 is both the capillary tube and the suction line heat exchanger when connected thermally to the suction line. This implementation results in a simple, low-cost approach to achieve the suction line heat exchange that improves performance.

The low-pressure liquid-vapor mixture then moves to the evaporator 108 where heat absorbed from a pod 150 and its contents in the evaporator 108 changes the refrigerant from a liquid-vapor mixture to a gas. The gas-phase refrigerant flows from the evaporator 108 to the compressor 186 through the suction line heat exchanger 182. In the suction line heat exchanger 182, the cold vapor leaving the evaporator 108 pre-cools the liquid leaving the condenser 180. The suction line heat exchanger 182 includes a capillary tube assembly. The refrigerant enters the compressor 186 as a low-pressure gas and leaves the compressor 186 as a high-pressure gas. The gas then flows to the condenser 180 where heat exchange cools and condenses the refrigerant to a liquid.

The refrigeration system 109 includes a first bypass line 188 and second bypass line 190. The first bypass line 188 directly connects the discharge of the compressor 186 to the inlet of the compressor 186. Disposed on the both the first bypass line and second bypass line are bypass valves that open and close the passage to allow refrigerant bypass flow. Diverting the refrigerant directly from the compressor discharge to the inlet can provide evaporator defrosting and temperature control without injecting hot gas to the evaporator. The first bypass line 188 also provides a means for rapid pressure equalization across the compressor 186, which allows for rapid restarting (i.e., freezing one pod after another quickly). The second bypass line 190 enables the application of warm gas to the evaporator 108 to defrost the evaporator 108. The bypass valves may be, for example, solenoid valves or throttle valves.

Figure 5A:
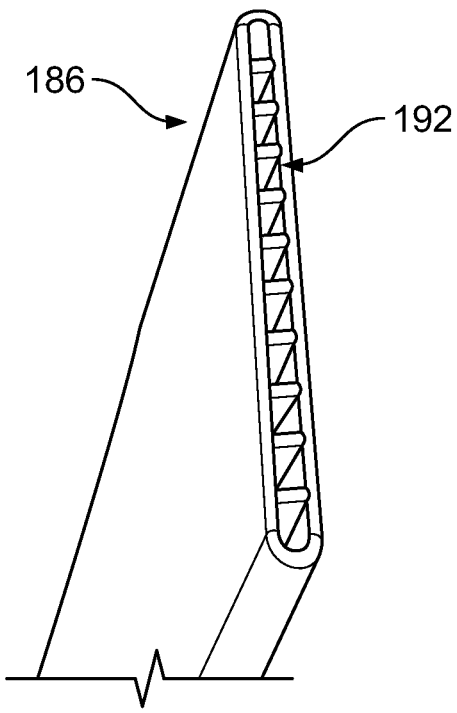
FIGS. 5A and 5B are views of a prototype of a condenser.
Figure 5B:
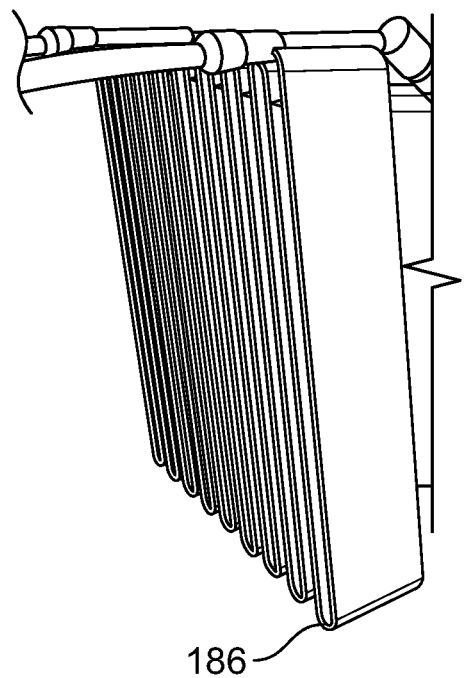

FIGS. 5A and 5B are views of a prototype of the condenser 180. The condenser has internal channels 192. The internal channels 192 increase the surface area that interacts with the refrigerant cooling the refrigerant quickly. These images show micro-channel tubing which are used because they have small channels which keeps the coolant velocity up and are thin wall for good heat transfer and have little mass to prevent the condenser for being a heat sink.

Figure 6A:
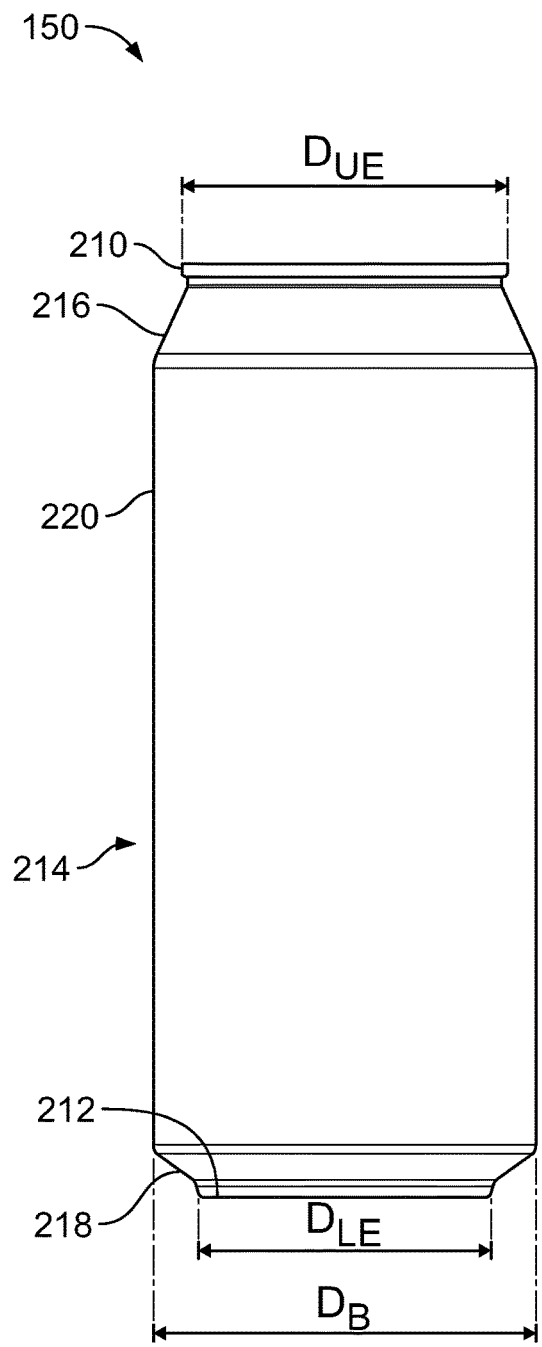
FIG. 6A is a side view of a pod.
Figure 6B:
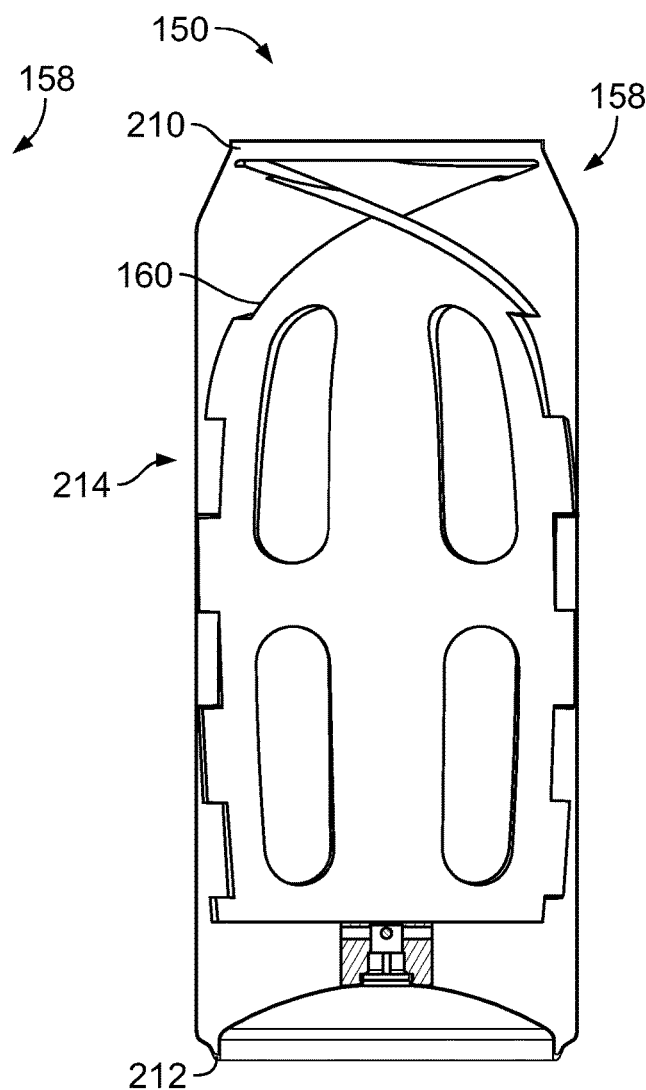
FIG. 6B is a schematic side view of the pod and a mixing paddle disposed in the pod.

FIGS. 6A and 6B show an example of a pod 150 for use with the machine 100 described with respect to FIGS. 1A-3F. FIG. 6A is a side view of the pod 150. FIG. 6B is a schematic side view of the pod 150 and the mixing paddle 160 disposed in the body 158 of the pod 150. Other pod-machine interfaces that can be used with this and similar machines are described in more detail in U.S. patent application Ser. No. 16/459,322 filed Jul. 1, 2019 and incorporated herein by reference in its entirety.

The pod 150 is sized to fit in the receptacle 110 of the machine 100. The pods can be sized to provide a single serving of the food or drink being produced. Typically, pods have a volume between 6 and 18 fluid ounces. The pod 150 has a volume of approximately 8.5 fluid ounces.

The body 158 of the pod 150 is a can that contains the mixing paddle 160. The body 158 extends from a first end 210 at the base to a second end 212 and has a circular cross-section. The first end 210 has a diameter $D_{UE}$ that is slightly larger than the diameter $D_{LE}$ of the second end 212. This configuration facilitates stacking multiple pods 200 on top of one another with the first end 210 of one pod receiving the second end 212 of another pod.

A wall 214 connects the first end 210 to the second end 212. The wall 214 has a first neck 216, second neck 218, and a barrel 220 between the first neck 216 and the second neck 218. The barrel 220 has a circular cross-section with a diameter $D_B$. The diameter $D_B$ is larger than both the diameter $D_{UE}$ of the first end 210 and the diameter $D_{LE}$ of the second end 212. The first neck 216 connects the barrel 220 to the first end 210 and slopes as the first neck 216 extends from the smaller diameter $D_{UE}$ to the larger diameter $D_B$ of the barrel 220. The second neck 218 connects the barrel 220 to the second end 212 and slopes as the second neck 218 extends from the larger diameter $D_B$ of the barrel 220 to the smaller diameter $D_{LE}$ of the second end 212. The second neck 218 is sloped more steeply than the first neck 216 as the second end 212 has a smaller diameter than the first end 210.

This configuration of the pod 150 provides increased material usage; i.e., the ability to use more base material (e.g., aluminum) per pod. This configuration further assists with the columnar strength of the pod.

The pod 150 is designed for good heat transfer from the evaporator to the contents of the pod. The body 158 of the pod 150 is made of aluminum and is between 5 and 50 microns thick. The bodies of some pods are made of other materials, for example, tin, stainless steel, and various polymers such as Polyethylene terephthalate (PTE).

Pod 150 may be made from a combination of different materials to assist with the manufacturability and performance of the pod. In one embodiment, the pod walls and the second end 212 may be made of Aluminum 3104 while the base may be made of Aluminum 5182.

In some pods, the internal components of the pod are coated with a lacquer to prevent corrosion of the pod as it comes into contact with the ingredients contained within pod. This lacquer also reduces the likelihood of "off notes" of the metal in the food and beverage ingredients contained within pod. For example, a pod made of aluminum may be internally coated with one or a combination of the following coatings: Sherwin Williams/Valspar® V70Q11, V70Q05, 32SO2AD, 40Q60AJ; PPG Innovel® 2012-823, 2012-820C; and/or Akzo Nobel® Aqualure™ G1 50. Other coatings made by the same or other coating manufacturers may also be used.

Some mixing paddles are made of similar aluminum alloys and coated with similar lacquers/coatings. For example, Whitford®/PPG coating 8870 may be used as a coating for mixing paddles. The mixing paddle lacquer may have additional non-stick and hardening benefits for mixing paddle.

Figure 7A:
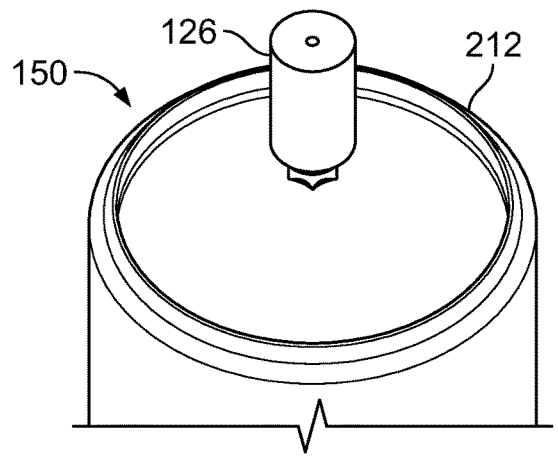
FIGS. 7A and 7B are perspective views of a pod and an associated driveshaft.
Figure 7B:
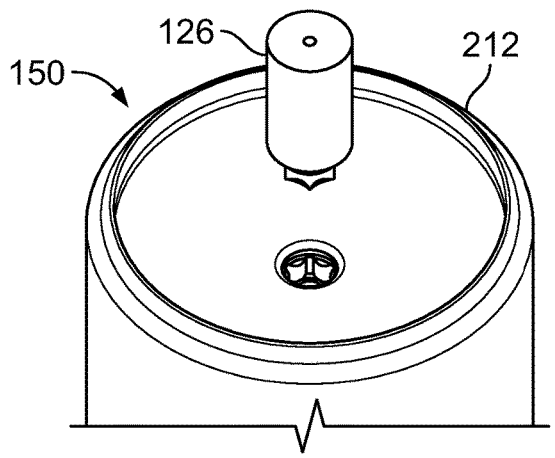
Figure 7C:
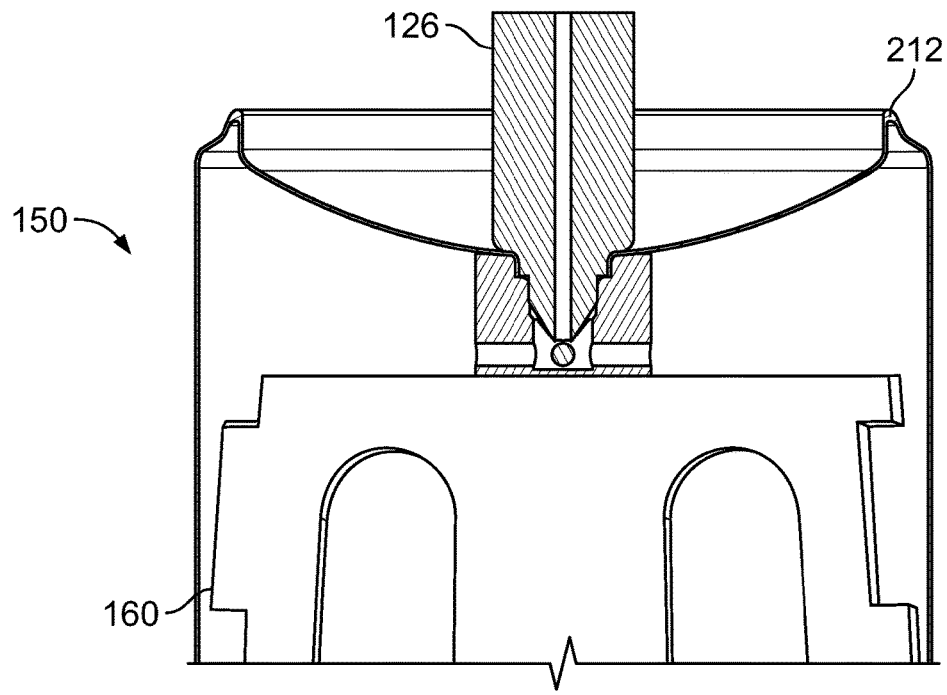
FIG. 7C is a cross-section of a portion of the pod with the driveshaft engaged with a mixing paddle in the pod.

FIGS. 7A-7C illustrate the engagement between the driveshaft 126 of the machine 100 and the mixing paddle 160 of a pod 150 inserted in the machine 100. FIGS. 7A and 7B are perspective views of the pod 150 and the driveshaft 126. In use, the pod 150 is inserted into the receptacle 110 of the evaporator 108 with the first end 210 of the pod 150 downward. This orientation exposes the second end 212 of the pod 150 to the driveshaft 126 as shown in FIG. 7A. Closing the lid 112 (see FIG. 1A) presses the driveshaft 126 against the second end 212 of the pod 150 with sufficient force that the driveshaft 126 pierces the second end 212 of the pod 150. FIG. 7B shows the resulting hole exposing the mixing paddle 160 with the driveshaft 126 offset for ease of viewing. FIG. 7C is a cross-section of a portion of the pod 150 with the driveshaft 126 engaged with the mixing paddle 160 after the lid is closed. Typically, there is not a tight seal between the driveshaft 126 and the pod 150 so that air can flow in as the frozen confection is evacuating/dispensing out the other end of the pod 150. In an alternative embodiment, there is a tight seal such that the pod 150 retains pressure in order to enhance contact between the pod 150 and evaporator 108.

Some mixing paddles contain a funnel or receptacle configuration that receives the punctured end of the second end of the pod when the second end is punctured by driveshaft.

Figure 8:
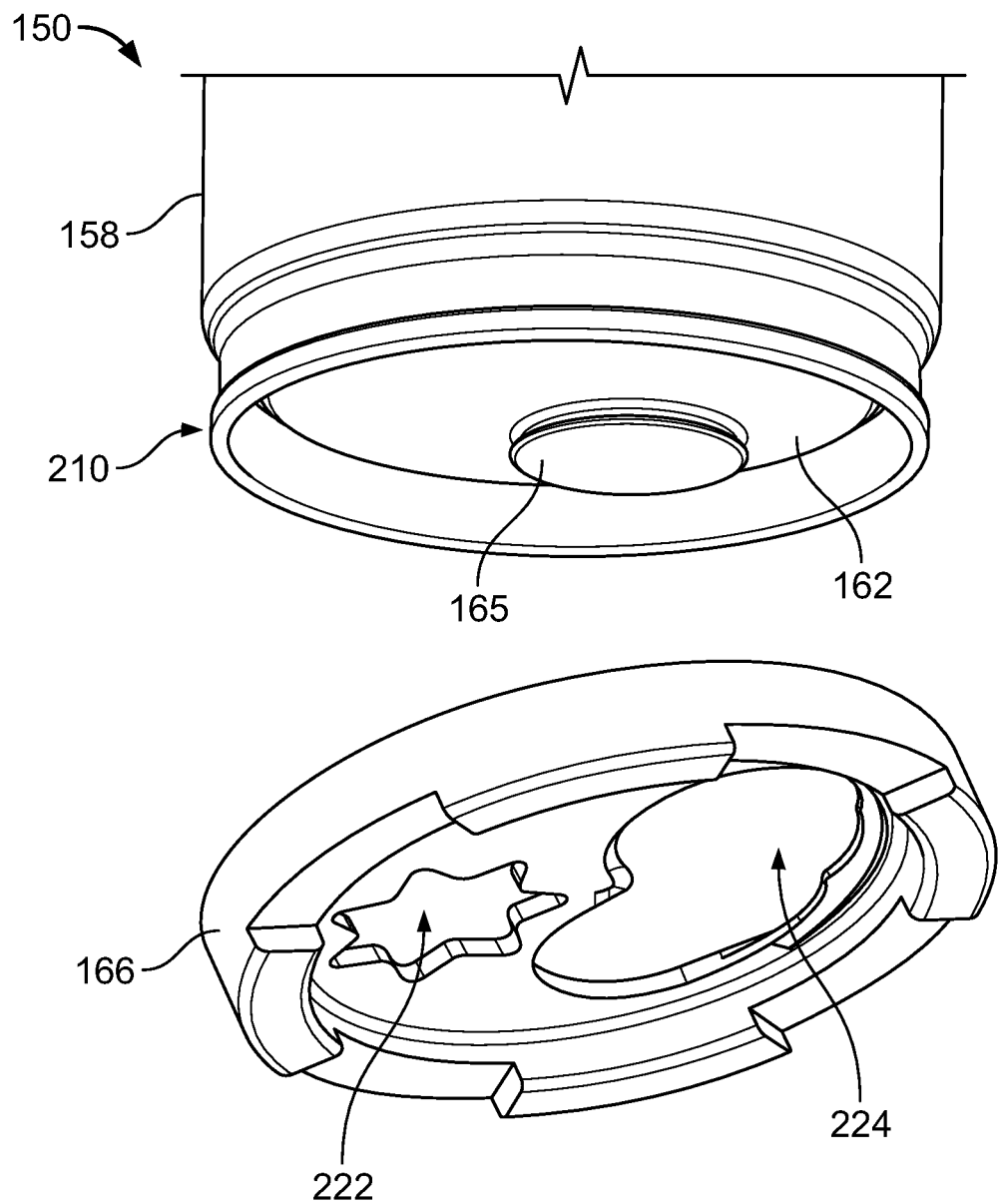
FIG. 8 shows a first end of a pod with its cap spaced apart from its base for ease of viewing.

FIG. 8 shows the first end 210 of the pod 150 with the cap 166 spaced apart from the base 162 for ease of viewing. FIGS. 9A-9D illustrate rotation of the cap 166 around the first end 210 of the pod 150 to cut and carry away protrusion 165 of base 162 and expose aperture 164 extending through the base 162.

The base 162 is manufactured separately from the body 158 of the pod 150 and then attached (for example, by crimping or seaming) to the body 158 of the pod 150 covering an open end of the body 158. The protrusion 165 of the base 162 can be formed, for example, by stamping, deep drawing, or heading a sheet of aluminum being used to form the base. The protrusion 165 is attached to the remainder of the base 162, for example, by a weakened score line 173. The scoring can be a vertical score into the base of the aluminum sheet or a horizontal score into the wall of the protrusion 165. For example, the material can be scored from an initial thickness of 0.008 inches to 0.010 inches to a post-scoring thickness of 0.001 inches-0.008 inches. In an alternative embodiment, there is no post-stamping scoring but rather the walls are intentionally thinned for ease of rupture. In another version, there is not variable wall thickness but rather the cap 166 combined with force of the machine dispensing mechanism engagement are enough to cut the 0.008 inches to 0.010 inches wall thickness on the protrusion 165. With the scoring, the protrusion 165 can be lifted and sheared off the base 162 with 5-75 pounds of force, for example between 15-40 pounds of force.

The cap 166 has a first aperture 222 and a second aperture 224. The first aperture approximately matches the shape of the aperture 164. The aperture 164 is exposed and extends through the base 162 when the protrusion 165 is removed. The second aperture 224 has a shape corresponding to two overlapping circles. One of the overlapping circles has a shape that corresponds to the shape of the protrusion 165 and the other of the overlapping circles is slightly smaller. A ramp 226 extends between the outer edges of the two overlapping circles. There is an additional 0.020" material thickness at the top of the ramp transition. This extra height helps to lift and rupture the protrusion's head and open the aperture during the rotation of the cap as described in more detail with reference to FIGS. 9A-9G.

Figure 9A:
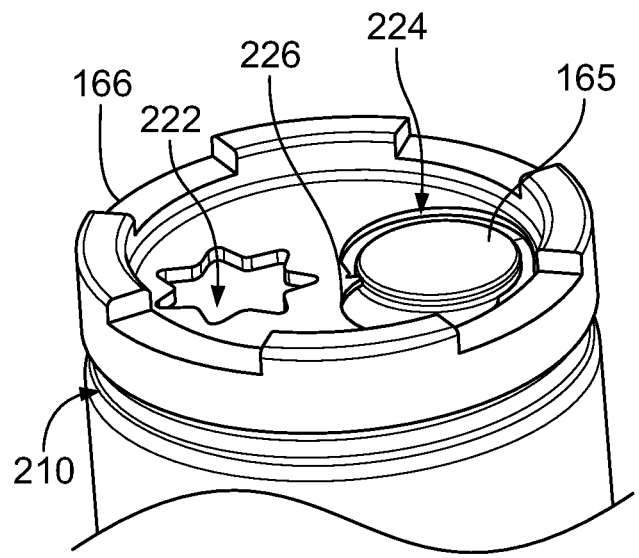
FIGS. 9A-9G illustrate rotation of a cap around the first end of the pod to open an aperture extending through the base.
Figure 9B:
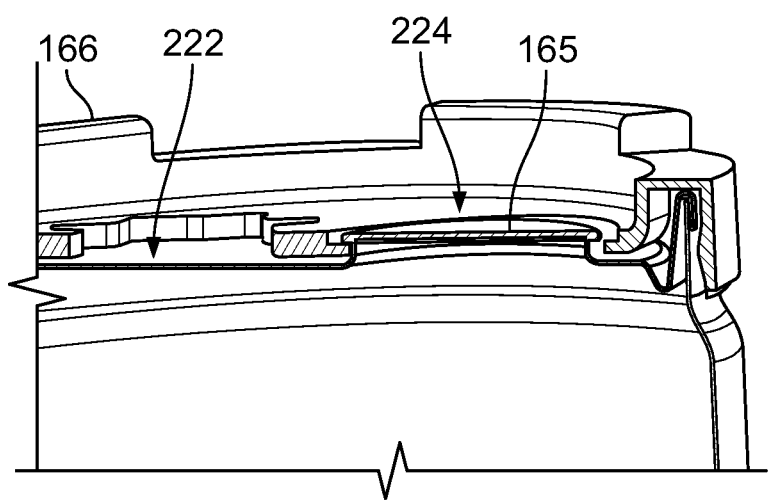
Figure 9C:
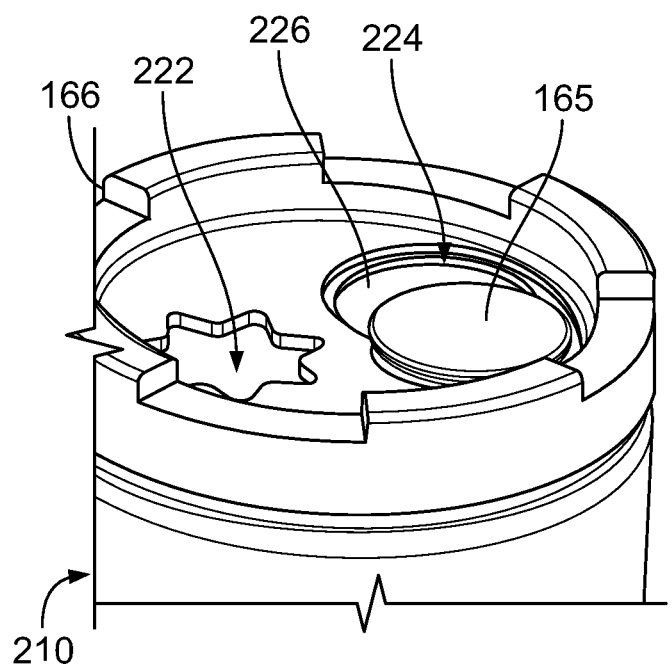
Figure 9D:
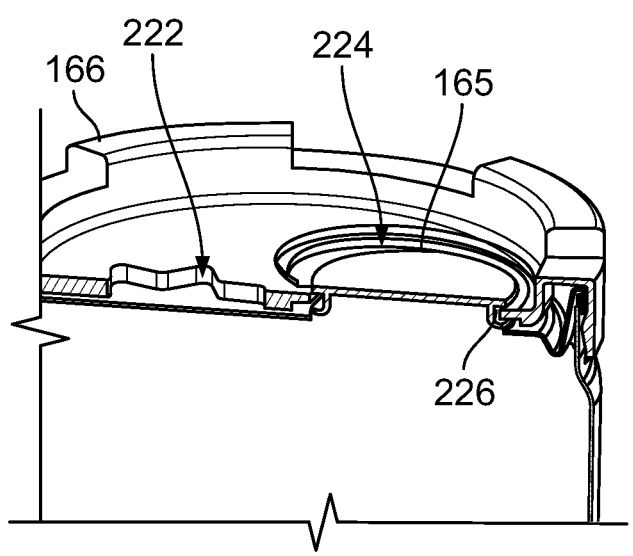
Figure 9E:
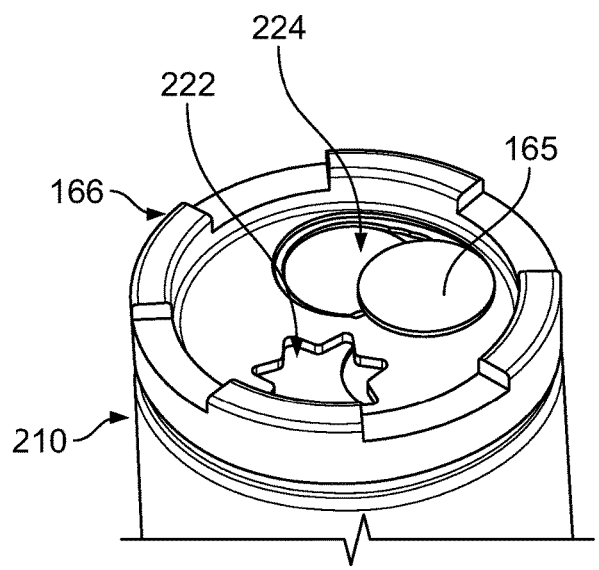
Figure 9F:
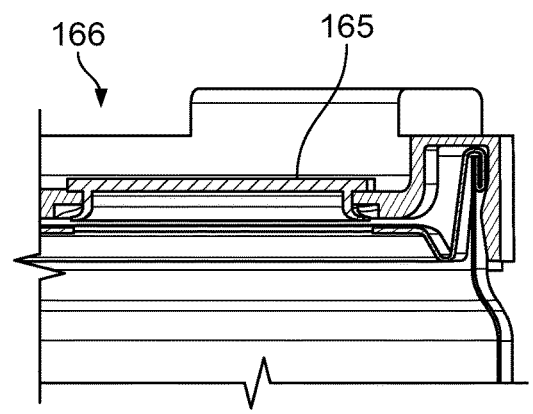
Figure 9G:
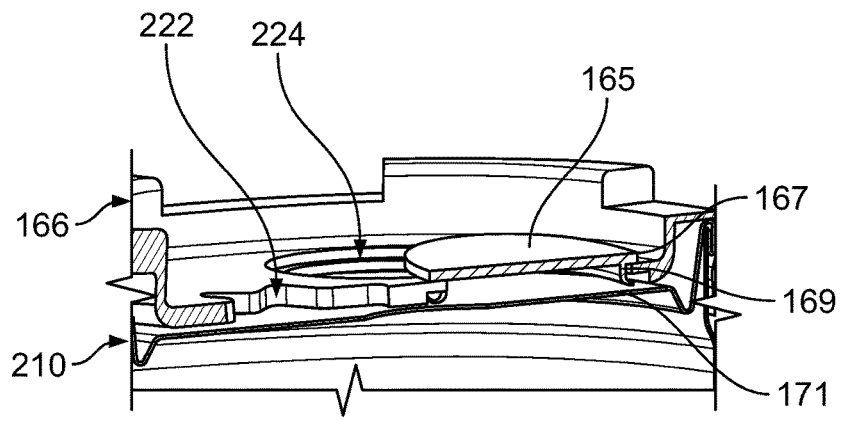

As shown in FIGS. 9A and 9B, the cap 166 is initially attached to the base 162 with the protrusion 165 aligned with and extending through the larger of the overlapping circles of the second aperture 224. When the processor 122 of the machine activates the electric motor 146 to rotate the gear 168 and the annular member 161, rotation of the cap 166 slides the ramp 226 under a lip of the protrusion 165 as shown in FIGS. 9C and 9D. Continued rotation of the cap 166 applies a lifting force that separates the protrusion 165 from the remainder of the base 162 (see FIGS. 9E-9G) and then aligns the first aperture 222 of the cap 166 with the aperture 164 in the base 162 resulting from removal of the protrusion 165.

Some pods include a structure for retaining the protrusion 165 after the protrusion 165 is separated from the base 162. In the pod 150, the protrusion 165 has a head 167, a stem 169, and a foot 171 (best seen in FIG. 9G). The stem 169 extends between the head 167 and the foot 171 and has a smaller cross-section than the head 167 and the foot 171. As rotation of the cap 166 separates the protrusion 165 from the remainder of the base 162, the cap 166 presses laterally against the stem 169 with the head 167 and the foot 171 bracketing the cap 166 along the edges of one of the overlapping circles of the second aperture 224. This configuration retains the protrusion 165 when the protrusion 165 is separated from the base 162. Such a configuration reduces the likelihood that the protrusion falls into the waiting receptacle that when the protrusion 165 is removed from the base.

Some pods include other approaches to separating the protrusion 165 from the remainder of the base 162. For example, in some pods, the base has a rotatable cutting mechanism that is riveted to the base. The rotatable cutting mechanism has a shape similar to that described relative to cap 166 but this secondary piece is riveted to and located within the perimeter of base 162 rather than being mounted over and around base 162. When the refrigeration or freezing cycle is complete, the processor 122 of the machine activates an arm of the machine to rotate the riveted cutting mechanism around a rivet. During rotation, the cutting mechanism engages, cuts and carries away the protrusion 165, leaving the aperture 164 of base 162 in its place.

In another example, some pods have caps with a sliding knife that moves across the base to remove the protrusion. The sliding knife is activated by the machine and, when triggered by the controller, slides across the base to separate, remove, and collect the protrusion 165. The cap 166 has a guillotine feature that, when activated by the machine, may slide straight across and over the base 162. The cap 166 engages, cuts, and carries away the protrusion 165. In another embodiment, this guillotine feature may be central to the machine and not the cap 166 of pod 150. In another embodiment, this guillotine feature may be mounted as a secondary piece within base 162 and not a secondary mounted piece as is the case with cap 166.

Some pods have a dispensing mechanism that includes a pop top that can be engaged and released by the machine. When the refrigeration cycle is complete, an arm of the machine engages and lifts a tab of the pod, thereby pressing the puncturing the base and creating an aperture in the base. Chilled or frozen product is dispensed through the aperture. The punctured surface of the base remains hinged to base and is retained inside the pod during dispensing. The mixing avoids or rotates over the punctured surface or, in another embodiment, so that the mixing paddle continues to rotate without obstruction. In some pop tops, the arm of the machine separates the punctured surface from the base. In some cases, the cooled food or drink is dispensed at a temperature between 26.6° F. and 17.6° F. In some cases, the cooled food or drink includes alcohol (e.g., a frozen alcoholic drink) and is dispensed at a temperature between 17.6° F. and 5.0° F. In some cases, the cooled and dispensed food or drink is composed of ice crystals with a mean size of less than 50 µm.

FIG. 10 is an enlarged schematic side view of the pod 150. The mixing paddle 160 includes a central stem 228 and two blades 230 extending from the central stem 228. The blades 230 are helical blades shaped to churn the contents of the pod 150 and to remove ingredients that adhere to inner surface of the body 158 of the pod 150. Some mixing paddles have a single blade and some mixing paddles have more than two mixing paddles.

Fluids (for example, liquid ingredients, air, or frozen confection) flow through openings 232 in the blades 230 when the mixing paddle 160 rotates. These openings reduce the force required to rotate the mixing paddle 160. This reduction can be significant as the viscosity of the ingredients increases (e.g., as ice cream forms). The openings 232 further assist in mixing and aerating the ingredients within the pod.

The lateral edges of the blades 230 define slots 234. The slots 234 are offset so that most of the inner surface of the body 158 is cleared of ingredients that adhere to inner surface of the body by one of the blades 230 as the mixing paddle 160 rotates. Although the mixing paddle is 160 wider than the first end 210 of the body 158 of the pod 150, the slots 234 are alternating slots that facilitate insertion of the mixing paddle 160 into the body 158 of the pod 150 by rotating the mixing paddle 160 during insertion so that the slots 234 are aligned with the first end 210. In another embodiment, the outer diameter of the mixing paddle are less than the diameter of the pod 150 opening, allowing for a straight insertion (without rotation) into the pod 150. In another embodiment, one blade on the mixing paddle has an outer-diameter that is wider than the second blade diameter, thus allowing for straight insertion (without rotation) into the pod 150. In this mixing paddle configuration, one blade is intended to remove (e.g., scrape) ingredients from the sidewall while the second, shorter diameter blade, is intended to perform more of a churning operation.

Some mixing paddles have one or more blades that are hinged to the central stem. During insertion, the blades can be hinged into a condensed formation and released into an expanded formation once inserted. Some hinged blades are fixed open while rotating in a first direction and collapsible when rotating in a second direction, opposite the first direction. Some hinged blades lock into a fixed, outward, position once inside the pod regardless of rotational directions. Some hinged blades are manually condensed, expanded, and locked.

The mixing paddle 160 rotates clockwise and removes frozen confection build up from the pod wall 214. Gravity forces the confection removed from the pod wall to fall towards first end 210. In the counterclockwise direction, the mixing paddle 160 rotate, lift and churn the ingredients towards the second end 212. When the paddle changes direction and rotates clockwise the ingredients are pushed towards the first end 210. When the protrusion 165 of the base 162 is removed as shown and described with respect to FIG. 9D, clockwise rotation of the mixing paddle dispenses produced food or drink from the pod 150 through the aperture 164. Some paddles mix and dispense the contents of the pod by rotating a first direction. Some paddles mix by moving in a first direction and a second direction and dispense by moving in the second direction when the pod is opened.

The central stem 228 defines a recess 236 that is sized to receive the driveshaft 126 of the machine 100. The recess and driveshaft 126 have a square cross section so that the driveshaft 126 and the mixing paddle 160 are rotatably constrained. When the motor rotates the driveshaft 126, the driveshaft rotates the mixing paddle 160. In some embodiments, the cross section of the driveshaft is a different shape and the cross section of the recess is compatibly shaped. In some cases the driveshaft and recess are threadedly connected. In some pods, the recess contains a mating structure that grips the driveshaft to rotationally couple the driveshaft to the paddle.

Figure 11:
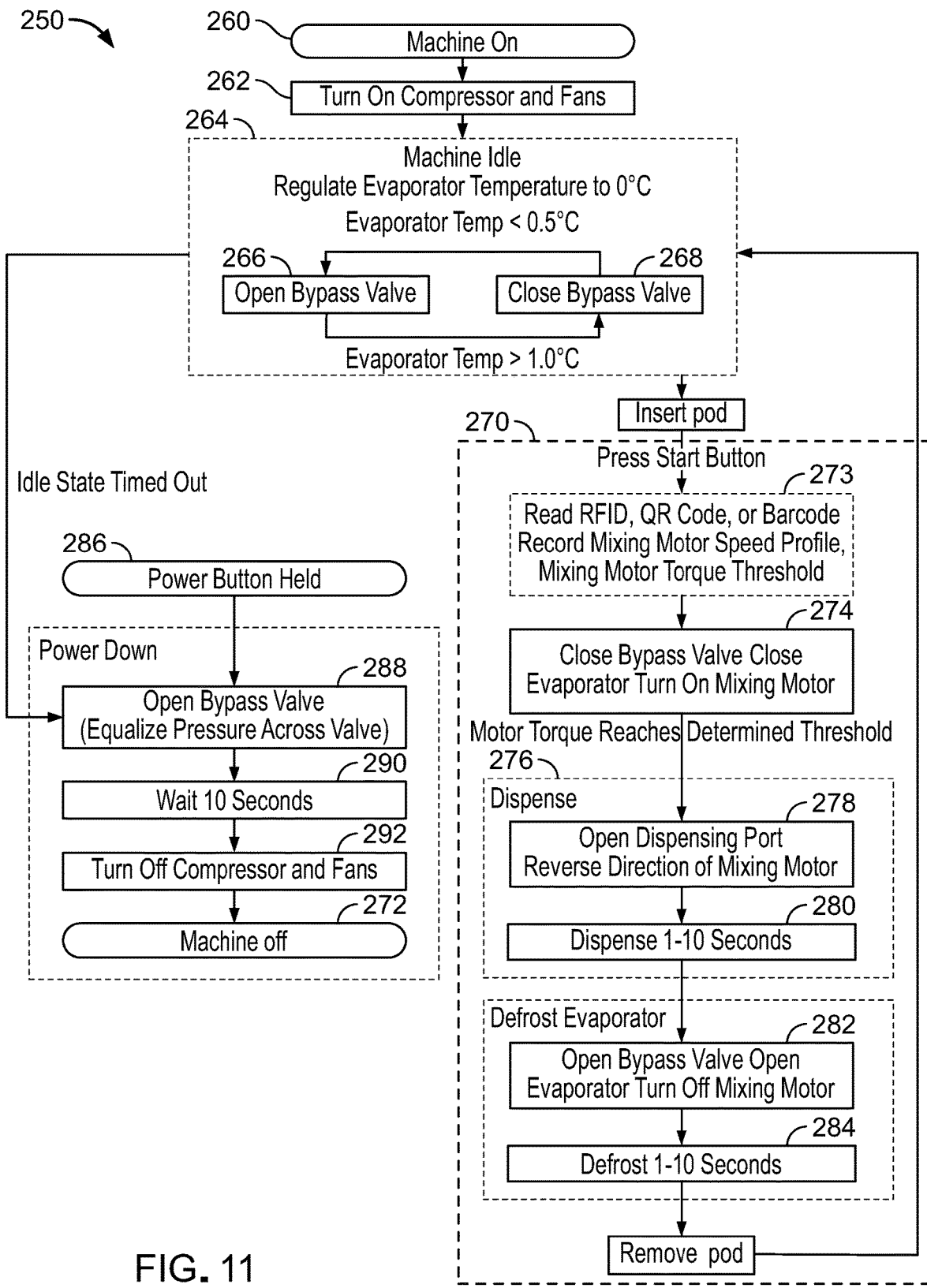
FIG. 11 is a flow chart of a method for operating a machine for producing cooled food or drinks.

FIG. 11 is a flow chart of a method 250 implemented on the processor 122 for operating the machine 100. The method 250 is described with references to refrigeration system 109 and machine 100. The method 250 may also be used with other refrigeration systems and machines. The method 250 is described as producing soft serve ice cream but can also be used to produce other cooled or frozen drinks and foods.

The first step of the method 250 is to turn the machine 100 on (step 260) and turn on the compressor 186 and the fans associated with the condenser 180 (step 262). The refrigeration system 109 then idles at regulated temperature (step 264). In the method 250, the evaporator 108 temperature is controlled to remain around 0.75° C. but may fluctuate by ±0.25° C. Some machines are operated at other idle temperatures, for example, from 0.75° C. to room temperature (22.0° C.). If the evaporator temperature is below 0.5° C., the processor 122 opens the bypass valve 190 to increase the heat of the system (step 266). When the evaporator temperature goes over 1° C., the bypass valve 190 is closed to cool the evaporator (step 268). From the idle state, the machine 100 can be operated to produce ice cream (step 270) or can shut down (step 272).

After inserting a pod, the user presses the start button. When the user presses the start button, the bypass valve 190 closes, the evaporator 108 moves to its closed position, and the motor 124 is turned on (step 274). In some machines, the evaporator is closed electronically using a motor. In some machines, the evaporator is closed mechanically, for example by the lid moving from the open position to the closed position. In some systems, a sensor confirms that a pod 150 is present in the evaporator 108 before these actions are taken.

Some systems include radio frequency identification (RFID) tags or other intelligent bar codes such as UPC bar or QR codes. Identification information on pods can be used to trigger specific cooling and mixing algorithms for specific pods. These systems can optionally read the RFID, QR code, or barcode and identify the mixing motor speed profile and the mixing motor torque threshold (step 273).

The identification information can also be used to facilitate direct to consumer marketing (e.g., over the internet or using a subscription model). This approach and the systems described in this specification enable selling ice cream thru e-commerce because the pods are shelf stable. In the subscription mode, customers pay a monthly fee for a predetermined number of pods shipped to them each month. They can select their personalized pods from various categories (e.g., ice cream, healthy smoothies, frozen coffees or frozen cocktails) as well as their personalized flavors (e.g., chocolate or vanilla).

The identification can also be used to track each pod used. In some systems, the machine is linked with a network and can be configured to inform a vendor as to which pods are being used and need to be replaced (e.g., through a weekly shipment). This method is more efficient than having the consumers go to the grocery store and purchase pods.

These actions cool the pod 150 in the evaporator 108 while rotating the mixing paddle 160. As the ice cream forms, the viscosity of the contents of the pod 150 increases. A torque sensor of the machine measures the torque of the motor 124 required to rotate the mixing paddle 160 within the pod 150. Once the torque of the motor 124 measured by a torque sensor satisfies a predetermined threshold, the machine 100 moves into a dispensing mode (276). The dispensing port opens and the motor 124 reverses direction (step 278) to press the frozen confection out of the pod 150. This continues for approximately 1 to 10 seconds to dispense the contents of the pod 150 (step 280). The machine 100 then switches to defrost mode (step 282). Frost that builds up on the evaporator 108 can reduce the heat transfer efficiency of the evaporator 108. In addition, the evaporator 108 can freeze to the pod 150, the first portion 128 and second portion 130 of the evaporator can freeze together, and/or the pod can freeze to the evaporator. The evaporator can be defrosted between cycles to avoid these issues by opening the bypass valve 170, opening the evaporator 108, and turning off the motor 124 (step 282). The machine then diverts gas through the bypass valve for about 1 to 10 seconds to defrost the evaporator (step 284). The machine is programmed to defrost after every cycle, unless a thermocouple reports that the evaporator 108 is already above freezing. The pod can then be removed. The machine 100 then returns to idle mode (step 264). In some machines, a thermometer measures the temperature of the contents of pod 150 and identifies when it is time to dispense the contents of the pod. In some machines, the dispensing mode begins when a predetermined time is achieved. In some machines, a combination of torque required to turn the mixing paddle, mixing motor current draw, temperature of the pod, and/or time determines when it is time to dispense the contents of the pod.

If the idle time expires, the machine 100 automatically powers down (step 272). A user can also power down the machine 100 by holding down the power button (286). When powering down, the processor opens the bypass valve 190 to equalize pressure across the valve (step 288). The machine 100 waits ten seconds (step 290) then turns off the compressor 186 and fans (step 292). The machine is then off.

Figure 12:
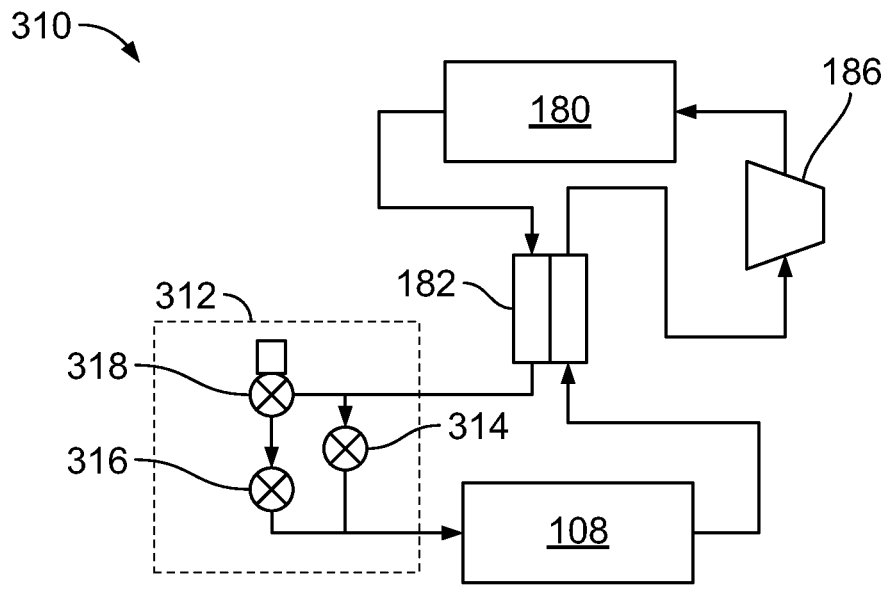
FIG. 12 is a schematic of a refrigeration system that includes an evaporator and an expansion sub-system.

FIG. 12 is a schematic of a refrigeration system 310 that includes the evaporator 108 and an expansion sub-system 312. The refrigeration system 310 is substantially similar to the refrigeration system 109. However, the refrigeration system 310 includes the expansion sub-system 312 rather than the expansion device 184 shown in the refrigeration system 109. The refrigeration system 310 does not include the first bypass line 188 and the second bypass line 190 that are part of the refrigeration system 109. However, some systems include the with the expansion sub-system 312, the first bypass line, and the second bypass line.

The expansion sub-system 312 includes multiple valves to control expansion of the refrigeration fluid. These valves include a first fixed orifice valve 314, a second fixed orifice valve 316, and a control valve 318. The control valve 318 is upstream from the second fixed orifice valve 316. The control valve 318 and second fixed orifice valve 316 are in parallel with the first fixed orifice valve 314. The expansion device has two modes to control the temperature of the refrigerant entering the evaporator 108. In the first mode, the control valve 318 is open allowing the refrigerant to flow to the second fixed orifice valve 316. In the first mode, the refrigerant flows through both the first fixed orifice valves 314 and the second fixed orifice valves 316. In the second mode, the control valve 318 is closed and the refrigerant does not flow through the second fixed orifice valve 316. All refrigerant flows through the first fixed orifice valve 314.

As discussed with reference to FIG. 4, the expansion device 184 or expansion sub-system 312 receives a high-pressure refrigerant and releases low-pressure refrigerant. This pressure drop cools the refrigerant. Larger changes in pressure ($\Delta P$) cause larger changes in temperature ($\Delta T$). In the second mode (i.e., with control valve 318 closed), the pressure drop through the expansion sub-system 312 will be higher than in the first mode providing a lower evaporator pressure and associated lower evaporator temperature. The effect on heat transfer of the increased temperature differential between the refrigerant and the contents of a pod in the evaporator 108 is offset to some extent by the fact that this lower pressure refrigerant is less dense. Since the compressor moves a fixed volume of refrigerant each compression cycle, the mass flow per cycle is reduced, which lowers heat transfer. In the second mode of operation, there is a big temperature difference between the pod and evaporator, requiring large heat transfer, which increases the amount of mass flow needed.

During initial operation, the refrigeration system 310 is in the first mode. The control valve 318 is open and the refrigerant flows through both the first fixed orifice valve 314 and second fixed orifice valve 316. This results in the evaporator operating at around a temperature of −20° C. to −10° C. At this temperature, the cooling system provides more cooling capacity than it can at lower temperatures by taking advantage of the higher density refrigerant passing through the evaporator.

The pod 150 is inserted into the evaporator 108 around room temperature (e.g., 22° C.). The initial difference in temperature between the evaporator 108 and the pod 150 is high. As a result, the heat transfers rapidly from the pod 150 to the evaporator 108. The difference between the temperature of the pod 150 and the evaporator 108 decreases as the pod 150 cools and the transfer of heat from the pod 150 to the evaporator 108 also slows. At this point, the system 310 enters the second mode and the control valve 318 closes. The refrigerant flows only through the first fixed orifice valve 314 and the $\Delta P$ between the refrigerant entering the first fixed orifice valve 314 and exiting the first fixed orifice valve 314 increases. The $\Delta T$ also increases resulting in a colder evaporator 108 with temperatures of approximately −15° C. to −30° C. This reduces the cooling capacity of the system, but increases the temperature difference between the pod and nest, which allows for quick final freezing of the ice cream. In the second mode activated when the temperature difference between the pod and evaporator reduces to the point of impacting heat transfer, the lower refrigerant temperature augments the overall heat transfer even through less mass is flowing in the system.

In some embodiments, the temperature of the evaporator in the first mode is above freezing. This configuration can precool the evaporator before use and defrost the evaporator after use.

The configuration of the refrigeration system 310 increases temperature control, which can reduce freezing time and reduce the required compressor output. The reduction in required compressor output allows for a reduction in the size of the compressor.

In some refrigeration systems, the expansion sub-system includes more than two valves. The multi-valve sub-systems can have more than two modes, further increasing temperature control.

In some refrigeration systems use other types of valves such as, for example, thermostatic expansion valves and electronic expansion valves. Both thermostatic expansion valves and electronic expansion valves can adapt the orifice size based on various loads and operating conditions. For example, the thermostatic expansion valves sense the evaporator outlet temperature of the refrigerant and adjusts flow through the thermostatic expansion valve to maintain predetermined or desired operating conditions. The electronic expansion valves are electrically actuated to adapt the orifice size based on evaporator outlet temperature and electronic signals from a control unit 371.

Figure 13:
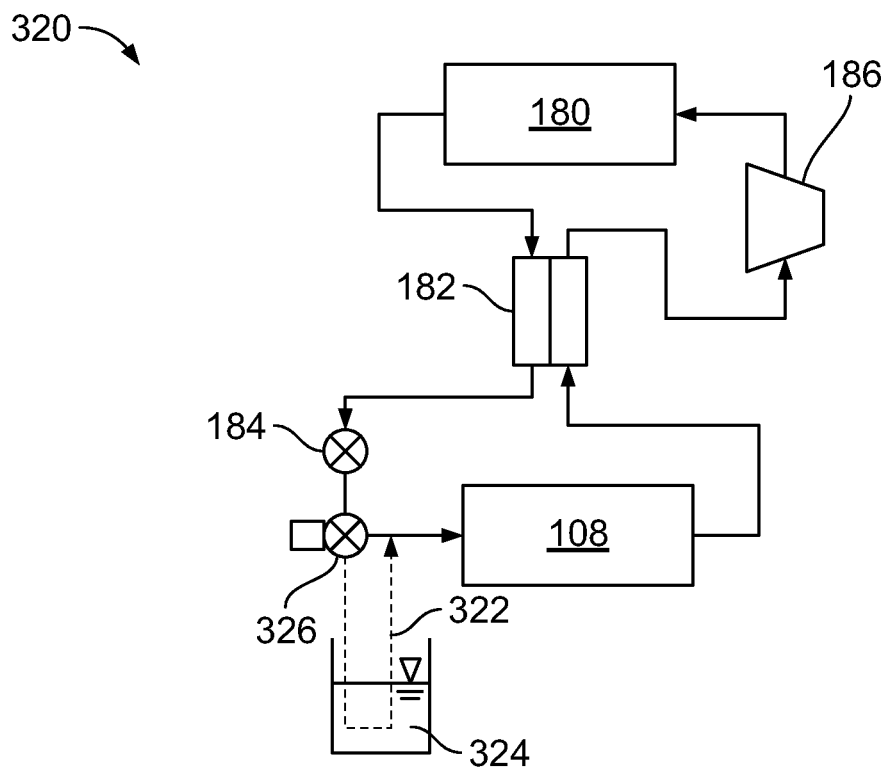
FIG. 13 is a schematic of a refrigeration system that includes a bypass line that pre-chills a tank of water prior upstream of an evaporator.

FIG. 13 is a schematic of a refrigeration system 320 that includes a refrigerant line 322 that pre-chills a tank 324 of water prior to entering the evaporator 108. The refrigeration system 320 is substantially similar to the refrigeration system 109. However, the refrigeration system 320 includes the pre-chilling line 322 and omits the first bypass line 188 and the second bypass line 190 that are part of the refrigeration system 109. Some systems include the first bypass line, the second bypass line, and the pre-chilling line.

The refrigeration system 320 used in machines include the water tank 324. Machines with water tanks inject fluid into the pod during mixing, for example, to dissolve dry ingredients or dilute the contents of the pod. Chilled water freezes more quickly than hot or room temperature water.

In use, a valve 326 is operated to route refrigerant through pre-chilling to route refrigerant exiting the expansion device 184 through the pre-chilling line 322. The cold, low-pressure refrigerant flows through the pre-chilling line 322 that is partially or fully disposed in the water tank 324. If the water tank 324 is filled with water, the pre-chilling line 322 is partially or fully submerged in the water. The refrigerant cools the water in the water tank 324 and exits the pre-chilling line 322. The refrigerant then enters the evaporator 108 to cool the evaporator 108.

Figure 14:
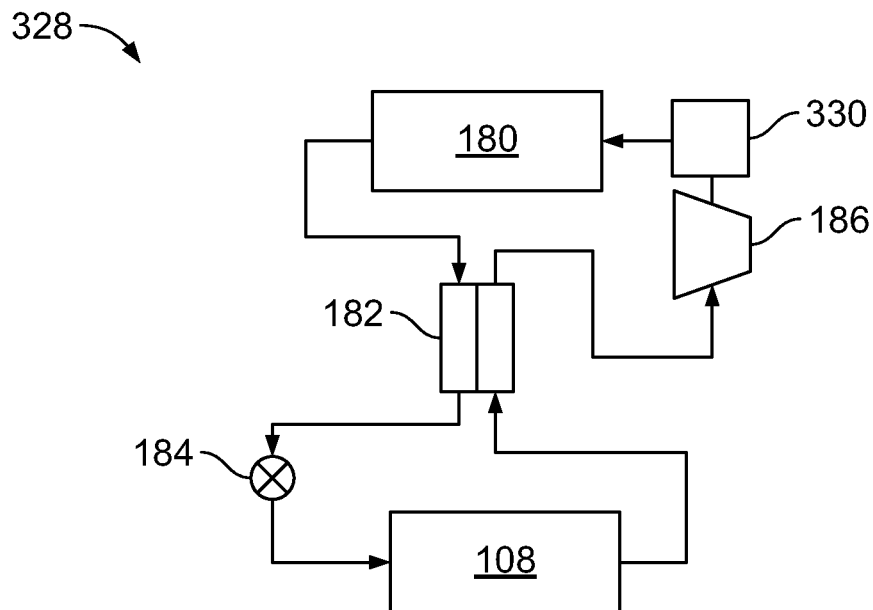
FIG. 14 is a schematic of a refrigeration system that includes a thermal mass disposed between a compressor and a condenser.

FIG. 14 is a schematic of a refrigeration system 328 that includes a thermal mass 330 disposed between the compressor 186 and the condenser 180. The refrigeration system 328 is substantially similar to the refrigeration system 109. However, the refrigeration system 328 includes the thermal mass 330. The refrigeration system 328 does not include the first bypass line 188 and the second bypass line 190 that are part of the refrigeration system 109. Some systems include the first bypass line, the second bypass line, and the thermal mass 330.

The thermal mass may be, for example, ethylene glycol and water mixture, saltwater, paraffin wax (alkanes) or pure water. In some machines, the thermal mass 330 is disposed between the condenser 180 and heat exchanger 182.

The thermal mass 330 stores thermal energy and releases thermal energy at a later time. When disposed on between the compressor 186 and the condenser 180, the thermal mass 330 stores heat emitted from the refrigerant. At this point in the cycle, the refrigerant is a high-pressure vapor. The condenser 180 isothermally releases heat from the high-pressure vapor to produce a high-pressure liquid. Precooling the vapor refrigerant with the thermal mass 330 reduces the load of the compressor 186. When the machine 100 powers down, the thermal mass 330 releases heat into the environment and reaches an equilibrium at ambient temperatures.

Some systems include both the second bypass line and the thermal mass. The second bypass line redirects refrigerant from the thermal mass, idling the refrigeration system. During this idling period, the thermal mass releases heat from previous cycles into the environment.

Figure 15:
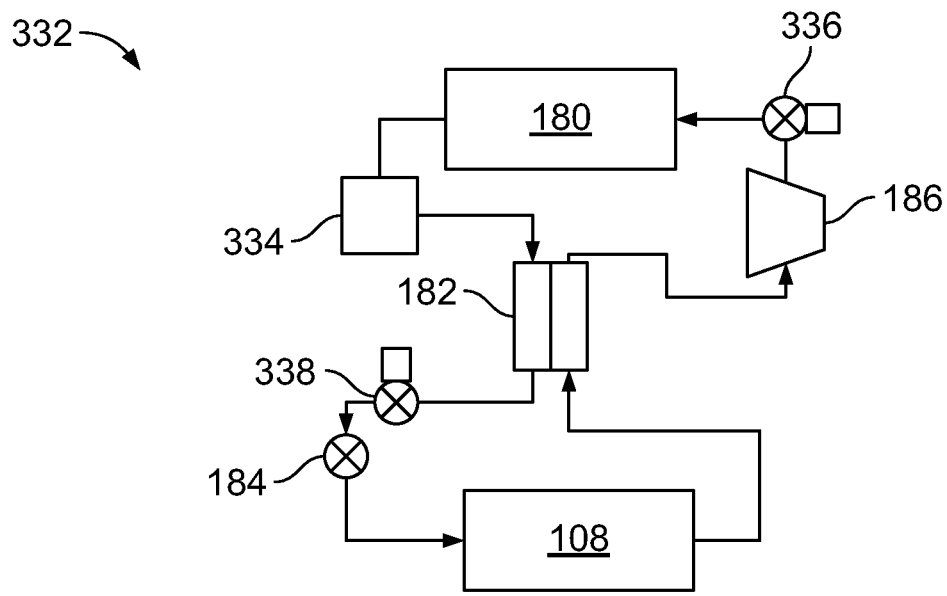
FIG. 15 is a schematic of a refrigeration system that includes a pressure vessel, a first control valve, and a second control valve.

FIG. 15 is a schematic of a refrigeration system 332 that includes a pressure vessel 334, a first control valve 336, and a second control valve 338. The pressure vessel 334 can act as pressure reservoir that enables rapid startup of the system and decreases the time required to cool (e.g., to freezing) contents of a pod in the evaporator 108. The refrigeration system 332 is substantially similar to the refrigeration system 109. However, the refrigeration system 332 includes the pressure vessel 334, the first control valve 336, and the second control valve 338. The refrigeration system 332 further does not include the first bypass line 188 and the second bypass line 190 that are part of the refrigeration system 109. Some systems include the first bypass line, the second bypass line, the pressure vessel 334, the first control valve 336, and the second control valve 338.

The first control valve 336 is disposed between the compressor 186 and the condenser 180. The second control valve 338 is disposed between the heat exchanger 182 and the expansion device 184. The pressure vessel 334 is disposed between the condenser 180 and the heat exchanger 182. The refrigerant exits the compressor 186 at a high-pressure and maintains that high-pressure until the liquid refrigerant is released by the expansion device 184. The system 332 controls the position of the valves 336, 338 (e.g., open or closed) based on the desired outcome.

During normal operation of the system 332 (e.g., when cooling pods), both the first control valve 336 and the second control valve 338 are open. Prior to idling, the second control valve 338 closes and the first control valve 336 remains open. The compressor 186 continues to run for a short time, for example, 1-5 seconds, before the first control valve 336 closes. After the first control valve 336 closes, the compressor shuts down.

When the system 332 is reactivated (e.g., to produce a serving of a cooled food or drink), the compressor 186 restarts, the first control valve 336 opens, and the second control valve 338 opens. Because high-pressure fluid is already present in the pressure vessel 334, high-pressure refrigerant flows through the expansion device 184 with the pressure drop cooling the refrigerant. This approach decreases the time required to cool the contents of a pod relative to refrigeration systems that allow to system pressures to return to ambient conditions when shutting down. If the system is at ambient conditions, no pressure drop occurs across the expansion valve initially when restarting the system. This approach has demonstrated to decrease the time required to cool the contents of a 8-ounce pod from room temperature to freezing to less than 90 seconds. The refrigeration system 332 is able to cool the refrigerant quickly or instantaneously when the system 332 initiates or boots up, for example prior to the insertion of a pod 150.

Figure 16:
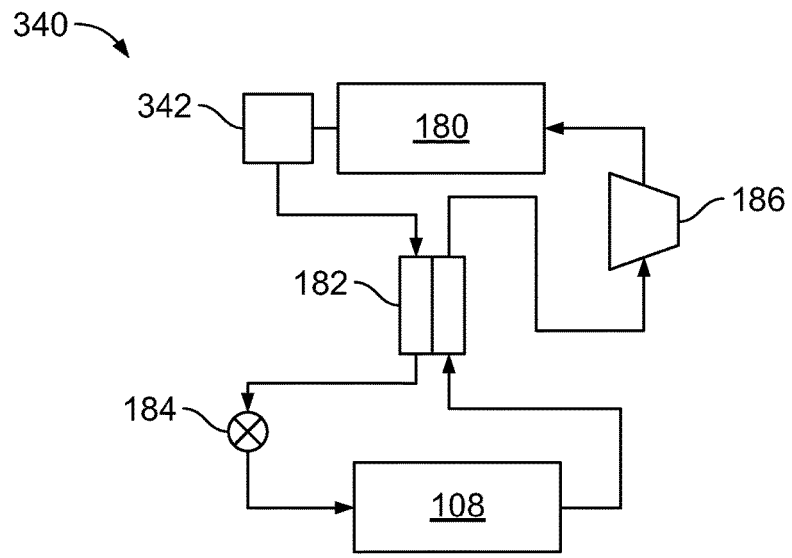
FIG. 16 is a schematic of a refrigeration system that includes a thermoelectric module.

FIG. 16 is a schematic of a refrigeration system 340 that includes a thermoelectric module 342. The thermoelectric module 342 is also known as a thermoelectric cooler or TEC. The thermoelectric module 342 converts electrical energy into the thermal energy and vice versa. The refrigeration system 340 is substantially similar to the refrigeration system 109. However, does not include the first bypass line 188 and the second bypass line 190 that are part of the refrigeration system 109. Some systems include the first bypass line, the second bypass line, and thermoelectric module 342.

Thermoelectric module 342 is a cooling element disposed between the condenser 180 and the heat exchanger 182. The thermoelectric module 342 cools the refrigerant that exits the condenser 180 prior to transferring heat to the refrigerant vapor exiting the evaporator 108 in the heat exchanger 182. Cooling the liquid refrigerant prior to expansion increases the cooling capacity of the system 340 and reduce the required compressor output. The reduction in required compressor output reduces the size of the compressor needed.

Figure 17:
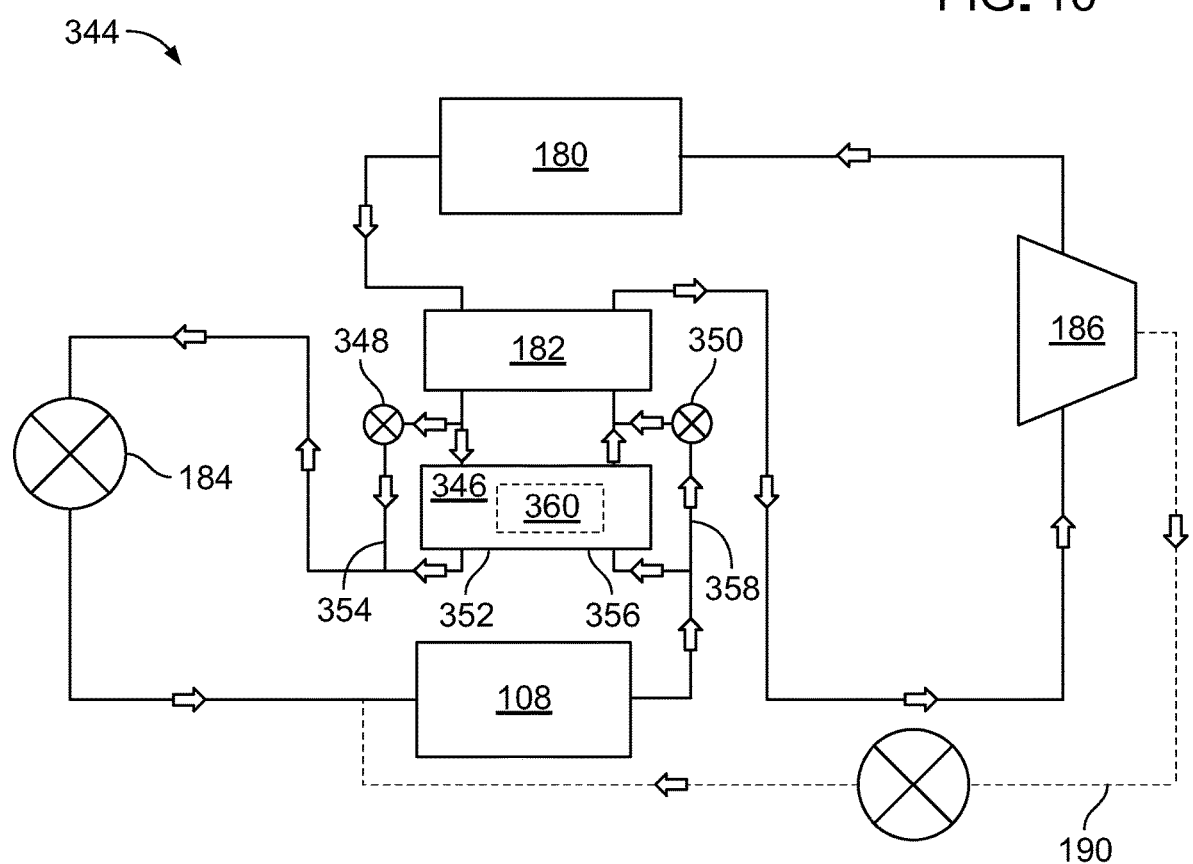
FIG. 17 is a schematic of a refrigeration system that includes a thermal battery, a first battery bypass valve, and a second battery bypass valve.

FIG. 17 is a schematic of a refrigeration system 344 that includes a thermal battery 346, a first battery bypass valve 348, and a second battery bypass valve 350. The refrigeration system 344 is substantially similar to the refrigeration system 109 but does not include the first bypass line 188 that is part of the refrigeration system 109. Some systems with the thermal battery 346 and associated valves also includes the first bypass line.

The thermal battery 346 has a first portion 352 that is disposed between the heat exchanger 182 and the expansion device 184. The first battery bypass valve 348 is disposed on a first branch line 354 that bypasses the first portion 352 of the thermal battery 346. When the first battery bypass valve 348 is open, a majority or all the refrigerant flows through the first branch line 354. The thermal battery 346 has a high pressure drop. The refrigerant primarily flows through the branch line 354 because the branch line 354 has a comparatively low pressure drop to the thermal battery 346. When the first battery bypass valve 348 is closed, the refrigerant flows through the first portion 352 of the thermal battery 346.

The thermal battery 346 has a second portion 356, thermally connected to the first portion 352, that is disposed between the evaporator 108 and the heat exchanger 182. The second battery bypass valve 350 is disposed on a second branch line 358 that bypasses the second portion 356 of the thermal battery 346. When the second battery bypass valve 350 is open a majority or all of the refrigerant flows through the second branch line 358. The thermal battery 346 has a high pressure drop. The refrigerant primarily flows through the branch line 358 because the branch line 358 has a comparatively low pressure drop to the thermal battery 346. When the second battery bypass valve 350 is closed, the refrigerant flows through the second portion 356 of the thermal battery 346.

The thermal battery 346 includes a thermal material that retains heat. The thermal battery 346 includes a reservoir 360 with a phase change material (e.g., paraffin) receives heat or emits heat, depending on the position of the first battery bypass valve 348 and the second battery bypass valve 350. The thermal battery 346 is described as using paraffin as an example of a phase change material. Some thermal batteries include other materials that retain heat or expend heat, for example ethylene glycol and water mixture, saltwater or pure water.

The thermal battery 346 emits heat from its second portion 356 to the refrigerant when the first battery bypass valve 348 is open and the second battery bypass valve 350 is closed. If the paraffin is warm or melted, the cold refrigerant will chill and solidify the paraffin in the reservoir 360. By heating the low-pressure refrigerant, the thermal battery reducing the likelihood that liquid refrigerant will flow into the compressor.

The thermal battery 346 receives heat at the first portion 352 from the refrigerant when the first battery bypass valve 348 is closed and the second battery bypass valve 350 is open. If the wax is solidified, the hot liquid refrigerant will heat and melt the wax in the wax reservoir 360. If the wax is liquid, the hot refrigerant will continue to heat the liquid wax in the wax reservoir 360.

On activation of the system 344 and during the cooling cycle, both the first battery bypass valve 348 and the second battery bypass valve 350 are open and little to no refrigerant flows interacts with the thermal battery 346. At the end of the cooling cycle, the second battery bypass valve 350 closes and the reservoir 360 cools due to the cold, low-pressure refrigerant. As the next cycle begins with a cooled battery, the second battery bypass valve 350 opens, and the first battery bypass valve 348 closes. The first portion 352 of the thermal battery 346 then pre-cools the hot liquid refrigerant exiting the condenser 180 via the heat exchanger 182.

This configuration can prevent end-of-cycle compressor flooding and can reduce the output of the compressor by reducing the heat load on the compressor. Some waxes may have a melting point in a range of 5° C.-10° C., for example, Dodecane wax or Tridecane wax.

Figure 18A:
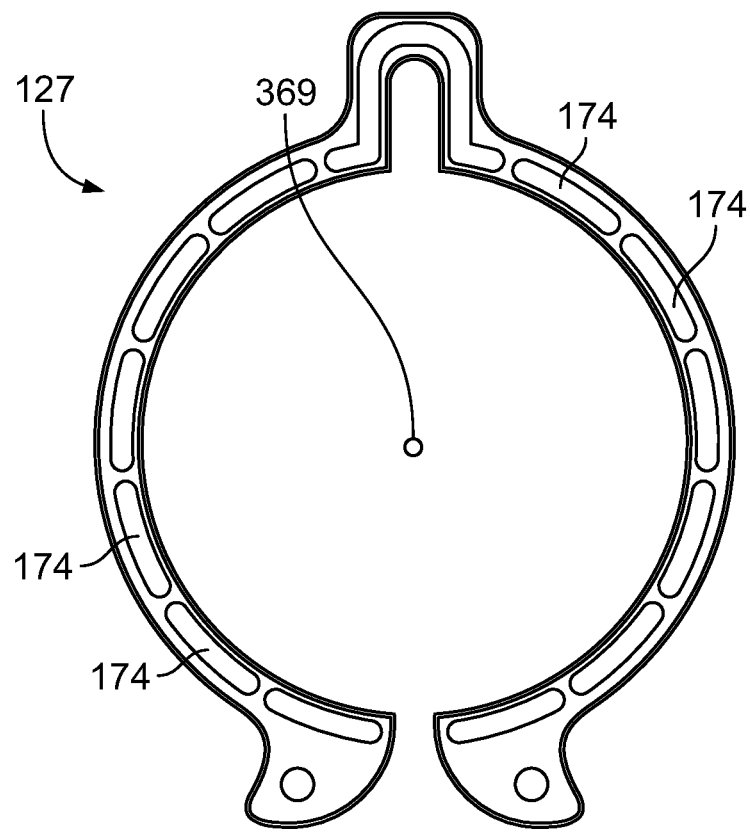
FIG. 18A is top view of an evaporator cover 127 and FIG. 18B is a top view of the body of the evaporator.
Figure 18B:
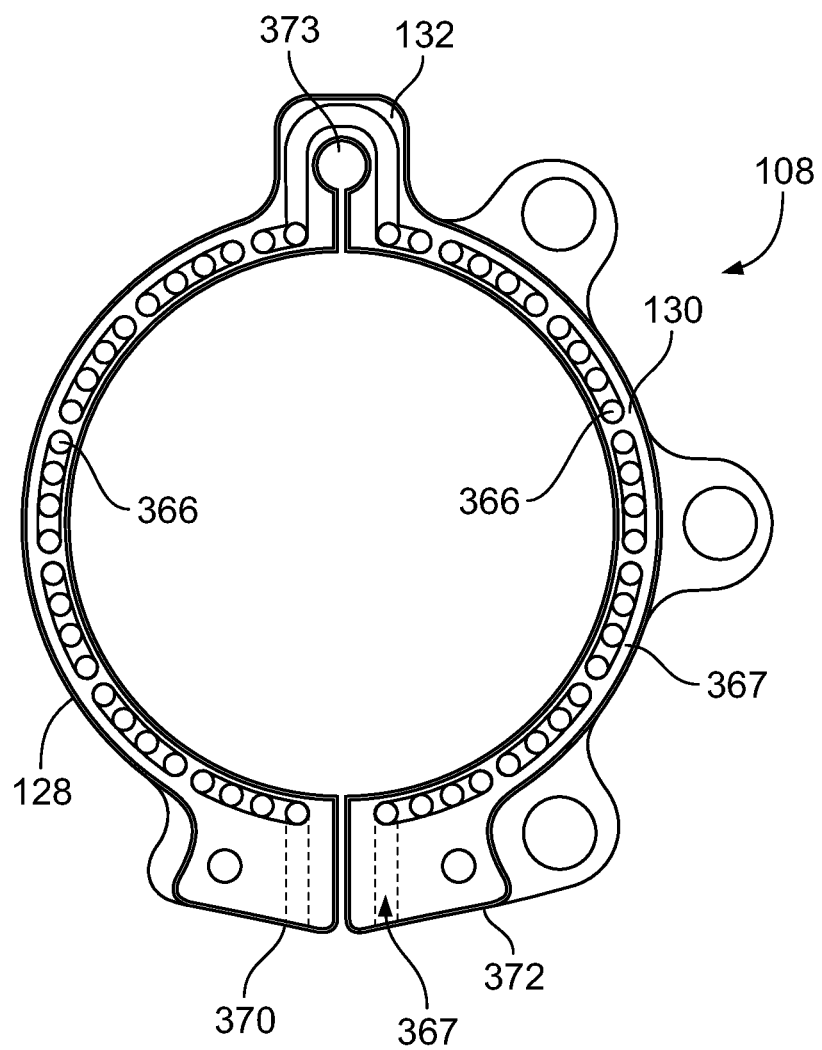

FIG. 18A is top view of an evaporator cover 127 and FIG. 18B is a top view of the body of the evaporator 108. The body of the evaporator 108 defines the channels 366 through which refrigerant flows to cool the evaporator 108. The channels 366 are open at a lip 367, as shown in FIG. 18B, of the evaporator 108. The channels 366 are also open at the opposite end of the evaporator 108 with a similarly configured lip.

The cover 127 includes multiple recesses 174 that align with four adjacent channels 366 of the evaporator 108 when the cover 127 is attached to the body of the evaporator 108. Some covers include recesses that align with other numbers of adjacent channels. The recesses 174 act as manifolds fluidly connect the adjacent channels 366. The cover 127 on the opposite ends of the body of the evaporator are circumferentially offset so that the two covers 127 and the body of the evaporator 108 together define a serpentine flow path through the evaporator 108.

The cover 127 has an inlet 370 and an outlet 372 that fluidly connects the evaporator 108 to the refrigeration system 109. Refrigerant flows through the inlet 370, through the channels defined by recesses in the body of the evaporator 108 and the cover 127, and exits the evaporator 108 through the outlet 372. The refrigerant enters the inlet 370 as a cold fluid at a first temperature. As the refrigerant flows through the flow path 368, the refrigerant warms and evaporates due to the heat received by the evaporator 108 from the pod 150. The pod 150 freezes due to this heat transfer. To maintain a constant flow speed, the inlet 370 is about 0.25 inches in diameter and the outlet 372 is about 0.31 inches in diameter.

The living hinge 132 defines a connecting channel 373 that fluidly connects channels in the first portion 128 of the evaporator 108 to channels 366 in the second portion 130 of the evaporator 108. The connecting channel 373 is defined within the evaporator 108 near the lip 367 of the evaporator 108. In some evaporators, the lip of the evaporator defines a groove and the lid defines a corresponding groove so that the connecting channel is formed between the groove of the lid and the groove of the evaporator, when the lid and evaporator engage. Some connecting channel are defined within the cover 127. This configuration defines the continuous flow path 368 from the inlet 370 to the outlet 372 in which channels 366 extend parallel to the axis 369 and flow fluid parallel to the axis 369.

In some evaporators, the channels 366 connect within the evaporator at the opposite end from the lip 367, to form a "U" shape. When assembled, the cover 127 is disposed on the lip 367 of the evaporator 108. The channels 366 are a series of unconnected "U" shaped units. In each unit, a first channel flows the refrigerant in a first direction and a second channel flows the fluid in a second direction, opposite the first direction.

The channels 366 extend parallel to an axis 369 of the evaporator. In some evaporators, the channels do not extend parallel to the axis but do extend parallel to each other. In some evaporators, the channels do not extend parallel to each other or parallel to the axis.

Figure 19A:
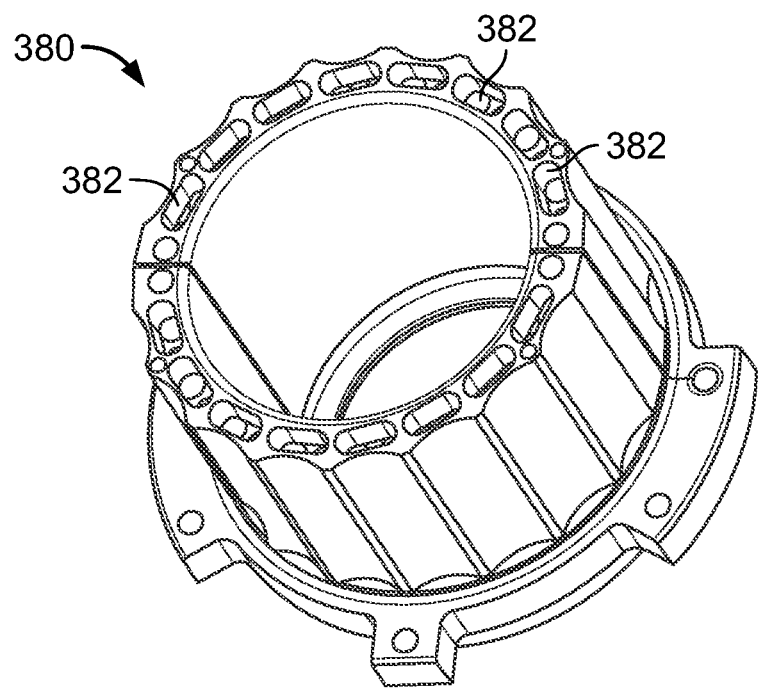
FIGS. 19A and 19B are perspective views of an evaporator with and without an associated lid.
Figure 19B:
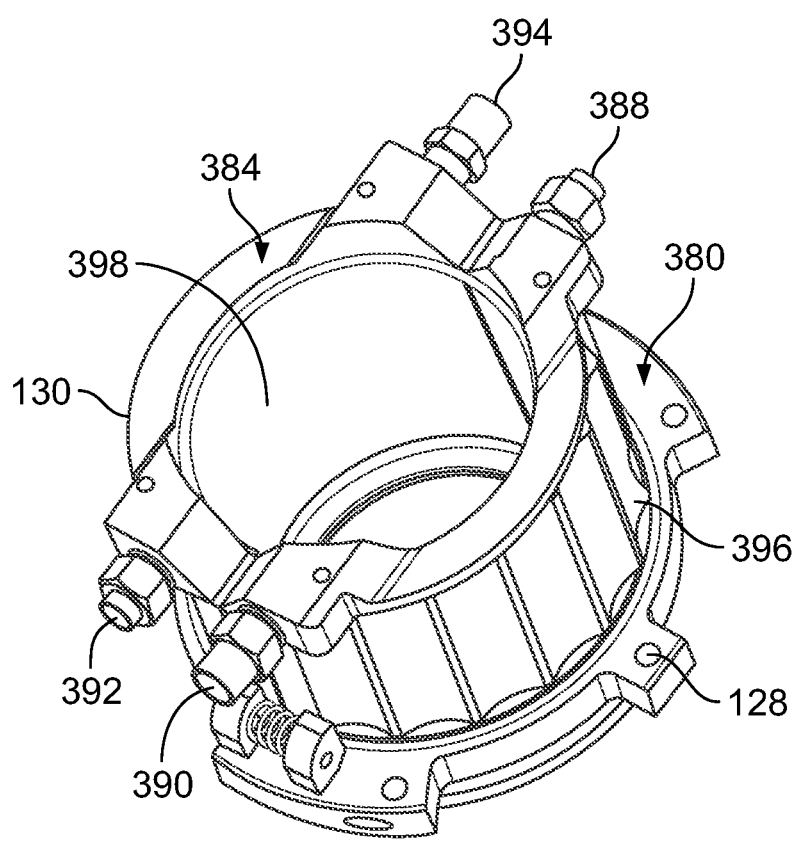

FIGS. 19A and 19B are perspective views of an evaporator 380 without and with, respectively, its cover 127. The evaporator 380 in FIGS. 19A and 19B operates similarly to the evaporator 108 described in FIGS. 18A-18B. However, the evaporator 380 includes recesses 382 that fluidly connect the second channel 366b of a unit 371 to a first channel 366a of a different unit 371. The cover 384 is substantially similar to the cover 127. However, the cover 384 is flat rather than recessed on the surface that abuts the lip 367, and includes multiple inlets and outlets, rather than a single inlet and a single outlet. The cover 384 includes a first inlet 388 on the first portion 128, a first outlet 390 on the first portion 128, a second inlet 392 on the second portion 130, and a second outlet 394 on the second portion. The first inlet 388 and first outlet 390 are fluidly connected to form a first flow path 396 on the first portion 128. The second inlet 392 and second outlet 394 fluidly connect to form a second flow path 398 on the second portion 130. This configuration forms two flow paths 396, 398 that flow refrigerant in parallel and does not use a hinge connector. To maintain flow speed, the diameters of the flow paths 396, 398 are reduced such that the divided flow paths have a similar flow area to the originating flow path.

When the cover 384 engages the evaporator 380, the recesses 382 are closed and the evaporator 380 and cover 384 form the flow paths 396, 398.

In the previously described evaporators, the units 371 have "One-up/One-down" configurations. In some evaporators, the units define "Two-Up/Two-Down" or "Three-Up/Three-Down" configurations. This can maintain proper flow speeds while minimizing the pressure drop within evaporator. Different flow path arrangements are needed for different compressors and different cooling tasks. The number of parallel flow paths can be increased for larger compressors and cooling loads and be reduced for smaller requirements.

FIGS. 20A-20D are schematic views of flow paths formed by the channels of the evaporator and recesses of its cover 127. FIGS. 20A and 20B are views of the channels defined within an evaporator. FIGS. 20C and 20D are perspective views of an evaporator and its cover 127.

FIG. 20A is a flow path 402 that increases the number of channels 400 as the refrigerant evaporates. The refrigerant enters the inlet and flows through one or more single channels 400a. At the refrigerant evaporates, it expands in volume and begins to move faster. The vapor may expand about 50-70 times in specific volume. To slow the mixed-phase refrigerant within the evaporator 108, the flow path 402 branches into two parallel channels 400b that connect at the recesses 374 and within the evaporator 108 at a turning point 306. As the refrigerant evaporates more, the flow path 402 branches again into three parallel channels 400c that connect at the recesses 374 and within the evaporator 108 at the turning point 306. In some evaporators, the "Two-Up/Two-Down" configuration is maintained for multiple units. In some evaporators, the "Three-Up/Three-Down" configuration is maintained for multiple units. In some evaporators, the flow path increase to a "Four-Up/Four-Down" or "Five-Up/Five-Down" configuration. Increasing the number of channels throughout the evaporator increases performance early in the evaporating process while limiting high velocity/pressure drop towards the outlet of the evaporator.

FIG. 20B is a schematic of the flow path 402 with a ramped recess 408 in the cover 127 that acts as a manifold. The ramped recess 408 has a smoothly increasing and decreasing cross-sectional area that helps maintains the flow speed of refrigerant flowing through manifold. A ramped cross section recess in the cover would help maintain flow velocities and also reduce pressure drop and flow separation of liquid and gas refrigerant due to low flow velocity areas.

FIG. 20C shows a flow path 420 that includes a first manifold at the bottom of the evaporator 108 and multiple branches 424 extending towards the cover 127 from the first manifold 422. The first manifold 422 connects to the inlet 370. The branches 424 fluidly connect to a second manifold 426 at the top of the evaporator 108. The second manifold 426 fluidly connects to the outlet 372.

The refrigerant flows from the inlet through the first manifold 422, up the branches 424, and through the second manifold 426 to the outlet 372. Vapor is less dense than the liquid and tends to rise to the top. This preferential flow direction can create unpredictable flow and performance when flow direction is downward. This configuration can increase thermal performance of the evaporator 108 by flowing refrigerant the in the same direction as the buoyancy force present when the refrigerant is in vapor form.

FIG. 20D shows a flow path 430 that winds around the evaporator 108. The flow path 430 is a spiral that follows the outer diameter of the evaporator 108. This configuration increases surface area and reduces pressure drop by reducing or eliminating tight turns in the flow path 430. In some evaporators, multiple hinge connectors are used to connect the first portion of the evaporator and the second portion of the evaporator when the flow path extends across the first and second portion Some flow paths define a serpentine passage on the first portion and a serpentine passage on the second portion that are connected by a "transit passage" that spans the hinge.

Figure 21A:
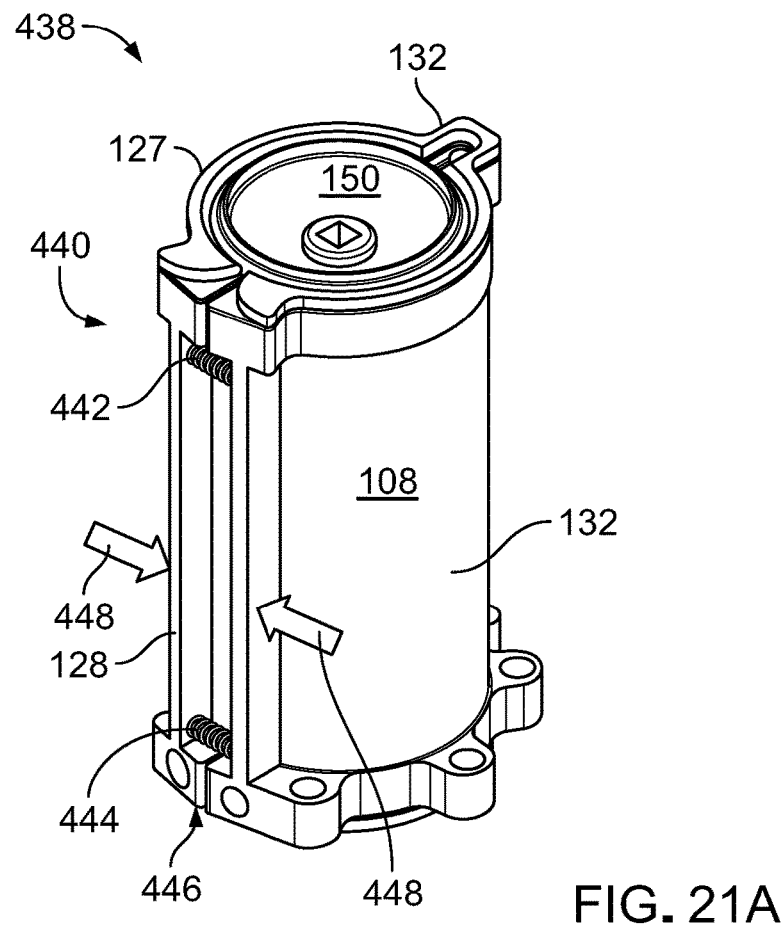
FIGS. 21A-21C are views of the pod and the evaporator with a closing mechanism.
Figure 21B:
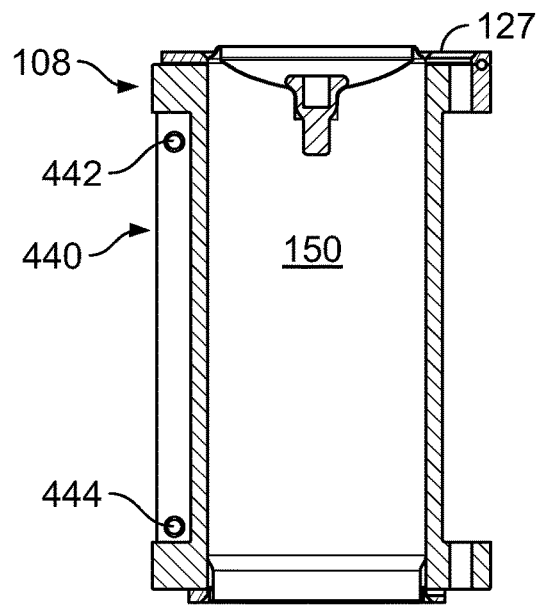
Figure 21C:
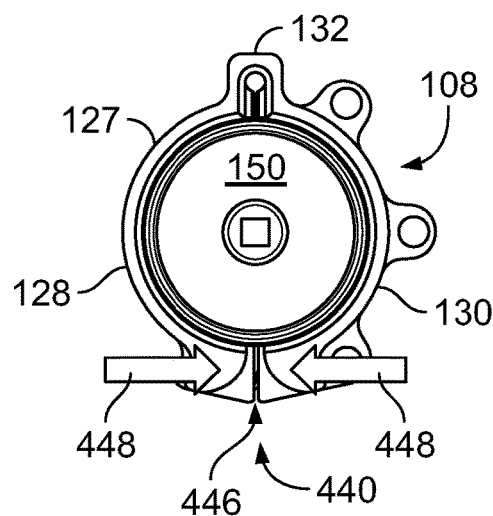

FIGS. 21A-21C are views of the pod 150 and an evaporator 438 with a closing mechanism 440. FIG. 21A is a perspective view of the evaporator 438 and pod 150. FIG. 21B is a cross-sectional view of the pod 150 and the evaporator 438. FIG. 21C is a top view of the pod 150 and the evaporator 438.

The closing mechanism 440 includes biasing elements (e.g., springs) that connects the first portion 128 of the evaporator 438 to the second portion 130 of the evaporator 438. The closing mechanism 440 also includes a circumferential cable 441 that extends around the outer diameter of the evaporator. The cable is tightened close the pod and loosened to open the evaporator.

The biasing element in evaporator 438 includes a first and second spring 442, 444 that bias the first portion 128 and the second portion 130 away from each other. The living hinge 132 facilitates the movement of the first and second portions 128, 130 such that the first and second portions 128, 130 rotation about the hinge 132 due to the biasing force of the springs 442, 444. In this configuration, the evaporator 438 is in the open position and a small gap 446 forms between the first and second portions 128, 130. The evaporator 438 is in the open position when the cover 127 is in the open position. In some machines, the position of the evaporator is independent from the position of the lid. In the open position, a small air gap exists between the evaporator 438 and the pod 150.

The evaporator 438 has a closed position in which the airgap between the evaporator 438 and the pod 150 is eliminated to promote heat transfer. In some evaporators, the air gap is simply reduced. In the closed position, the gap 446 is also eliminated. In some evaporators, the gap is reduced rather than eliminated. To move from the open position to the closed position, the closing mechanism 440 applies a force in the direction of arrows 448 to overcome the biasing force of the first and second springs 442, 444.

The closing mechanism produces a force within the range of 10 to 1500 lbs. To prevent crushing of the pod 150, the internal pressure of the pod 150 is preferably equal to or greater than the force produced by the closing mechanism 440.

The closing mechanism 440 may be, for example, an electromechanical actuator, a pulley system, a lever, projections on the lid, a ball screw, a solenoid, or a mechanical latch.

Figure 22A:
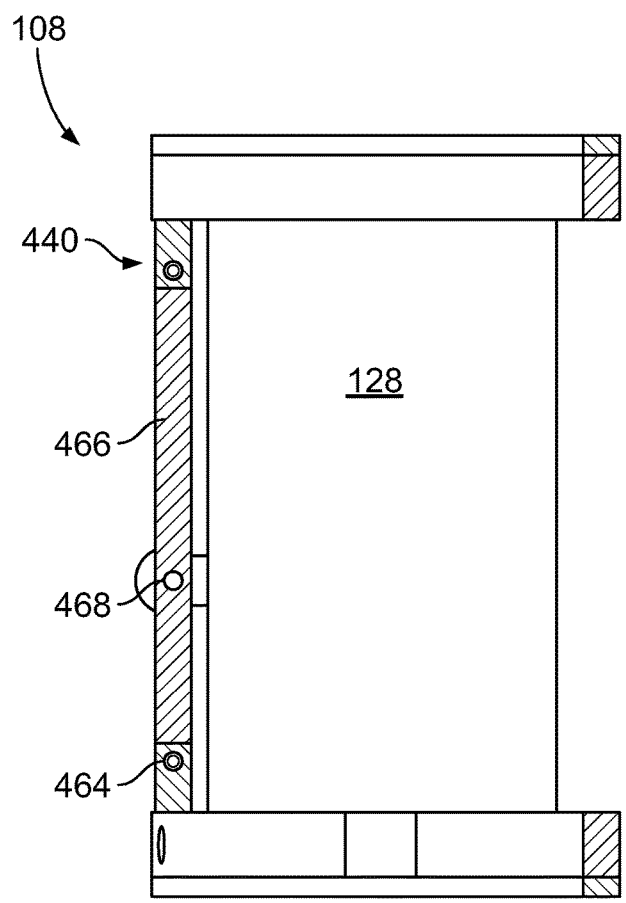
FIGS. 22A and 22B are side views of a closing mechanism that includes a first bolt and a second bolt.
Figure 22B:
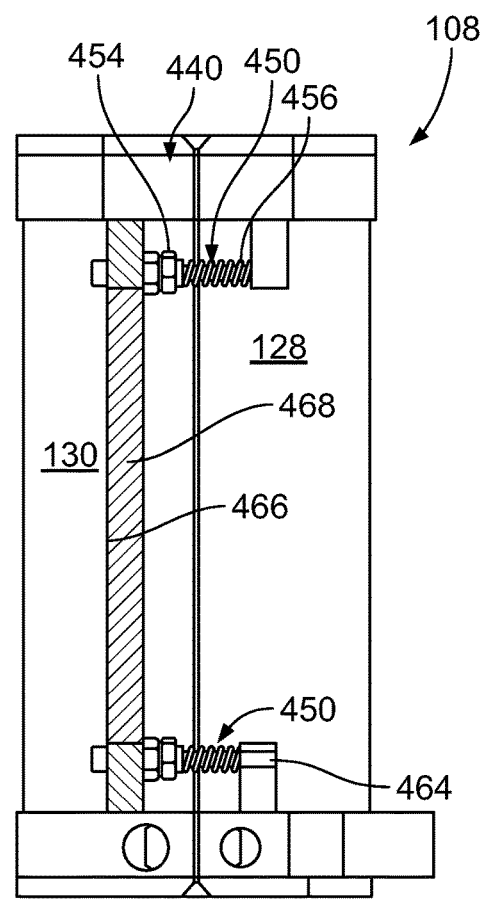

FIGS. 22A and 22B are, respectively, side and front views of an evaporator 108 with a closing mechanism 440 that includes two bolts 450 inside springs 456. The bolts 450 bias the bar 466 away from flanges 464. Optionally, a cable 468 is received in a hole defined in the bar 466 and extends around the evaporator 108.

Figure 23A:
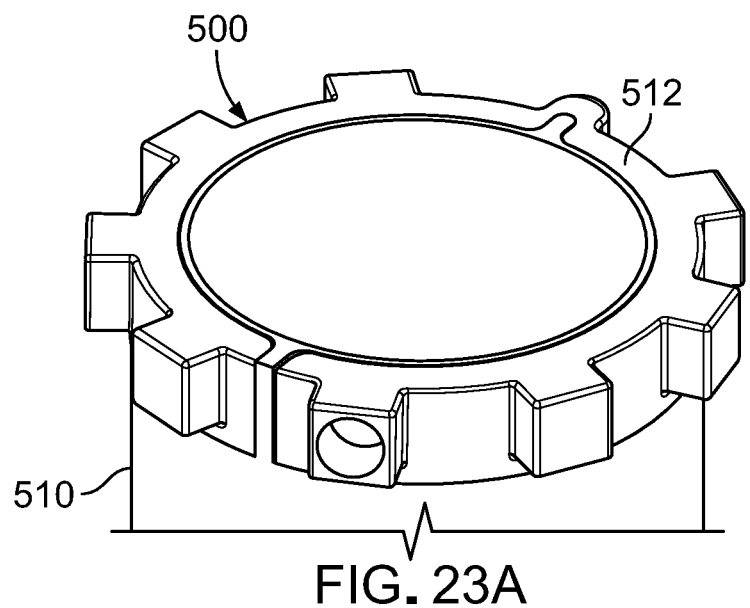
FIGS. 23A-23H illustrate an evaporator with an extruded body.

FIG. 23A shows an evaporator 500 that can be produced primarily by extrusion. The evaporator 500 has a body 510 with two end caps 512. The body 510 and the end caps are produced separately and then assembled.

Figure 23B:
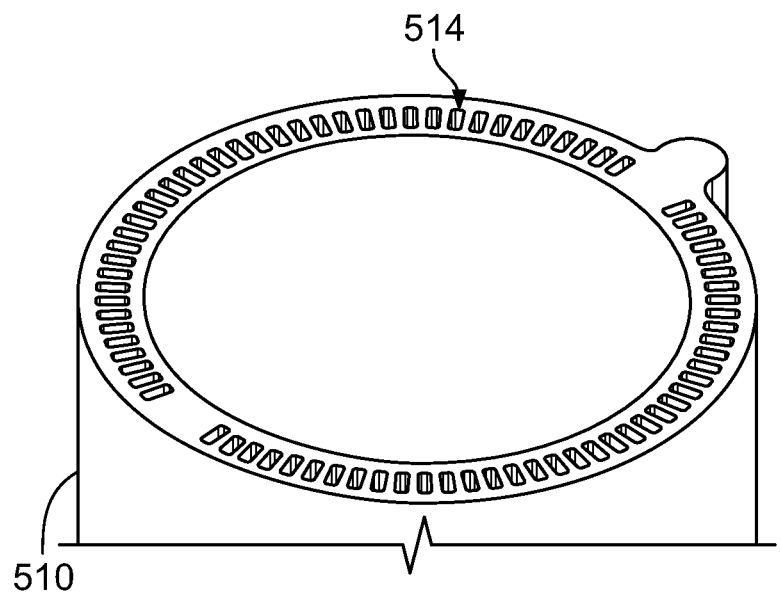
Figure 23C:
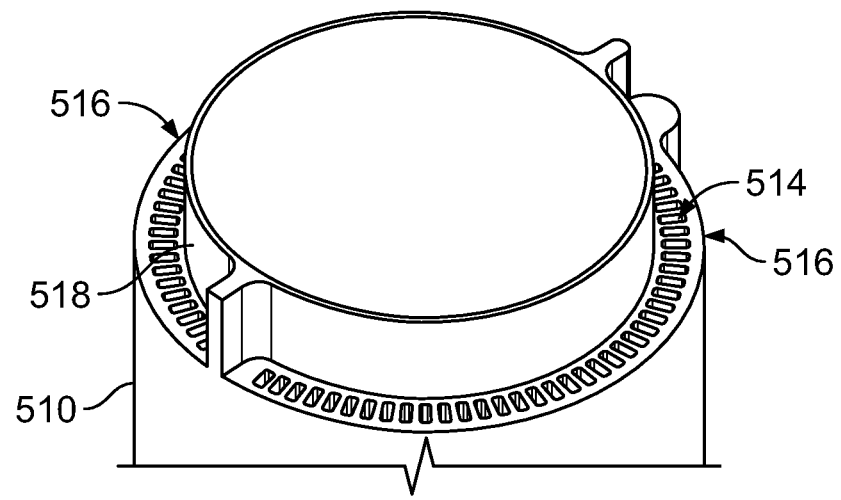

FIGS. 23B and 23C illustrate production of the body 510. The evaporator body 510 is produced by low cost extrusion. The body is extruded with the channels 514 defined in the body 510 (see FIG. 23B). Each end of the body 510 is machined to provide a shoulder 516 that mates with an end cap (see FIG. 23C). A wall 518 extends beyond the shoulder 516.

Figure 23D:
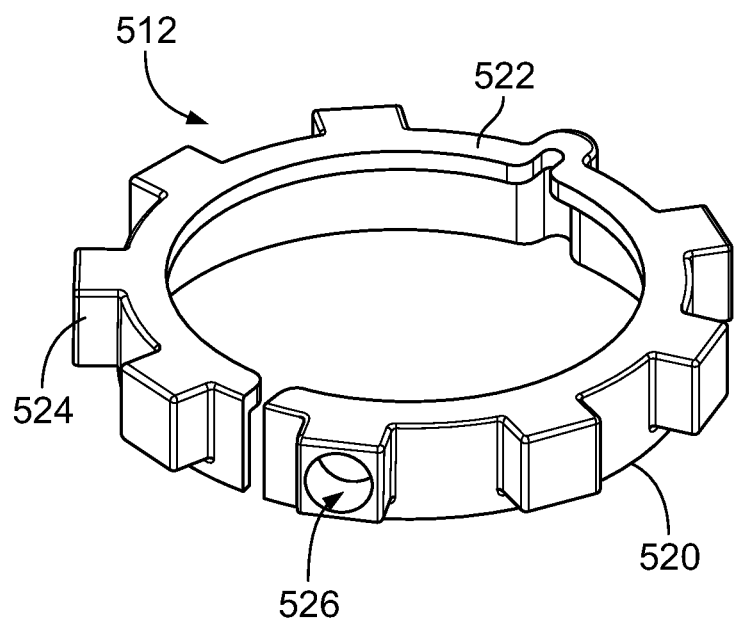
Figure 23E:
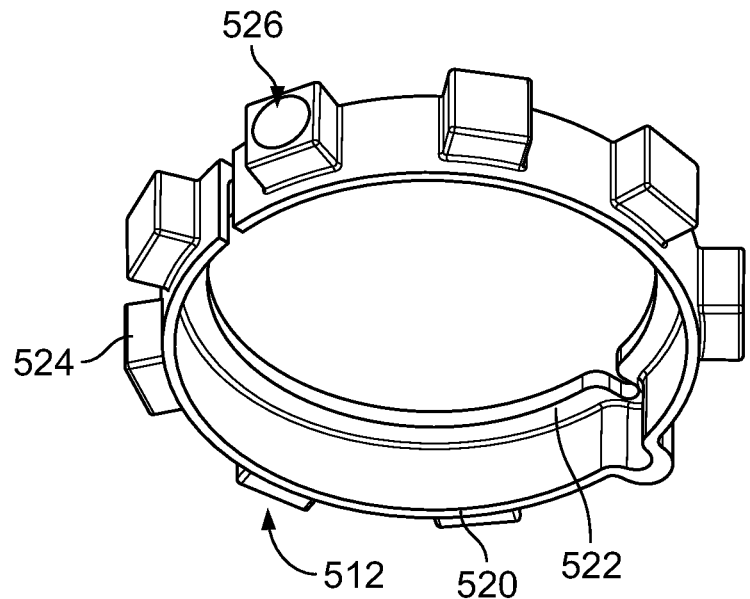

FIGS. 23D and 23E are perspective views of an end cap 512. The end caps 512 can be forged or machined. The end caps 512 provide the mounting, inlet/outlet, and closure features of the evaporator 500. The end cap 512 has a sidewall 520 and an end wall 522.

The end cap 512 has multiple bosses 524 extending outward from the sidewall 520. The bosses 524 can be used for mounting and handling the end cap 512 and, after assembly with the body 510, the evaporator 500. A port 526 extends through the sidewall 520. The port 526 of the end cap 512 on one end of the evaporator 500 is used as an inlet and the port 526 of the end cap 512 on the other end of the evaporator 500 is used as an outlet.

Figure 23F:
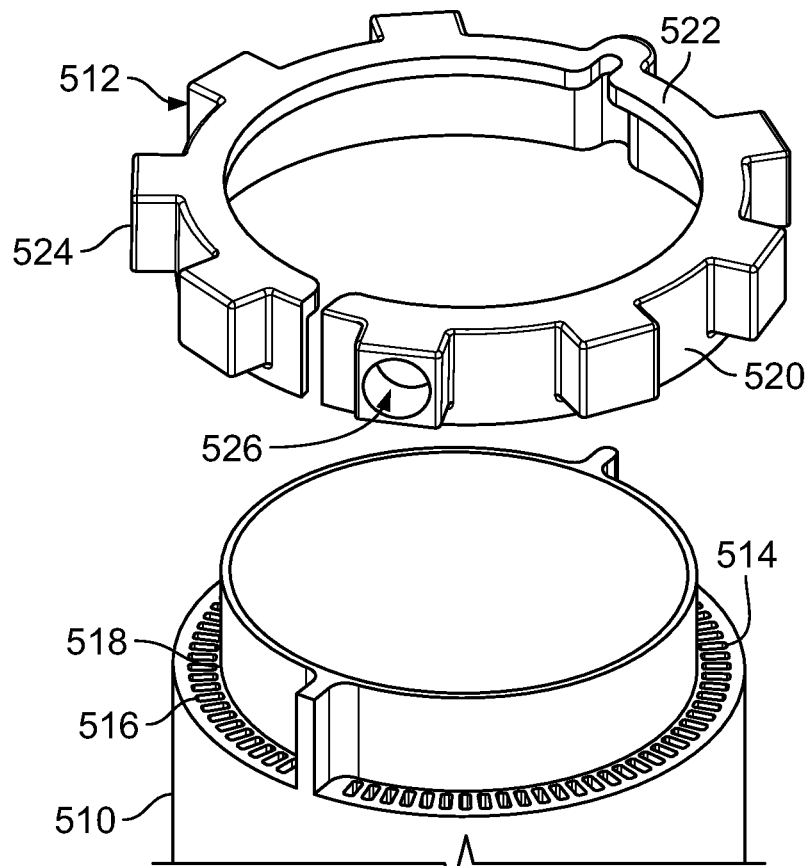

FIG. 23F illustrates assembly of the evaporator 500. The end cap 512 is mounted on the shoulder 516 on one end of the body 510. After mounting, the joints between the evaporator body 510 and the end caps 512 are easily accessible. This configuration facilitates use of laser welding, vacuum brazing, friction stir welding or TIG welding to attach the end caps 512 to the evaporator body 510.

Figure 23G:
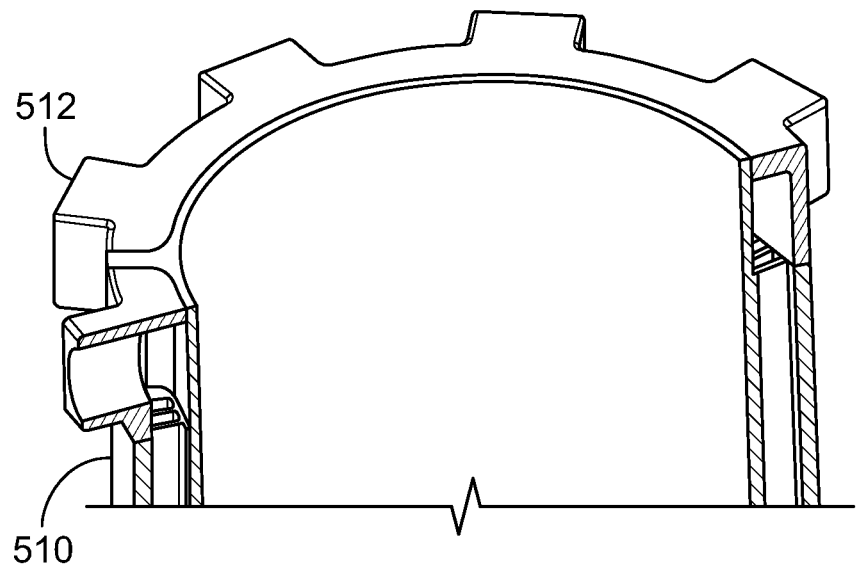
Figure 23H:
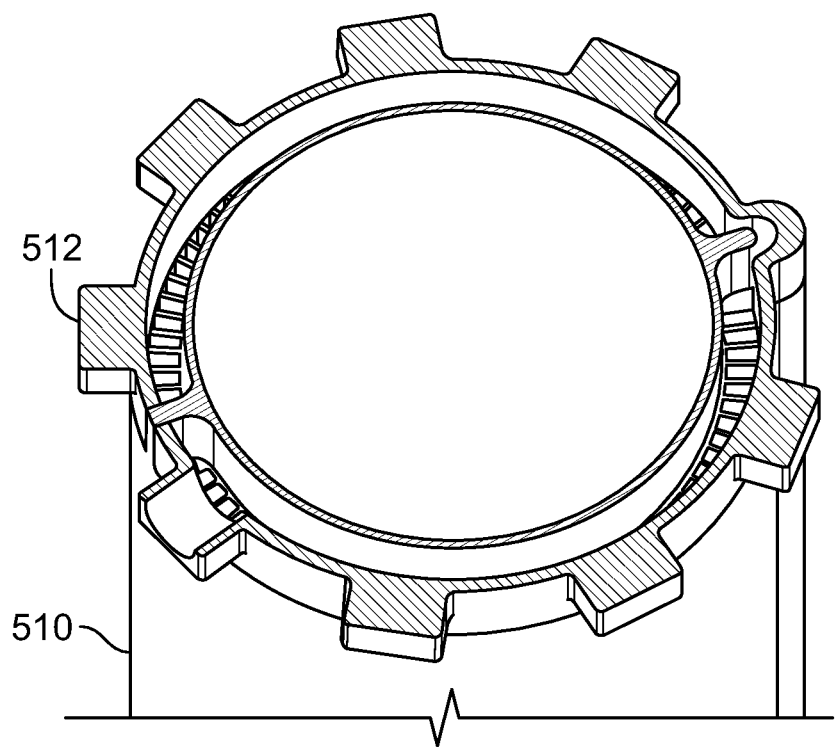

FIGS. 23G and 23H illustrate the relationship between the body 510 and the end cap 512 after assembly. When assembled with the body 510, the sidewall 520 and the end wall 522 of the end cap and the wall 518 of the body 510 define a chamber that acts as a manifold connecting the channels defined in the body 510 of the evaporator 500. The end cap 512 is shown with "hollow" configuration for evaporating up with all passages in parallel but it could be adapted for a multipath design with multiple 180 degree turnarounds.

Figure 24:
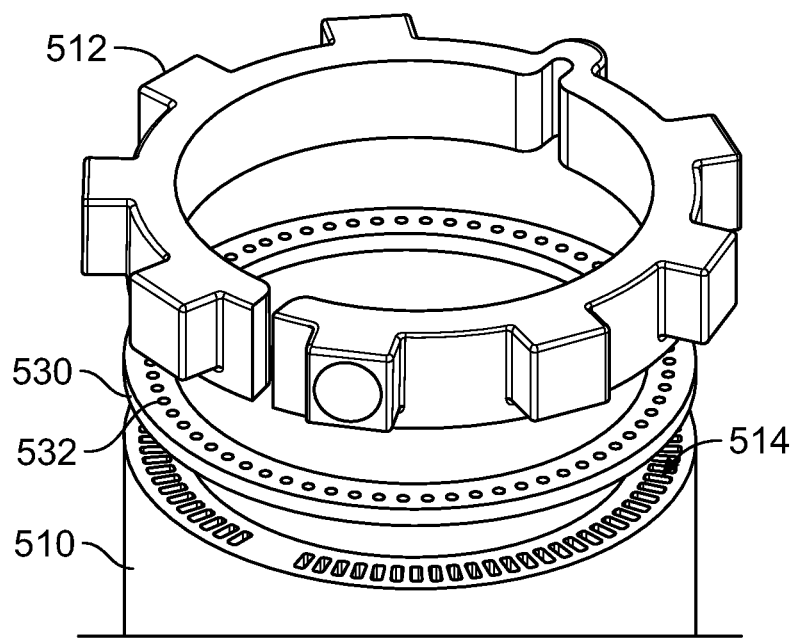
FIG. 24 illustrates an evaporator incorporating an orifice plate.

FIG. 24 shows a configuration of the evaporator 500 that incorporates an orifice plate 530. The orifice plate 530 is disposed between the body 510 and the end cap 512. The orifice plate 530 defines multiple orifices 532 that, after assembly, are aligned with the channels 514 in the body 510. The orifice plate can be used to distribute flow evenly to the channels 514 by accumulating refrigerant prior to the orifice plate 530 and injecting liquid-gas mixture equally to the channels 514. In some cases, the orifices are identical in size. In some cases, where there is likely to be maldistribution of flow between passages 514, the orifices can be different sizes.

Figure 25:
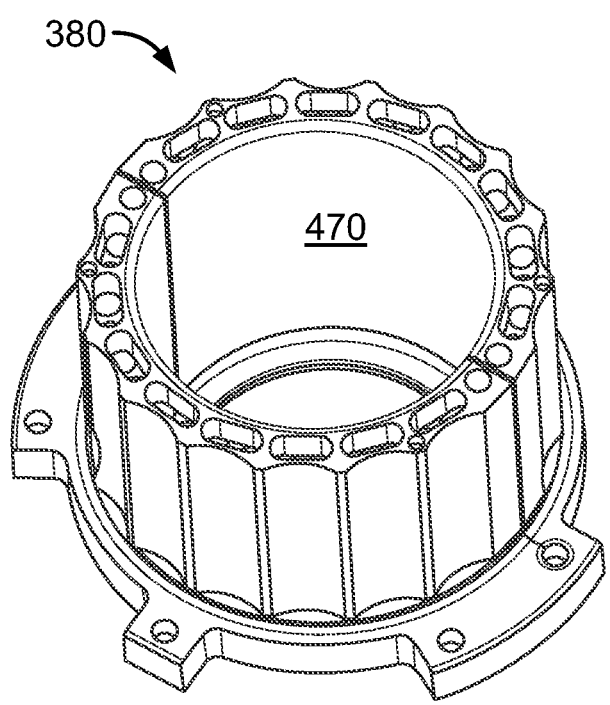
FIG. 25 is a perspective view of an evaporator, shown in FIGS. 19A and 19B with an internal surface made of a different material than the evaporator.

FIG. 25 is a perspective view of an embodiment of the evaporator 380 described with reference to FIGS. 19A and 19B with an internal surface 470 made of a different material than the remainder of the evaporator 380. The inner surface 470 is mainly or completely formed of copper. Copper has a higher thermal conductivity (approximately 391 W/mK) than aluminum that has a thermal conductivity of 180 W/mK. A high thermal conductivity moves heat quickly and efficiently from the pod to the refrigerant. A material with low thermal conductivity pass heat slower and with less efficiency. The tendency of a component to act as a heat sink is a function of both its thermal conductivity and its mass. Table 2 lists the thermal conductivity and density of a variety of materials.

TABLE 2

Conductivity under standard conditions (atmospheric pressure and 293 degrees Kelvin)

| Material | Thermal conductivity [W · m$^{-1}$ · K$^{-1}$] |
|---|---|
| Acrylic glass (Plexiglas V045i) | 0.170-0.200 |
| Alcohols, oils | 0.100 |
| Aluminium | 237 |
| Alumina | 30 |
| Boron arsenide | 1,300 |
| Copper (pure) | 401 |
| Diamond | 1,000 |
| Fiberglass or foam-glass | 0.045 |
| Polyurethane foam | 0.03 |
| Expanded polystyrene | 0.033-0.046 |
| Manganese | 7.810 |
| Water | 0.5918 |
| Marble | 2.070-2.940 |
| Silica aerogel | 0.02 |
| Snow (dry) | 0.050-0.250 |
| Teflon | 0.250 |

Figure 26A:
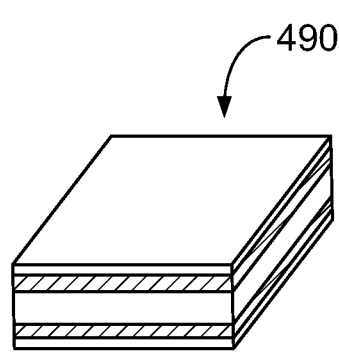
FIGS. 26A-26C are schematic views of claddings.
Figure 26B:
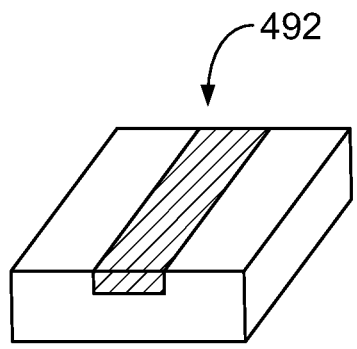
Figure 26C:
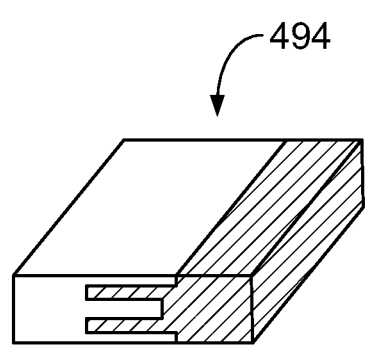

FIGS. 26A-26C are schematic views of claddings. These claddings can be used in an evaporator that includes both aluminum and copper. FIG. 26A shows an overlay cladding 490. FIG. 26B shows an inlay clad 492. FIG. 26C shows an edge clad 494. Cladding techniques as shown in FIGS. 26A-26C are applied to the inner surface of the evaporator. Different clad techniques can increase heat transfer and spread heat out, due to the high thermal conductivity of copper.

Figure 27:
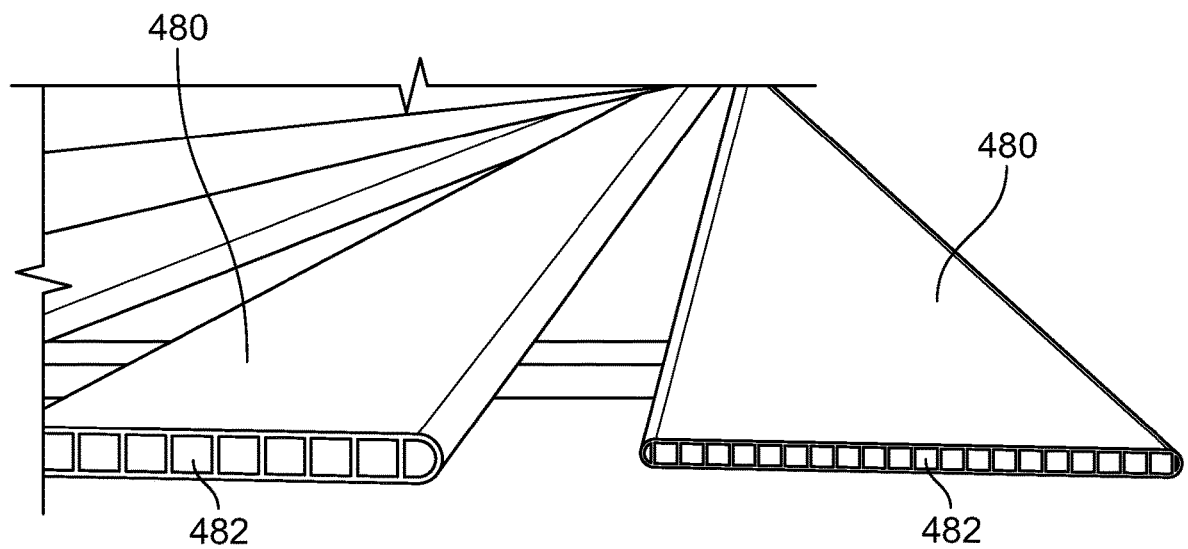
FIG. 27 is an exemplary view of a material that includes microchannels.

FIG. 27 is an exemplary view of a material 480 that includes microchannels 482. When the material 480 is used to make, for example, evaporators, refrigerant flows through the microchannels 482. The material 480 can be bent to form an evaporator that cools the pod 150. The material 480 is permanently deformed into a cylindrical shape to create a round evaporator. Such an evaporator has a high surface area which increases evaporator performance while keep costs low.

Figure 28A:
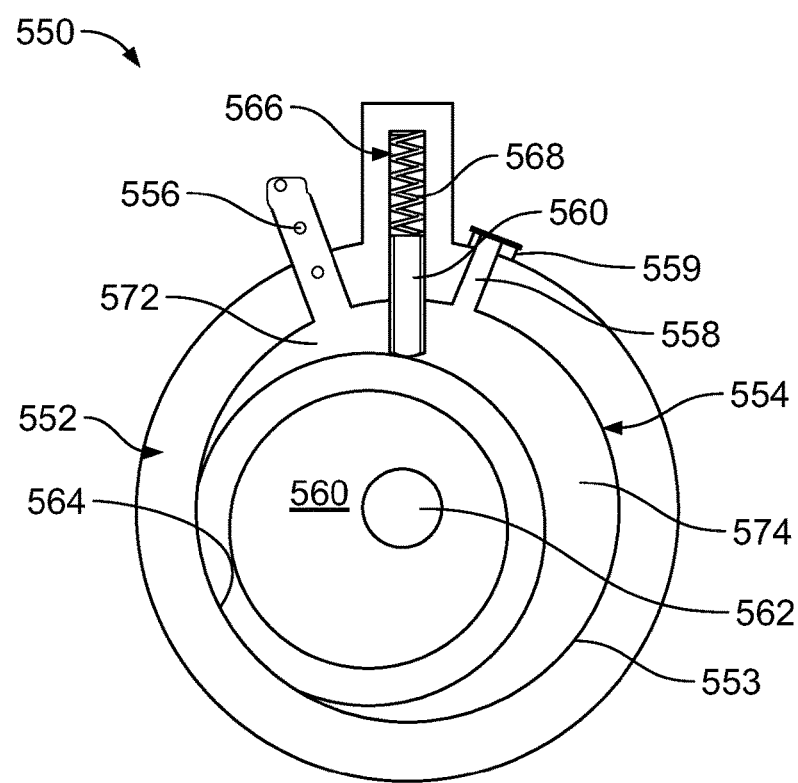
FIGS. 28A-28C are top views of a rotary compressor.
Figure 28B:
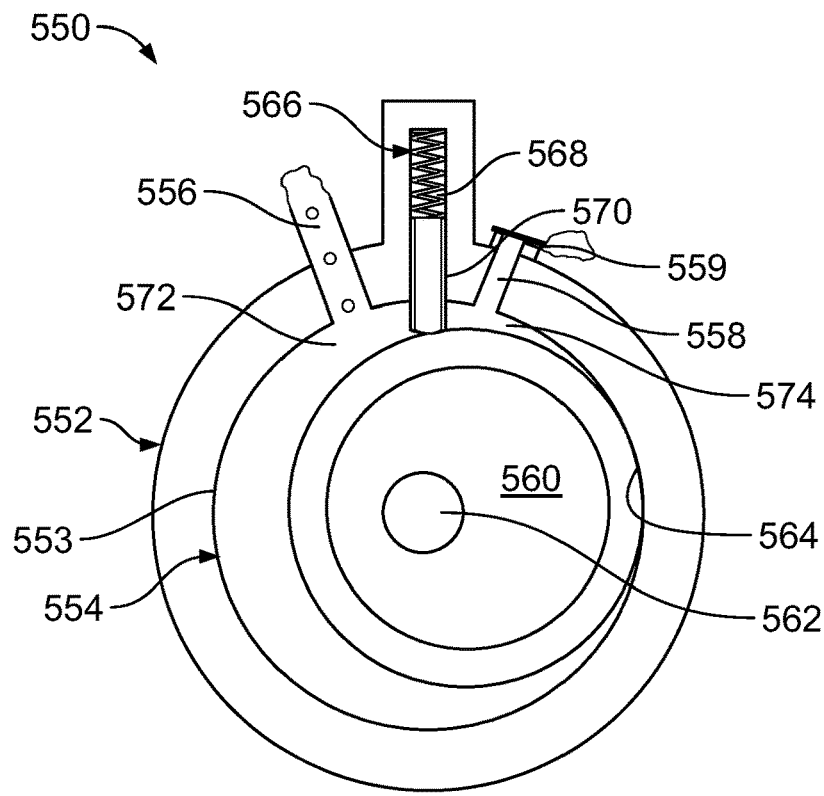
Figure 28C:
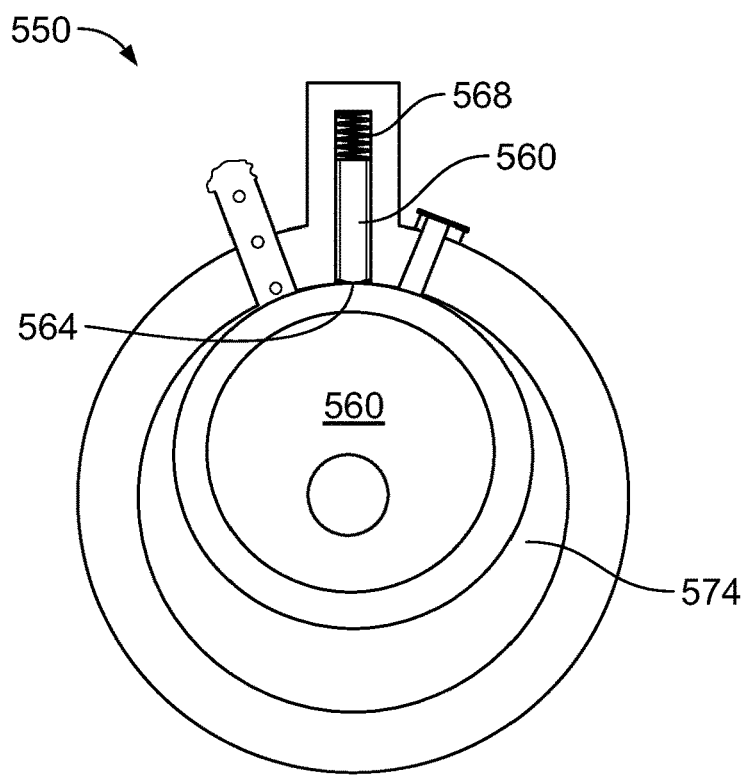

FIGS. 28A-28C show a rotary compressor 550 that is used in some refrigeration systems instead of the reciprocating compressor 186 previously described. The compressor 550 includes a housing 552 with an interior wall 553 that defines an interior cavity 554. An inlet 556 and an outlet 558 fluidly connect the interior cavity 554 of the compressor 550 to other components of the refrigeration system. A pressure valve 559 releases fluid when the fluid reaches a predetermined pressure. A roller 560 with a circular cross section, is rotationally and axially constrained to a rod 562 that extends through a bottom section of the housing 552. Some rollers have ellipse shaped or gear shaped cross sections. The rod 562 is attached off center from the circular cross section of the roller 560. The rod 562 and roller 560 rotate relative to the housing 557 using a motor (not shown). The roller 560 is arranged in the cavity 554 such that an edge 564 of the roller 560 extends to the interior wall 553 of the housing. In this configuration, the roller 560 forms a seal with the housing 557. The edge 564 of the roller 560 maintains contact on the wall 553 as the rod 562 and the roller 560 rotate within the interior cavity 554. The housing 557 includes a notched area 566 for containing a compressed spring 568. The spring 568 abuts the roller 560. A rubber member 570 surrounds a portion of the spring 568 to form a seal that extends from the wall 553 to the roller 560. The spring 568 expands and contracts as the roller 560 rotates within the interior cavity 554, to maintain the seal.

In FIG. 28A, the compressor 550 is in a first state. In FIG. 28B, the rotary compressor 550 is in a second state and in FIG. 28C, the rotary compressor 550 is in a third state. The rotary compressor 550 moves from the first state to the second state, from the second state to the third state, and from the third state to the first state. In the first state, the roller 560 receives low-pressure pressure cool vapor from the evaporator 108 via the inlet 556. The seal between the contact edge 564 and the wall 553 and the seal between the member 570 and the roller 560 define an intake chamber 572 and a pressurizing chamber 574. In some rotary compressors, additional seals are formed that increase the number of chambers. The roller 560 rotates to compress and pressurize vapor in the pressurizing chamber 574 and to draw in vapor to intake chamber 572 from the inlet 556. In the second state, shown in FIG. 28B, the roller 560 continues to rotate counterclockwise and increase the pressure of the vapor in the pressurizing chamber 574 until the pressure valve 559 releases the high-pressure vapor out of the compressor 550. The intake chamber continues to receive low-pressure vapor from the inlet 556. The compressed spring 568 extends into the interior cavity 554 as the roller 560 rotates, to maintain connection between the member 570 and the roller 560. In the third state, shown in FIG. 28C, the high-pressure vapor has been expelled from the pressurizing chamber 574 and the spring 568 is compressed into the notched area 566. In this state, only one seal is formed between the contact edge 564 and the member 570. For a brief period in the cycle the number of chambers is reduced by one. At this state in the compressor 550, the intake chamber 572 becomes the pressurizing chamber 574. The intake chamber 572 is reformed when the contact edge 564 passes the member 570 and two seals are formed, one by the member 570 and roller 560 and the other by the contact edge 564 and the wall 553.

The rotary compressor performs the same thermal duty as the reciprocating compressor at a much lower weight and smaller size. The rotary compressor has a weight of about 10 to about 18 lbs. The rotary compressor has a displacement of refrigerant of about 4 cc to about 16 cc. For example, in some machines a 16 cc rotary compressor is used. The rotary compressor has a performance vs. weight ratio of about 0.3 cc/lb to about 0.5 cc/lb.

Figure 29A:
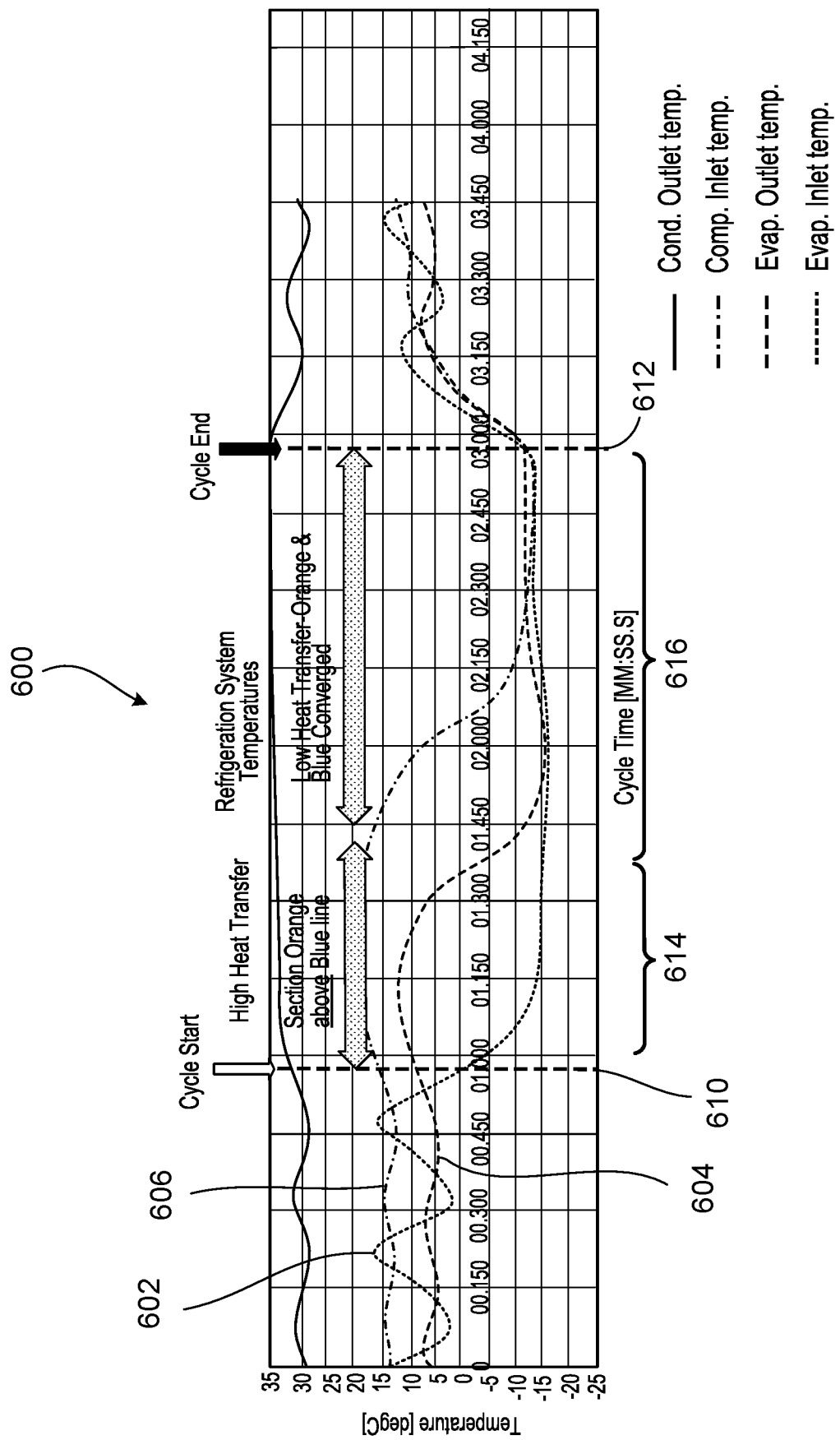
FIGS. 29A-29B are plots of the freezing cycle for freezing ice cream.
Figure 29B:
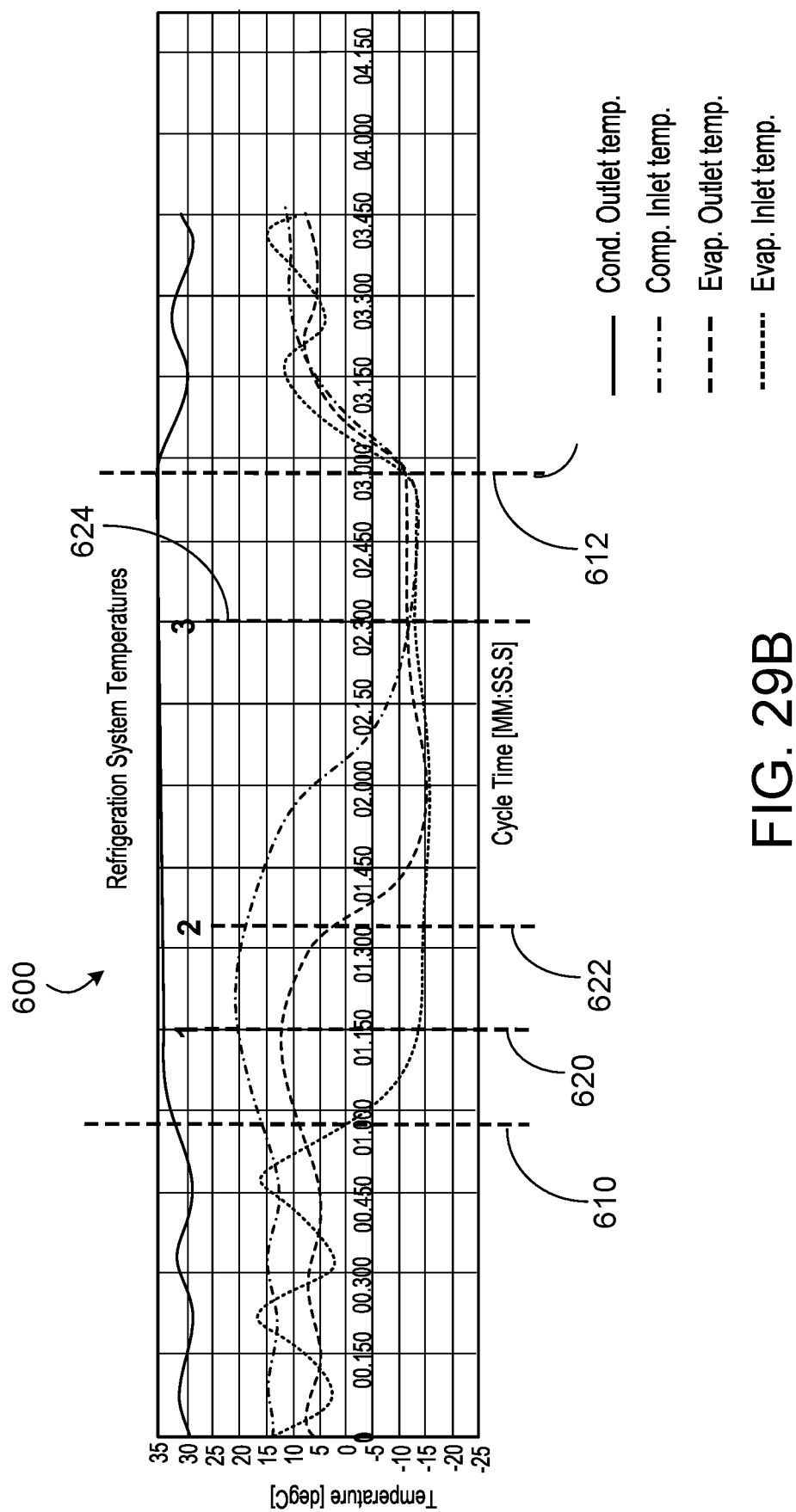

FIGS. 29A and 29B are plots of evaporator temperatures (e.g., evaporator 108) throughout a freezing cycle 600. When a processor of the machine begins a freezing cycle, refrigerant flows through the evaporator exchanging heat from the ingredients (e.g., ice cream) within a pod (e.g., pod 150) to the refrigerant. This causes temperature differences between the evaporator inlet and the evaporator outlet. Although discussed relative to ice cream, the concepts apply to the freezing of other ingredients.

At the beginning of the freezing cycle 610 (e.g., within the first 20-30 seconds of the freezing cycle 610 and/or within the first half of the freezing cycle 610), the temperature of refrigerant passing through the inlet of the evaporator (denoted as the evaporator inlet temperature 602) decreases rapidly. In the example shown, the evaporator inlet temperature 602 decreases from 5-15° C. to −15° C., which is below the freezing point of ice cream, within 20-30 seconds of beginning the freezing cycle 610. The refrigerant passing through the outlet of the evaporator (denoted as the evaporator outlet temperature 604) is greater than 5° C. for the same period of time. The temperature difference between the evaporator inlet temperature 602 and the evaporator outlet temperature 604 is greater than 15° C. at the beginning of the freezing cycle 610 (e.g., for at least a portion of the first 20 seconds of the freezing cycle). In some systems, the temperature difference is greater than 20° C. within 15 seconds of beginning the freezing cycle 610 or greater than 25° C. within 20 seconds of beginning the freezing cycle 610. The temperature difference can also be greater than 15° C. for a duration of at least 20 seconds within 30 seconds of beginning the freezing cycle 610.

As the ice cream freezes, thermal energy is transferred from the pod to the evaporator which includes the refrigerant. The size and shape of the evaporator influence the effectiveness of this heat transfer. One measure of effectiveness of the evaporator in extracting heat from the ice cream is indicated by the temperature of the refrigerant at the evaporator outlet (e.g., the evaporator outlet temperature 604). An evaporator outlet temperature 604 larger than the temperature of the refrigerant at the evaporator inlet (e.g., the evaporator inlet temperature 602) is an indication that heat is absorbed from the ice cream. A large temperature difference between the evaporator outlet and the evaporator inlet results from heat transfer due to effective mixing and/or a minimal gap between the evaporator and the pod. The freezing cycle 600 continues until the desired temperature of the ice cream is reached. The ending of the freezing cycle 612 corresponds to when the machine ends the freezing cycle 600.

For example, during a first portion 614 (e.g., within the first 0-30 seconds) of the freezing cycle 600, the evaporator inlet temperature 602 is about −15° C. and the evaporator outlet temperature 604 is about 10° C. Because of the large temperature difference, the first portion 614 is associated with a high heat transfer. While high heat transfer is present, the outlet temperature is above the freezing point of the ice cream because the refrigerant has become superheated as the refrigerant travels through the evaporator and absorbs heat from the pod. In this example, the refrigerant becomes superheated as the refrigerant travels through the evaporator from the evaporator inlet to the evaporator outlet. The refrigerant passes through the evaporator outlet in a superheated state during the first 30 seconds of the freezing cycle 600. The refrigerant passes through an evaporator outlet in a superheated state during at least part of the first half of the freezing cycle and the refrigerant passes through the evaporator outlet in a non-superheated state by the end of the freezing cycle.

Since the temperature is above the freezing point of the ice cream, a portion of the evaporator that is above the freezing point of ice cream does not contribute to freezing the ice cream during this first portion 614 of the freezing cycle 600. The evaporator is less effectively transferring heat from the ice cream during the first portion 614.

In contrast, during the second portion 616 of the freezing cycle 600 (e.g., the remainder of the freezing cycle 600 and/or the second half of the freezing cycle 600), the temperature of the refrigerant passing through the outlet (e.g., evaporator outlet temperature 604) decreases to about −15° C., which is substantially similar to the evaporator inlet temperature 602 (e.g., within a 5° C. temperature difference). The temperature difference between the evaporator inlet temperature 602 and the evaporator outlet temperature 604 is less than 5° C. at the end of the freezing cycle 610. The duration of the freezing cycle 610 is about 2 minutes, but in other cases the duration of the freezing cycle 610 is less than 2 minutes (e.g., 110 seconds, 100 seconds, 90 seconds, or less than one minute.). The temperature difference between the evaporator inlet temperature 602 and the evaporator outlet temperature 604 varies between a difference greater than 25° C. within the first 20 seconds of beginning the freezing cycle 610 and a difference less than 5° C. by the end of the freezing cycle 610.

FIG. 29A also shows that the temperature difference between the evaporator inlet temperature 602 and the evaporator outlet temperature 604 is less than 5° C. within 1 minute of beginning the freezing cycle 610. The temperature difference of less than 5° C. is maintained for the remainder of the freezing cycle 610 (e.g., the remaining 1 minute of a 2 minute freezing cycle 610).

The temperature difference between the evaporator inlet temperature 602 and the evaporator outlet temperature 604 being less than 5° C. by the end of the freezing cycle 610 The evaporator is no longer effectively cooling the ice cream once the temperature difference is less than 5° C. This is because the ingredients of the pod adjacent to the sidewall of the pod are already cooled down to the refrigerant temperature flowing through the inlet of the evaporator (e.g., evaporator inlet temperature 602). However, even though the ingredients adjacent to the sidewall of the pod are at the desired temperature, the pod might also include warmer ingredients that require further cooling. This is why it is important to mix the ingredients using the mixing paddle during the freezing cycle to allow the warmer ingredients within to move to the cooler sidewall of the pod. This is also why it is important to continue the freezing cycle for some time even after the temperature difference between the evaporator inlet temperature 602 and the evaporator outlet temperature 604 is less than 5° C. (e.g., so that all the ingredients within the pod have sufficient time to cool down to below the freezing temperature of the ingredients). The duration of the freezing cycle is designed strike a balance between freezing all (or at least 90% of the ingredients of the pod), reducing risk to the compressor, and managing the transient nature of freezing a serving of ice cream on-demand.

Once the temperature difference between the evaporator inlet temperature 602 and the evaporator outlet temperature 604 is less than 5° C., less thermal energy is being transferred from the ice cream to the evaporator. This lower heat transfer is driven by the lower temperature differences between the ice cream temperature and the refrigerant and the effectiveness of mixing highly viscous ice cream and exposing warm ice cream to the cold wall of the pod. The second portion 616 is associated with a low heat transfer section. The evaporator is not effectively transferring heat from the ice cream during the second portion 616. Once the temperature difference between the evaporator inlet temperature 602 and the evaporator outlet temperature 604 is less than 5° C., that temperature difference is often maintained for the duration of the freezing cycle.

FIG. 29B illustrates the freezing cycle 600 with three markers. The first marker 620 represents a time of the freezing cycle 600 with high heat transfer, the second marker 622 represents a time of the freezing cycle 600 with transitional heat transfer, and the third marker 624 represents a time of the freezing cycle 600 associated with low heat transfer. These markers 620, 622, 624 are further described with reference to FIGS. 30A-30H.

Figure 30A:
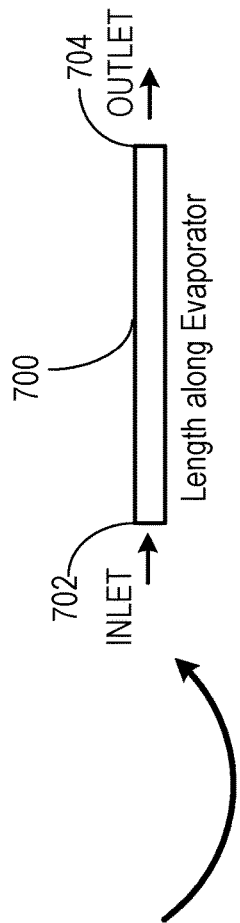
FIGS. 30A-30H are contours and plots representing temperature along the length of the evaporator.

FIGS. 30A-30H illustrate the spatially varying heat along the length of the evaporator associated with the three markers 620, 622, 624 introduced with respect to FIG. 29B. FIG. 30A illustrates a cross-section of an evaporator 700 for cooling a pod with an inlet 702 and an outlet 704. Evaporator 700 is substantially similar to evaporator 108 of machine 100. The inlet 702 and outlet 704 diameters of the evaporator 700 channels are 5/16 inches (0.313 inches). The weight of the evaporator 700, including u-shaped micro-channel covers and manifolds on both ends without handles is 0.59 lb. In some examples, the weight of the evaporator 700, including u-shaped micro-channel covers and manifolds on both ends without handles is between 0.7 lb and 1.0 lb dry (e.g., without refrigerant). The weight of the refrigerant is between 70 grams and 150 grams (e.g., between 80-90 grams). In this case, the weight of evaporator 700 with 150 grams of refrigerant within the channels is 1.03 lb-1.33 lb. A diameter of the u-shaped micro channels is 0.086 in. An aggregate length of the u-shaped micro-channels around the circumference of the evaporator is 175 in. The heat transfer surface area (evaporator 700 internal diameter surface area) is 26.5 in$^2$. Some evaporators have other dimensions.

Figure 30B:
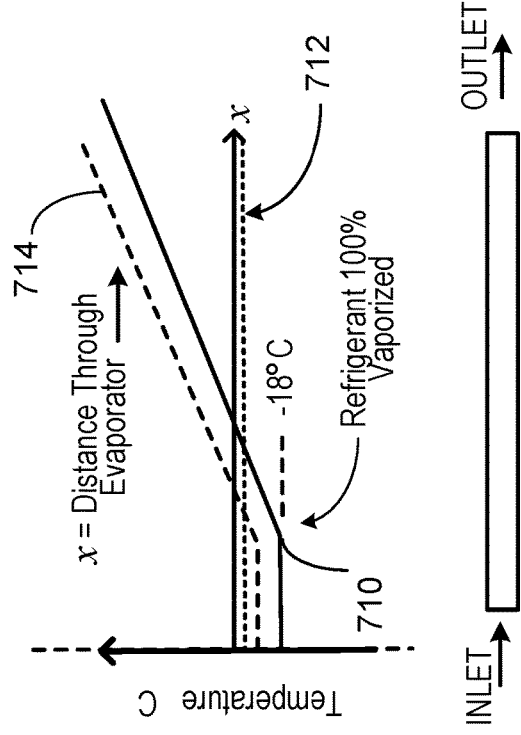

FIG. 30B illustrates the evaporator 700 "unrolled" to indicate a linear dimension representing the curved path the refrigerant traverses through the evaporator 700. FIGS. 30C-30H are temperature plots of the temperature along the length of the evaporator for the three markers 620, 622, 624 introduced in FIG. 29B.

Figure 30C:
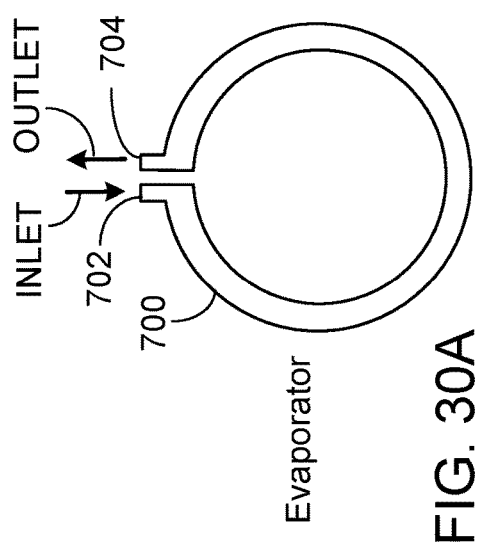

FIG. 30C shows "hot" and "cold" regions 718, 716, of temperature along the evaporator 700 at the first marker 620. The hot and cold regions 718, 716 are not intended to represent absolute or specific temperatures. The hot and cold regions 718, 716 simply illustrate a temperature difference, where the hot region 718 has a higher temperature than the cold region 716. In the example shown, the first marker 620 represents about 15-20 seconds into the freezing cycle 600 and the evaporator inlet temperature 602 is −18° C. with the refrigerant being a liquid and gas mixture.

As shown in FIG. 30C, the evaporator inlet 702 is cold and the evaporator outlet 704 is hot. FIG. 30C shows that about 75% of the evaporator length is hot at this point in the cycle despite the first marker 620 being associated with a high heat transfer process, as previously described. The "evaporator length" is a circular path around the evaporator 700 between evaporator inlet 702 and the evaporator outlet 704. As the "cold" refrigerant enters the evaporator 700 through the evaporator inlet 702, the refrigerant causes a large amount of heat transfer from the pod along a first portion (associated with the cold region 716) of the length of the evaporator 700. Once the heat is transferred from the ice cream during the freezing cycle, the evaporator temperature increases and becomes "hot" and remains hot for a second portion (associated with the hot region 718) of length of the evaporator 700. The temperature along an inner surface of evaporator 700 increases along a circumferential direction during the freezing cycle 600. In this example, a majority of the evaporator length contains vaporized refrigerant within 20 seconds of beginning the freezing cycle 610.

Figure 30D:
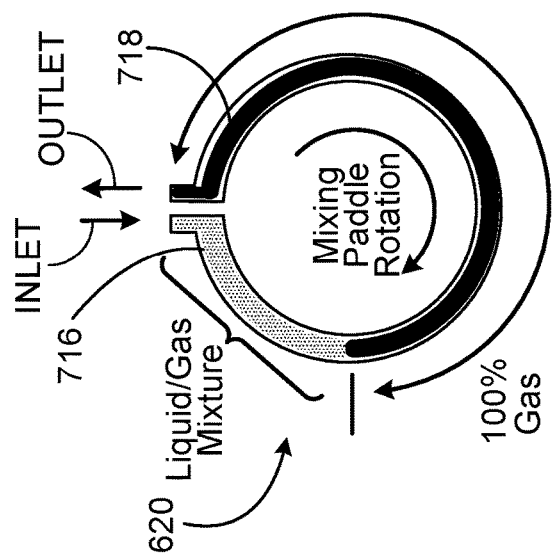

FIG. 30D illustrates that, once the refrigerant in the evaporator is fully vaporized 710 and enters a superheated state, the temperature of the refrigerant and the temperature of the inside surface of the evaporator begin to rise. Once the temperature of a part of the length of the evaporator 700 becomes greater than the ice cream freezing temperature 712, that part of the length of the evaporator is no longer effective in freezing ice cream. In the example shown in FIG. 30D, the actual ice cream temperature 714 is above the ice cream freezing temperature 712 for a majority of the length along the evaporator (approximately 75%). The evaporator outlet temperature 606 is about 10° C. (corresponding to the result seen in FIG. 29B). As previously described, the first portion 716 allows effective heat transfer, but since heat is not effectively transferred from the ice cream to the evaporator 700 along the second portion 718, the evaporator 700 as a whole is undersized.

The underperformance of the evaporator 700 can be caused by several factors. When a substance boils (or freezes) it happens at a constant temperature due to its latent heat of vaporization. The evaporator outlet temperature 604 is above the evaporator inlet temperature 602 during the first portion 614 of the freezing process 600 because the liquid ice cream is easily mixed and transfers heat to the refrigerant within the evaporator 700. Once the refrigerant is completely vaporized, any additional heat raises the temperature of the refrigerant gas, causing the refrigerant gas to become superheated.

Figure 30E:
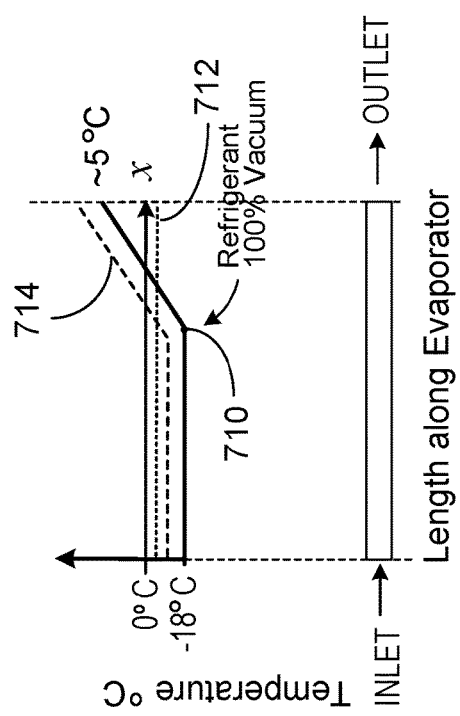

FIG. 30E shows "hot" and "cold" regions 718, 716, of temperature along the evaporator at the second marker 622. In the example shown, the second marker 622 occurs about 35 seconds into the freezing cycle 600 and the evaporator inlet temperature 602 is −18° C. with the refrigerant being a liquid and gas mixture. FIG. 30E shows that about 35% of the evaporator length is hot at this point in the cycle and about 65% of the evaporator length is cold. In this example, a majority of the evaporator length contains a liquid-gas mixture of refrigerant within 35 seconds of beginning the freezing cycle 610.

Figure 30F:
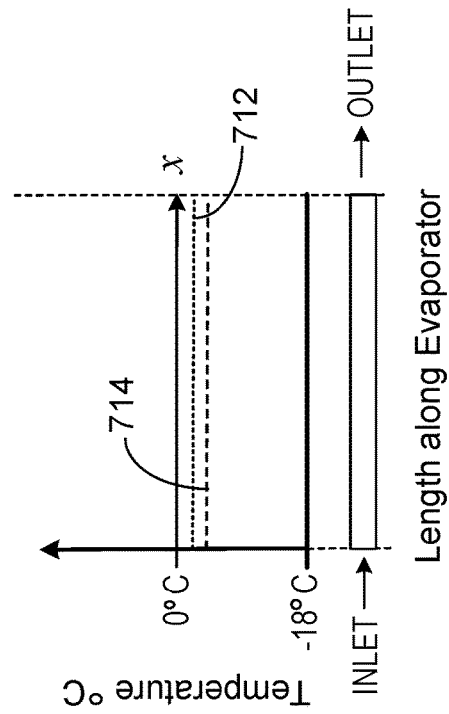

FIG. 30F is a temperature plot of the evaporator 700 for the second marker 622 corresponding to FIG. 30E. Once the temperature of a portion of the length of the evaporator 700 becomes greater than the ice cream freezing temperature 712, that part of the length of the evaporator is no longer effective in freezing ice cream. In the example shown in FIG. 30F, the actual ice cream temperature 714 is above the ice cream freezing temperature 712 for a portion of the length along the evaporator (approximately 35%). The evaporator outlet temperature 606 is about 2° C. (corresponding to the result seen in FIG. 29B). In this case, the evaporator is still undersized because the entire length of the evaporator is not contributing to freezing the ice cream. Furthermore, the temperature difference between the evaporator outlet temperature 604 compared to the evaporator inlet temperature 602 is lower than the results for the first marker 620 indicating that the overall heat transfer is lower as well.

Figure 30G:
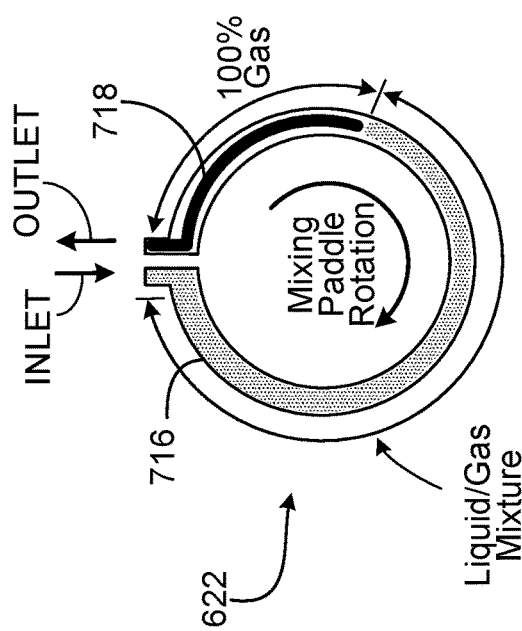

FIG. 30G shows the "cold" region 716 of temperature along the evaporator at the third marker 624. In the example shown, the third marker 624 represents about 90 seconds into the freezing cycle 600 and the evaporator inlet temperature 602 is −18° C. with the refrigerant being a liquid and gas mixture. FIG. 30G shows that all of the evaporator length is cold at this point in the cycle. In this example, the entire evaporator length contains a liquid-gas mixture of refrigerant within 90 seconds of beginning the freezing cycle 610.

Figure 30H:
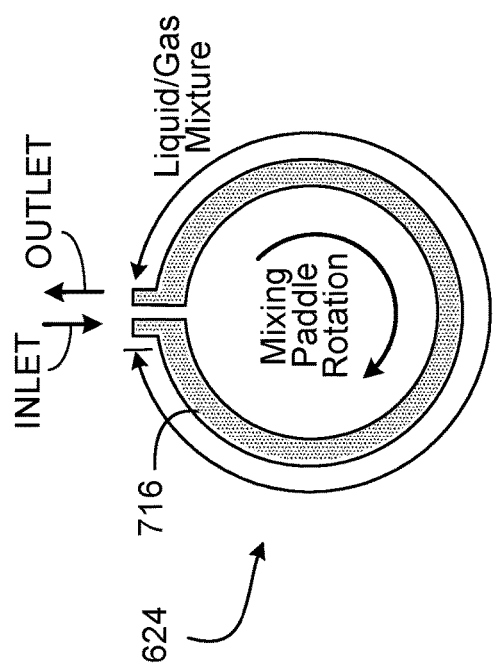

FIG. 30H is a temperature plot of the evaporator 700 for the third marker 624 corresponding to FIG. 30G. The actual ice cream temperature 714 is below the ice cream freezing temperature 712 for the entire portion of the length along the evaporator 700. This corresponds to the low heat transfer section of the second portion 616 of the freezing cycle 600. Since the refrigerant enters and exits the evaporator 700 at substantially the same temperature, the refrigerant is not fully vaporized (i.e., not superheated) at the evaporator outlet 704. This is characteristic of an oversized refrigerant system.

The reduction of heat transfer during the third marker 624, and generally to the second portion 616, can be caused by the difficulty in mixing ice cream as it hardens and the time involved in moving the ice cream from the warm center of the pod to the cold sidewall of the pod. Sometimes the ice cream is difficult to mix using a mixing paddle (e.g., mixing paddle 160) because it is mostly frozen at this point during the freezing cycle 600. In this case, the refrigerant enters and exits the evaporator 700 as a liquid-gas mixture instead of 100% gas, as it does during the first portion 614 of the freezing cycle 600. The system is oversized partly because the pod has already been cooled, but also because it is difficult to physically mix the ice cream well enough to expose it to the cold sidewall of the pod. The refrigeration system is oversized at the end of the freezing cycle 600 because refrigerant is leaving the evaporator 700 not fully vaporized. This means that liquid refrigerant that should have been used to freeze the ice cream was not used. The refrigeration system has too much capacity or is oversized at the end of the freezing cycle 600.

Referring back to FIGS. 30C and 30D, one approach to improve the undersized heat transfer effectiveness is by maintaining the cold refrigerant temperature for a longer length along the evaporator 700 without it vaporizing or becoming superheated.

One approach to improving heat transfer effectiveness is to rotate the mixing paddle counter to the direction the refrigerant flows through the evaporator 700. The rotation of the mixing paddle in a direction opposite to an overall flow direction of refrigerant through the evaporator from the evaporator inlet to the evaporator outlet causes the warm ice cream from the refrigerant outlet side of the evaporator 700 to be scrapped from the sidewall of the pod and moved toward the refrigerant inlet side where the evaporator temperatures are lower. Rotation of the mixing paddle also causes at least a portion of the ingredients within the pod to move from a warmer region within the pod to a cooler sidewall region of the pod. The sidewall region is in direct contact with a portion of evaporator length having a temperature below a freezing temperature of the ice cream ingredients within the pod.

Since the pod wall is stationary and will be cold near the inlet side of the evaporator 700, the ice cream that is moved to this portion of the pod will freeze quicker, thus improving the overall heat transfer of the heat from the ice cream to the evaporator 700. This is supported by thermodynamics which states that the heat transferred is proportional to the temperature difference. So by moving the warmest ice cream to the cold pod wall, overall heat transfer is improved. By rotating the mixing paddle counter to the refrigerant flow of the evaporator 700, the freezing time of ice cream is reduced by 1-2% which is significant when freezing the ice cream in approximately 60 seconds.

Some evaporator use multiple parallel refrigeration flow paths, as previously shown in FIG. 20. For example, an evaporator with multiple parallel flow paths where the refrigerant flow travels opposite to the auger mixing direction provided a sufficient evaporator mass velocity is achieved. In some cases, a sufficient evaporator mass velocity is a mass velocity above 75,000 lb/hrft$^2$. This mass velocity is also dependent on the compressor used in the refrigeration system. For example, the current refrigeration system uses evaporator mass velocity of 91,500 lb/hrft$^2$. In some cases, a multiple parallel flow path evaporator is used to reduce the pressure drop of the refrigerant as it passes through the evaporator.

Some evaporators include an "S" pattern of channels to achieve the parallel refrigeration flow paths. Some evaporators include many equally-spaced channels arranged around the circumference of the evaporator where each channel is parallel to an axis of the mixing paddle. The refrigerant flowing into the evaporator inlet is split into some of these channels and allowed to turn around at the end of the channel and traverse through a second parallel channel in the opposite direction, while generally flowing counter to the mixing paddle direction of rotation. For example, some evaporators include 45 channels around the circumference and are configured with 5 parallel paths of 9 passes up and down through the tubes. This can be compared to FIGS. 20A-20D which illustrates the parallel paths of the evaporator. Each respective pass up and down the tubes moves the refrigerant in a direction against the direction of rotation of the mixing paddle.

An efficient path is one that balances flow velocity (higher is better for increased thermal performance) with the pressure differential created as a result of that flow (lower mass flow means lower pressure differential). Combining the concept of an efficient flow path and increasing the temperature difference of the ice cream to the evaporator improves heat transfer. One approach is to maximize the flow velocity, but since this is associated with an increased pressure drop, the compressor needs to be able to handle the increase in pressure drop. Since the ASHRAE number associated with the evaporator is a measure of mass velocity or mass flow rate per unit area of a passage, the ASHRAE number does not change by rotating the mixing paddle counter to the refrigerant direction.

Other solutions include changing mixer RPM, mixer direction, mixer geometry and mixer coatings that promote ice cream shedding from mixer. For example, reversing the mixing direction could dislodge hardened or stuck ice cream and aid to mix it into the surrounding product. This would result in a consistent temperature of the ice cream.

For example, an evaporator with a single passage of refrigerant flowing opposite to the direction of the mixing paddle gives improved heat transfer at the first marker 620, as previously described. The RPM of the mixing paddle is preferably slow at this stage in the freezing process to avoid adding unnecessary frictional heat to the ice cream. As the ice cream freezes it hardens, which occurs around the third marker 624. The RPM of the mixing paddle is varied to promote consistent ice cream mixing. For example, the current mixing paddle rotates at 500 RPM at the beginning 610 of the freezing cycle and increases to 775 RPM at the end 612 of the freezing cycle 600. However, other RPMs can be used. Reversing the direction of rotation of the mixing paddle one or more times near the end 612 of the freezing cycle 600 also allows hard ice cream to break up and evenly cool.

Figure 31:
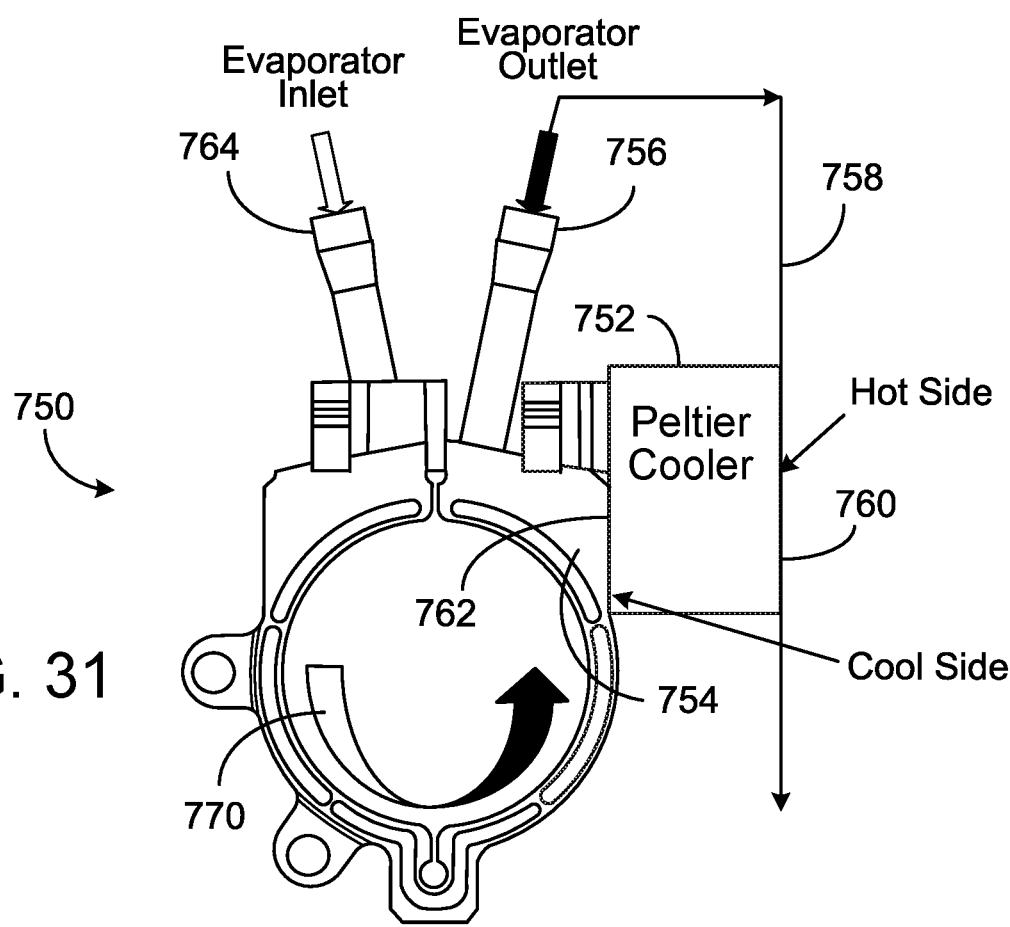
FIG. 31 is an evaporator with an attached thermoelectric cooler.

FIG. 31 is an evaporator 750 for freezing ice cream. Evaporator 750 is substantially similar to evaporator 700 but includes a thermoelectric cooler (TEC) 752 (e.g., a Peltier cooler) attached to the evaporator 750. Refrigerant flows through the evaporator 750 in direction 770. The flow of refrigerant through the evaporator 750 is substantially similar to the flow of refrigerant shown in FIGS. 30A-30H. The evaporator inlet 764 will generally be cold, but the evaporator outlet 756 may be hot depending on which part of the freezing cycle 600 is underway and whether or not the TEC 752 is used. The TEC 752 is substantially similar to the thermoelectric module 342, but is used at the evaporator outlet rather than the condenser outlet as shown in FIG. 16. The TEC 752 is thermally attached to the body 754 of the evaporator near the outlet 756 of the evaporator provides a supplemental method to freeze the pod. Since the TEC 752 is electrically powered, the TEC 752 does not draw from the thermal capacity of the evaporator. By attaching the cold side 762 of the TEC 752 to the evaporator body 754, the TEC 752 reduces the temperature of the evaporator outlet 756 to below the freezing point of the ice cream. By connecting the hot side 760 of the TEC 752 to the evaporator outlet 756, heat is transferred from the TEC 752 to refrigerant that has passed through the evaporator outlet 756 and is moving to the compressor. In other words, the hot side 760 transfers heat to a channel 758 that heats the refrigerant that has exited the evaporator 750.

At the beginning of the cooling cycle when the system is undersized (i.e., the first part of the refrigeration cycle where a portion of the evaporator is above the freezing point of ice cream), the TEC 752 is put into a cooling mode. Without a TEC, the outlet of the evaporator is typically approximately 30° F.-60° F. during the first portion 614 of the freezing cycle 600 and too warm to freeze ice cream. By connecting the cold side 762 of the TEC 752 to the evaporator body 754 near the evaporator outlet 756 and the hot side 760 of the TEC 752 to the evaporator outlet channel 758, one can cool the evaporator and freeze the ice cream touching the sidewall of the pod which improves the effectiveness of the evaporator 750. This is advantageous when the evaporator 750 is undersized. Including the TEC 752 in the refrigeration system allows the ice cream to cool faster than not having the TEC 752. The TEC 752 consumes electrical energy, but since the ice cream freezing process is only operational for a short period of time (e.g., vs. a conventional refrigerator), power consumption is less important than the benefits to reduce freezing time of the ice cream.

Some refrigeration systems use the TEC 752 to regulate the temperature of the evaporator 750. Some refrigeration systems use the TEC 752 to defrost the evaporator 750 after the freezing cycle 600 is complete. Defrosting is implemented by changing the electrical current flow direction (i.e., by running it in reverse). When this is performed, the cold side switches to the hot side and the evaporator 750 will be heated instead of cooled. Using the TEC 752 to defrost the evaporator 750 reduces noise of the refrigeration system by eliminating the "clicking" noise from the hot gas solenoid valve. Using the TEC 752 to defrost the evaporator 750 is also advantageous because the temperature of the evaporator 750 can be controlled more accurately since controlling temperature is difficult with a simple bang-bang control of the solenoid valve. For example, when using the hot gas solenoid valve, the evaporator temperature varies by 10° C. total and the evaporator outlet varies by 2° C. total. This is not preferable and using the TEC 752 provides approximately 1° C. of total variation. The second bypass line 190 shown in refrigeration system 109 is also used to defrost an evaporator so the TEC 752 would be used in tandem to this second bypass line 190 or used to replace it.

Some refrigeration systems use the TEC 752 to protect the compressor from receiving liquid that was not vaporized by the evaporator. For example, if liquid enters the compressor it can be damaged and can eventually fail. One advantage of using the TEC 752 is to vaporize liquid that remains in channel 758 before it reaches the compressor, so the refrigerant is 100% gas when it reaches the compressor. Using the TEC 752 to vaporize the refrigerant is also a purpose of the capillary tube assembly so these components can work in tandem to each other, but they can also work independently of each other.

Some refrigeration systems use the TEC 752 located at the evaporator outlet 756 to increase the mass flow of the refrigerant system. The additional heat causes an increase of the temperature of the gas returning to the compressor. The increased temperature corresponds to a higher density gas, which corresponds to an increased mass flow in the system. Since the compressor is a fixed volume device, increasing the gas density means increasing the mass compressed per stroke (or revolution) of the compressor. In general, increasing the mass flow means increasing the thermal performance of the refrigeration system.

Some refrigeration systems switch the TEC 752 on and off as needed throughout the freezing cycle 600. For example, when one or more temperature sensors detect that the evaporator 750 is undersized, the processor of the machine compares the temperature of the evaporator outlet 604 to the temperature of the evaporator inlet 602. When the temperature difference is above a threshold, the TEC 752 is turned on. The machine continues to monitor the temperature of the evaporator outlet 604 and the evaporator inlet 602. An indication that the TEC 752 is effective is when the temperature of the evaporator outlet 604 begins to decrease. The processor of the machine switches the TEC 752 off when not needed in the freezing cycle 600. For example, the processor of the machine would turn on the TEC 752 at the start 610 of the freezing cycle 600 and the TEC 752 would remain on until the evaporator outlet temperature 604 is lower than the ice cream freezing temperature (about −4° C.), at which point the processor of the machine would turn off the TEC 752.

Some refrigeration systems include one or more TECs that covers the entire surface area of an evaporator 750. In general, the larger the TEC, and the larger the surface area in contact with the evaporator 750, the more heat that is transferred for a given temperature difference. Some refrigeration systems include one or more TECs that cover the entire vertical height of the evaporator near the outlet of the evaporator. For example, some refrigeration systems include two square-shaped TECs that are vertically oriented with respect to each other so that the entire height of the evaporator near the outlet is thermally connected to each TEC. The TECs are 50 mm square and connected to the outside diameter of the evaporator via a metallic heat spreader. The spreader is used since the outside diameter of the evaporator is curved and the TECs are flat. The evaporator outlet loops back towards the evaporator and passes through an aluminum block attached to the opposite (hot) side of each TEC.

The effectiveness of the refrigerant system also depends on the amount of refrigerant (or charge) in the system. While the amount of refrigerant in the refrigerant system can be increased during fabrication of the machine to reduce the undersized performance during the first portion 614 of the freezing cycle 600, this would increase the chance of compressor damage by sending more liquid to the compressor during the second portion 616 of the freezing cycle 600. Hence, simply adding refrigerant to the refrigerant system to increase cooling capacity can be problematic.

Some refrigerant systems include a thermal expansion valve to regulate the flow rate in the refrigeration system. However, use of a thermal expansion valve can be incompatible with capillary tube systems (e.g., capillary tube system 182) to reduce the pressure of the refrigerant before it reaches the evaporator. Capillary tube systems typically do not respond to sudden changes in heat load, as is the case with freezing individual or small portions of ice cream. Capillary tube systems tend to be used in fixed heat load applications, such as conventional food freezers, and have a single flow rate that optimizes performance of the system. Since the refrigeration system includes a capillary tube system, the use of a thermal expansion valve to regulate the charge of the refrigeration system is not preferred. Thermal expansion valves can respond too slowly to be effective in controlling the performance of this refrigeration system, where the freezing cycle time is approximately 1 minute. The systems and methods described in this specification can use a charge reservoir instead of a thermal expansion valve to regulate the flow rate in the refrigeration system.

Figure 32:
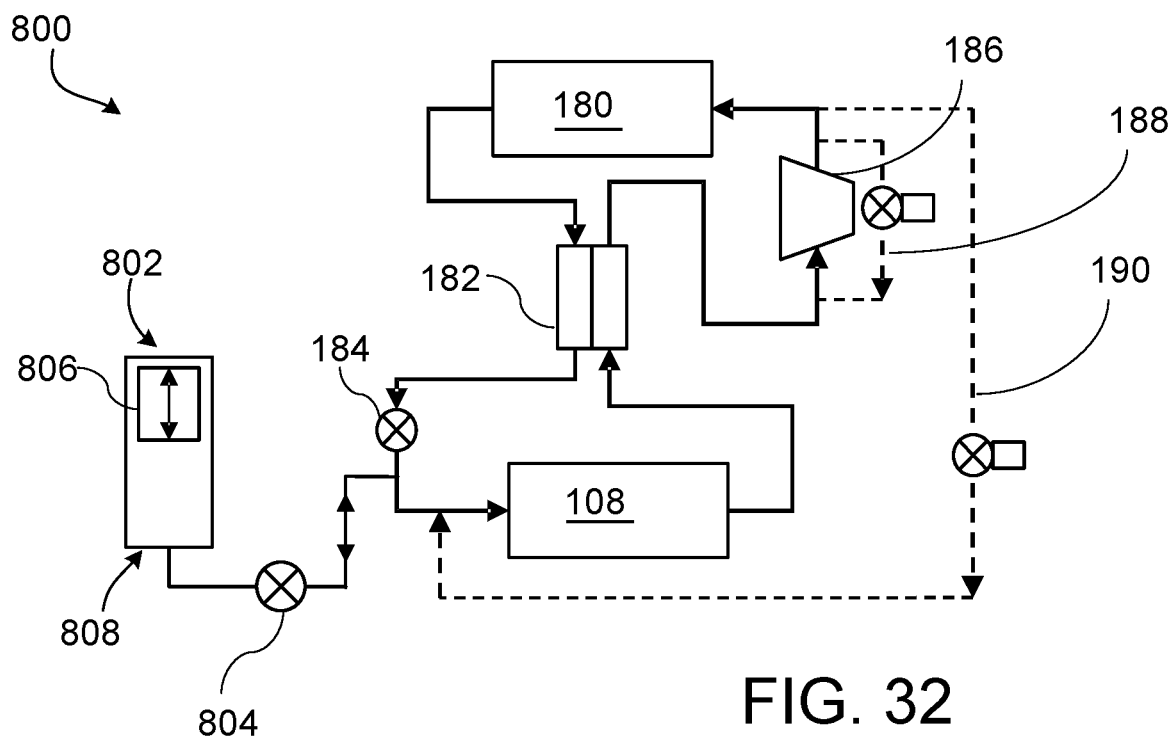
FIG. 32 is a schematic of a refrigeration system with a charge reservoir.

FIG. 32 is a schematic of a refrigeration system 800 for freezing ice cream or other ingredients. Refrigerant system 800 is substantially similar to refrigerant system 109 but includes a charge reservoir 802 configured to inject/withdraw change into/from the refrigerant system 800. The charge reservoir 802 allows a machine (e.g., machine 100) to tailor the charge in the refrigeration system 800 to freeze ice cream faster during specific parts of the freezing cycle 600. The charge reservoir 802 is an expansion tank that is configured to inject charge into the refrigerant system 800 during portions of the freezing cycle 600. This is particularly advantageous during the first portion 614 of the freezing cycle 600 where the system is undersized. The charge reservoir 802 is also configured to withdraw charge from the refrigerant system 800 during portions of the freezing cycle 600. This is advantageous during the second portion 616 of the freezing cycle 600 where the system is oversized. Varying the charge reduces the risk of compressor damage at the end of the freezing cycle 612 and increases performance of the freezing process at the start of the freezing cycle 610. The additional refrigerant allows more length of the evaporator to be effectively used at the start of the freezing cycle 610. This improves heat transfer and allows the ice cream to freeze faster than without adding the additional refrigerant. In some cases, for example when using a reservoir volume of 3-5 in$^3$, the ice cream freezes 5% faster with the charge reservoir 802 than without the charge reservoir 802.

The machine controls the charge in the refrigerant system 800 by injecting refrigerant into the refrigerant system 800 at the start of the freezing cycle 610 and withdrawing the refrigerant at the end of the freezing cycle 612. This provides increased heat transfer at the beginning of the freezing cycle 610 while also reducing risk of damage to the compressor at the end of the freezing cycle 612, when less refrigerant is needed.

The charge reservoir 802 is fluidly connected to an access valve 804 that is electronically controlled (e.g., by a solenoid valve) to open and close the fluid connection to the refrigerant system 800. The charge reservoir 802 is configured to store high pressure refrigerant gas/liquid mixture. For example, 30-100 psia refrigerant could be used with the charge reservoir 802, but some charge reservoirs use other refrigerant pressures. The charge reservoir 802 includes a piston 806 that is translatable within the charge reservoir 802 and is configured to translate towards a discharge port 808 to expel refrigerant into the refrigerant system 800. The piston 806 is also configured to translate away from the opening port 808 of the charge reservoir 802 to withdraw refrigerant from the refrigeration system 800. The piston 806 is sealed around its circumference to reduce refrigerant leaks around the piston 806.

At the start of the freezing cycle 610, the machine actuates the access valve 804 to open. This causes the refrigerant in the charge reservoir 802 to be in fluid communication with the refrigeration system 800. The machine actuates the piston 806 to transfer the high pressure refrigerant in the charge reservoir 802 to the refrigerant system 800.

During the second portion of the freezing cycle 616 when the system is oversized, the machine actuates the piston to retract and the refrigerant is siphoned from the refrigeration system. In some cases, the piston is configured to retract further than a baseline position yielding a net removal of refrigerant from the refrigeration system 800. This improves the performance of the freezing cycle 610 when the system is oversized. This increases the chances that 100% gas refrigerant exits the evaporator 108 during the entire freezing cycle 600. At the end of the freezing cycle 612, the piston 806 actuates to add the removed refrigerant back into the refrigeration system 800 so the refrigeration system 800 concludes the freezing cycle 612 with the same amount of refrigerant as the beginning of the freezing cycle 610. Once the piston 806 has reset to the baseline position, the machine controls the access valve 804 to close sealing the refrigeration system 800 until the next freezing cycle begins.

Some charge reservoirs 802 include a lead screw instead of a piston. Some charge reservoirs 802 include an air bladder instead of a piston. Large pressure changes in the system can be accounted for by making the system self-adjusting. Some charge reservoirs 802 include one or more metal bellows with compressed air on one side and refrigerant on the other side. As the air pressure is increase, the flexible bellows are deformed and pressure is applied to the refrigerant. An air compressor is used to supply air to the flexible bellows.

Figure 33:
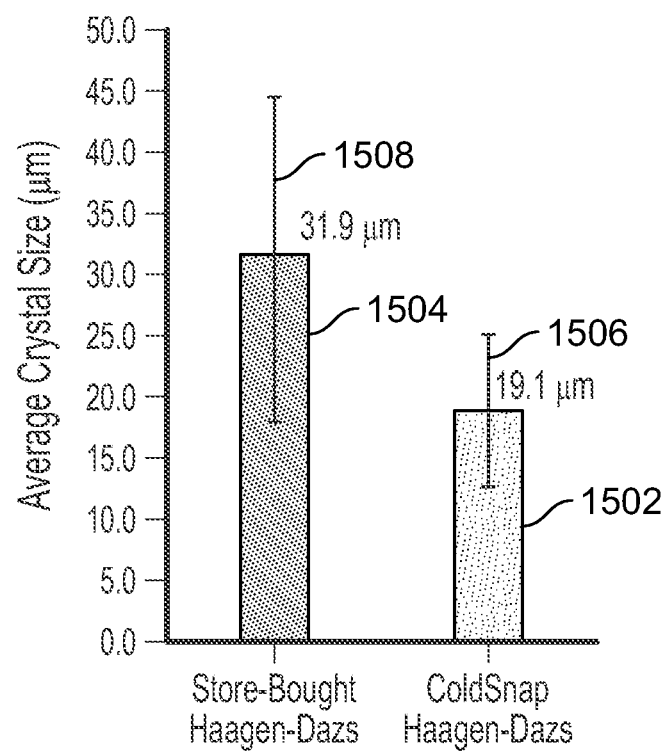
FIG. 33 are ice crystal size analysis results for ice cream.

Other factors such as the size of the pod, the evaporator gripping force, and mixing paddle size can affect the heat transfer process. FIG. 33 illustrates the comparison of ice crystal size typical of store-bought ice cream (e.g., Haagen-Dazs® ice cream) versus the same ice cream that is melted, packaged into a pod, and served using the machines described in this specification. Store-bought ice cream that is melted, packaged into a pod, and served using the machines described in this specification is considered "Cold-Snap™" ice cream. FIG. 33 illustrates that the ColdSnap™ Haagen-Dazs® ice cream 1502 has a 40% reduction in mean ice crystal size compared to the store-bought Haagen-Dazs® ice cream 1504. Specifically, the ColdSnap™ Haagen-Dazs® ice cream 1502 has a mean ice crystal size of 19.2 µm compared to the store-bought Haagen-Dazs® ice cream 1504 with a mean ice crystal size of 31.9 µm. Additionally, the standard deviation of the measured ice crystals in the ColdSnap™ Haagen-Dazs® ice cream 1506 is much tighter than the standard deviation of the store-bought Haagen-Dazs® ice cream 1508.

The machines described in this specification speed up impeller RPM so that ice crystals do not have time to grow large which means that the ice crystal size of the frozen ice cream is much smaller which significantly improves texture and smoothness of the ice cream.

The ice crystal measurements shown in FIG. 33 were analyzed using a light microscope at 40× magnification housed in an insulated glovebox system at a temperature of approximately −10° C. The samples were transferred to the glovebox immediately after being frozen by the ice cream machines described in this specification. The ice cream samples were placed on a microscope slide and a drop of 50% pentanol and 50% kerosene dispersing solution were added to aid in dispersing the ice crystals and to improve image quality. Images of the ice crystals were obtained using optical light microscopy at 40× magnification.

During post-processing, the diameter of each ice crystal seen in an image was measured by tracing the boundary of the ice crystals shown in the images. Measuring the boundary of the ice crystals was performed using Microsoft® Softonic Paintbrush for Mac® with the assistance of an ice crystal measurement macro in the Image Pro Plus software program. For each sample of ice cream analyzed, at least 300 ice crystals were measured per analysis to verify that a proper statistical average of ice crystal sizes was obtained.

Figure 34A:
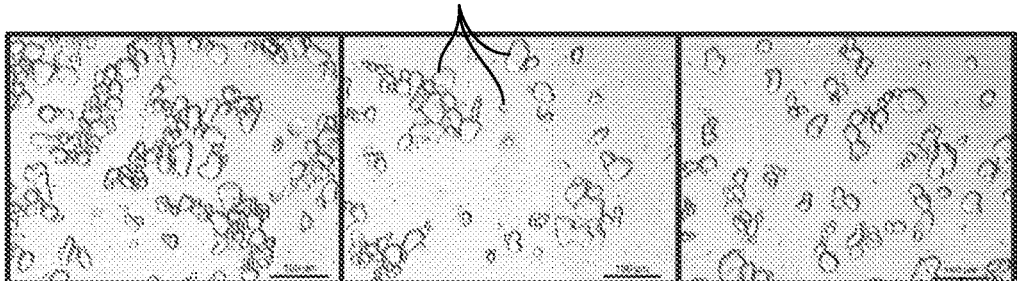
FIGS. 34A-34E are images representing an ice crystal size analysis for various ice creams.

FIGS. 34A-34E are images of ice crystals recorded using optical light microscopy at 40× (40 times) magnification for various ice creams. FIG. 34A includes three examples of the ice crystal images recorded for measuring the ice crystal size for ColdSnap™ Sweet Cream 1 ice cream. Scale of the images are represented by the scale bar 1510 representing a 100 µm length. Scale bars are shown in each of the three images of FIG. 34A. Ice crystals are represented by the generally circular shaped objects (e.g., objects 1512) in the images. There are many ice crystals seen in the images. The mean diameter of the ice crystals is 21.7 µm which is smaller than the store-bought counterpart for this ice cream.

Figure 34B:
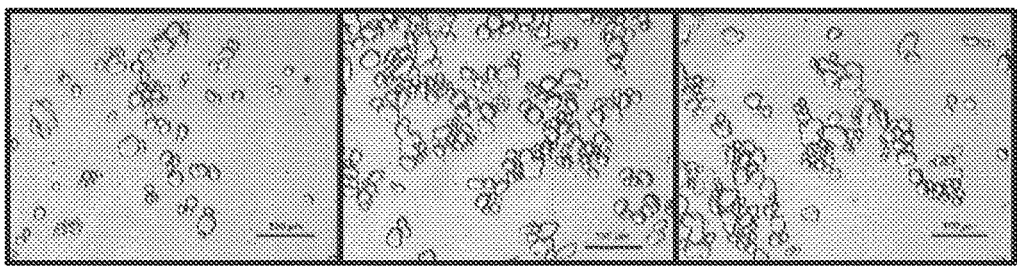
Figure 34C:
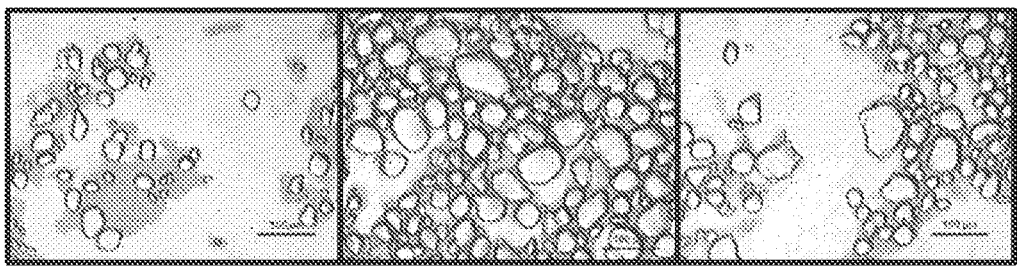

FIG. 34B includes three examples of the ice crystal images recorded for measuring the ice crystal size for ColdSnap™ Sweet Cream 2 ice cream. The mean diameter of the ice crystals is 19.5 µm which is even smaller the ice crystals seen in FIG. 34A and still less than the store-bought counterpart for this ice cream FIG. 34C includes three examples of the ice crystal images recorded for measuring the ice crystal size for ColdSnap™ Blueberry Chobani® ice cream. The mean diameter of the ice crystals is 21.2 µm but some ice crystals are larger with a diameter of 76.9 µm. However, on average, the ice crystal size is still less than the store-bought counterpart for this ice cream.

Figure 34D:

FIG. 34D includes three examples of the ice crystal images recorded for measuring the ice crystal size for ColdSnap™ Haagen-Dazs® ice cream, which was also discussed with reference to FIG. 33. The mean diameter of the ice crystals is 19.1 µm and the maximum ice crystal measured was 38.2 µm, which is the lowest maximum ice crystal size of the ice crystal measurements shown in FIGS. 34A-34E. This mean ice crystal size is smaller than the store-bought counterpart for this ice cream which is shown in FIG. 34E.

Figure 34E:
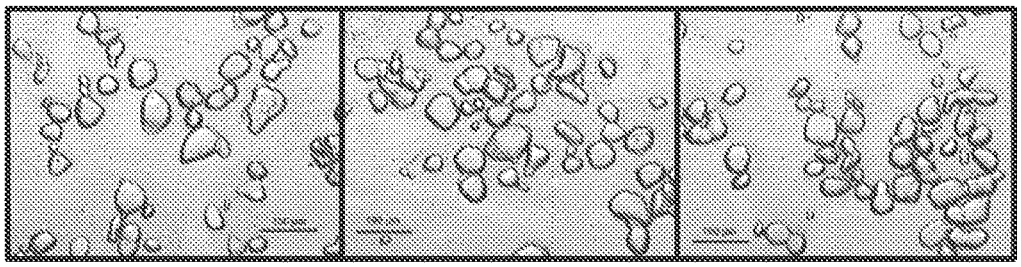

FIG. 34E includes three examples of the ice crystal images recorded for measuring the ice crystal size for store-bought Haagen-Dazs® ice cream, which was also discussed with reference to FIG. 33. Notably, the mean diameter is 31.9 µm which is much larger than the ColdSnap™ Haagen-Dazs® result of 19.1 µm. All quantitative values (i.e., the mean ice crystal diameter, the standard deviation, the minimum ice crystal dimeter, and the maximum ice crystal diameter) are larger for the store-bought ice cream compared to the ColdSnap™ counterparts.

These results are a strong indication that the ice creams produced with the machines described in this specification produce much smoother ice cream than store-bought ice cream. The ice creams produced with the machines described in this specification were also 27% smaller in ice crystal size compared to the average ice cream crystal size of 25 µm.

Below is a table of the ice crystals size measurements shown in FIGS. 33 and 34A-34E.

| Sample/Data | Mean (µm) | Std. Dev. (µm) | Min. (µm) | Max. (µm) |
|---|---|---|---|---|
| ColdSnap ™ Sweet Cream 1 | 21.7 | 7.7 | 6.0 | 51.9 |
| ColdSnap ™ Sweet Cream 2 | 19.5 | 7.1 | 5.3 | 43.1 |
| ColdSnap ™ Blueberry Chobani ® | 21.2 | 13.2 | 6.5 | 76.9 |
| ColdSnap ™ HaagenDazs ® | 19.1 | 6.24 | 6.7 | 38.3 |
| Store-bought HaagenDazs ® | 31.9 | 13.8 | 6.9 | 84.9 |

Figure 35A:
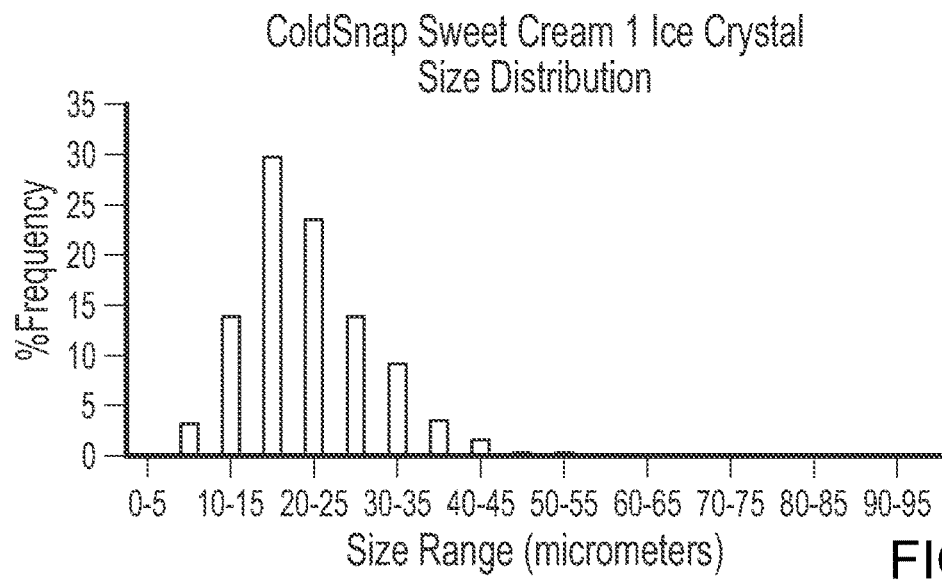
FIGS. 35A-35E are histograms representing the ice crystal size analysis for the various ice creams shown in FIGS. 34A-34E.

FIGS. 35A-35E are histograms of the ice crystal size measurements. FIG. 35A is a histogram of the ColdSnap™ sweet cream 1 ice crystal size distribution which illustrates the tight standard deviation (or spread) of measurements about the mean ice crystal diameter of 21.7 µm.

Figure 35B:
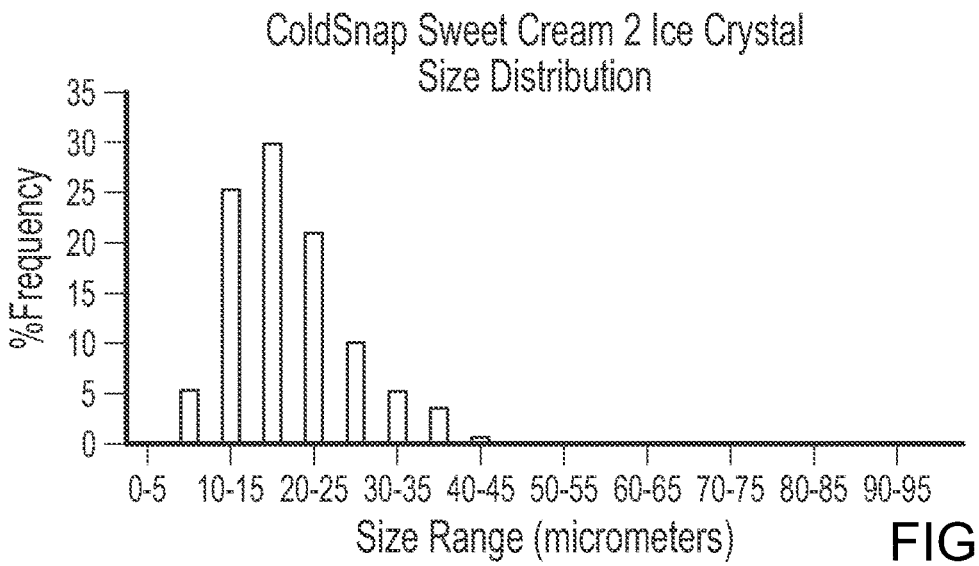

FIG. 35B is a histogram of the ColdSnap™ sweet cream 2 ice crystal size distribution which illustrates the tight standard deviation of measurements about the mean ice crystal diameter of 19.5 µm.

Figure 35C:
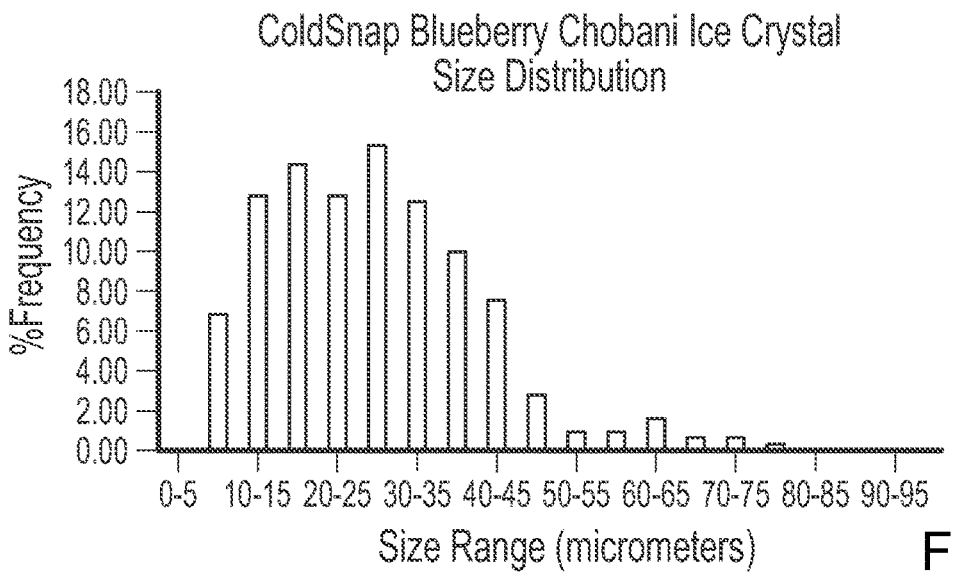

FIG. 35C is a histogram of the ColdSnap™ blueberry Chobani® ice crystal size distribution which illustrates the tight standard deviation of measurements about the mean ice crystal diameter of 19.5 µm.

Figure 35D:
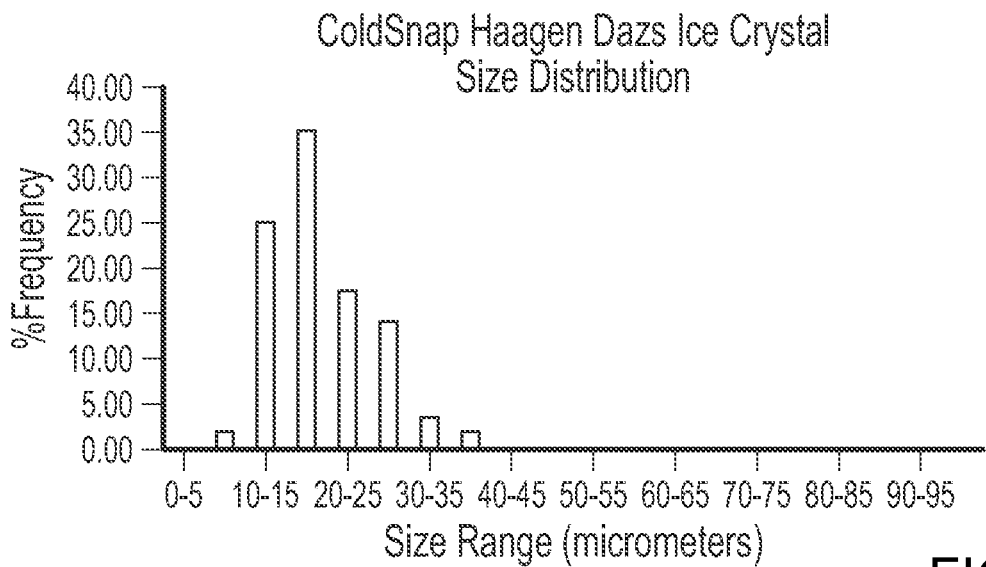

FIG. 35D is a histogram of the ColdSnap™ Haagen-Dazs® ice crystal size distribution which illustrates the tight standard deviation of measurements about the mean ice crystal diameter of 19.1 µm.

Figure 35E:
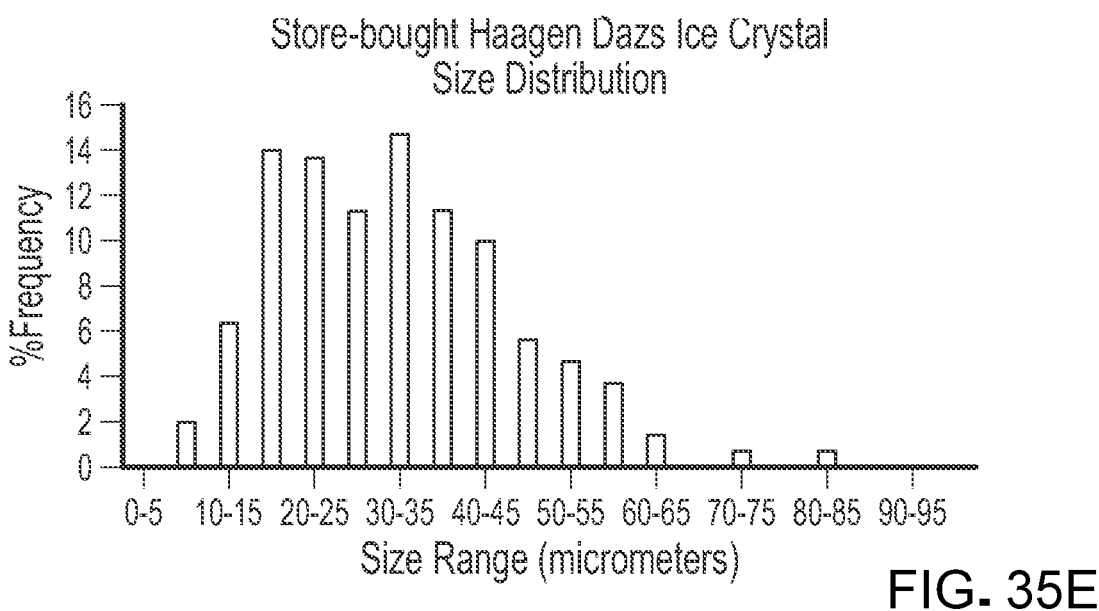

FIG. 35E is a histogram of the store-bought Haagen-Dazs® ice crystal size distribution which illustrates the wider standard deviation of measurements about the mean ice crystal diameter of 31.9 µm. Not only is the mean ice crystal diameter for the store-bought ice cream larger than the ColdSnap™ counterpart, but standard deviation is much greater.

As previously mentioned, the ice creams produced using the machines described in this specification have a much smaller ice crystal size on average and a much tighter standard deviation of ice crystal size compared to their store-bought counterparts. This is important because the ice cream machines described in this specification produce smoother ice cream that does not require refrigeration or freezing prior to use. This means that the ice creams used in these machines do not need to include non-natural ingredients such as emulsifiers or stabilizers in the ice cream. The ice creams used with these machines can be "clean-label" and contain simply milk, cream, sugar, and powdered milk and can be stored at room-temperature for up to 9 months in a sterilized pod.

A number of embodiments of the invention have been described. Nevertheless, it will be understood that various modifications may be made without departing from the spirit and scope of this disclosure invention. Accordingly, other embodiments are within the scope of the following claims.

What is claimed is:

1. A machine for cooling a food or drink, the machine comprising:
    a refrigeration system operable to cool ingredients for producing the cooled food or drink, the refrigeration system comprising:
        an evaporator defining a receptacle sized to receive the ingredients for producing the cooled food or drink, the evaporator comprising an inlet to receive a refrigerant and an outlet to discharge the refrigerant;
        a closed-loop refrigerant path passing through the evaporator between the inlet of the evaporator and the outlet of the evaporator for exchanging heat between the received ingredients and the refrigerant to cool the received ingredients;
        a compressor operable to pump the refrigerant through the closed-loop refrigerant path, the compressor comprising an inlet to receive the refrigerant and an outlet to discharge the refrigerant; and
        a thermo-electric device located along the closed-loop refrigerant path between the outlet of the evaporator and the inlet of the compressor.

2. The machine of claim 1, wherein the thermo-electric device is operable to cool the received ingredients while heat is exchanged between the received ingredients and the refrigerant.

3. The machine of claim 1, wherein the thermo-electric device is operable to regulate a temperature of the refrigerant entering through the inlet of the compressor.

4. The machine of claim 3, wherein the thermo-electric device is operable to regulate the temperature of the refrigerant such that substantially all refrigerant is superheated before entering through the inlet of the compressor.

5. The machine of claim 1, further comprising a processor operable to control the thermo-electric device to perform at least one of (i) regulating a temperature of the refrigerant during a freezing cycle or (ii) cool the received ingredients during the freezing cycle.

6. The machine of claim 5, wherein the processor is operable to switch the thermo-electric device on and off throughout the freezing cycle.

7. The machine of claim 6, wherein the processor is operable to switch the thermo-electric device on and off throughout the freezing cycle based on one or more measured temperatures along the closed-loop refrigerant path.

8. The machine of claim 5, wherein the processor is operable to determine a temperature difference between refrigerant temperature at the outlet of the evaporator and refrigerant temperature at the inlet of the evaporator based on one or more measured refrigerant temperatures.

9. The machine of claim 8, wherein the processor is operable to switch on the thermo-electric device when the temperature difference is above a threshold difference and switch off the thermo-electric device when the temperature difference is below the threshold difference.

10. The machine of claim 5, wherein the processor is operable to switch on the thermo-electric device at the beginning of the freezing cycle and switch off the thermo-electric device when a temperature at the outlet of the evaporator decreases below a threshold temperature during the freezing cycle.

11. A machine for cooling a food or drink, the machine comprising:
    a refrigeration system operable to cool ingredients for producing the cooled food or drink, the refrigeration system comprising:
        an evaporator defining a receptacle sized to receive the ingredients for producing the cooled food or drink, the evaporator comprising an inlet to receive a refrigerant and an outlet to discharge the refrigerant;
        a closed-loop refrigerant path passing through the evaporator between the inlet of the evaporator and the outlet of the evaporator for exchanging heat between the received ingredients and the refrigerant to cool the received ingredients; and
        a thermo-electric device thermally attached to the evaporator.

12. The machine of claim 11, wherein the thermo-electric device is operable to assist in cooling the received ingredients.

13. The machine of claim 12, wherein the thermo-electric device is operable to assist in cooling the received ingredients by exchanging heat between the received ingredients and the refrigerant.

14. The machine of claim 11, further comprising a capillary tube, wherein the capillary tube and the thermo-electric device are operable to regulate a temperature of the refrigerant during a freezing cycle.

15. The machine of claim 11, wherein the thermo-electric device is operable to increase a mass flow of the refrigeration system to increase a thermal performance of the refrigeration system.

16. The machine of claim 15, wherein the thermo-electric device is operable to increase the thermal performance of the refrigeration system by exchanging heat between the received ingredients and the refrigerant to increase a mass density of the refrigerant.

17. The machine of claim 11, wherein the thermo-electric device is a thermo-electric cooler arranged on an outer surface of the evaporator.

18. The machine of claim 11, wherein the thermo-electric device has a cool side facing towards the evaporator and a hot side facing away from the evaporator.

19. The machine of claim 18, wherein a portion of the closed-loop refrigerant path is in thermal contact with the hot side of the thermo-electric device.

20. The machine of claim 12, wherein the thermo-electric device is a plurality of thermo-electric devices arranged on an outer surface of the evaporator.

* * * * *